(12) United States Patent  
Kaihoko et al.

(10) Patent No.: US 8,199,291 B2
(45) Date of Patent: Jun. 12, 2012

(54) LIQUID CRYSTAL DISPLAY DEVICE HAVING POLYMER-STABILIZED BLUE PHASE LIQUID CRYSTAL LAYER AND TRANSPARENT FILMS

(75) Inventors: Hiroyuki Kaihoko, Minami-ashigara (JP); Makoto Ishiguro, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 419 days.

(21) Appl. No.: 12/491,349

(22) Filed: Jun. 25, 2009

(65) Prior Publication Data

US 2009/0322997 A1    Dec. 31, 2009

(30) Foreign Application Priority Data

Jun. 25, 2008  (JP) ................................. 2008-166377

(51) Int. Cl.
*G02F 1/1335* (2006.01)
*G02F 1/1333* (2006.01)
(52) U.S. Cl. ............................ 349/119; 349/86; 349/117
(58) Field of Classification Search .................... 349/86, 349/117–119
See application file for complete search history.

(56) References Cited

U.S. PATENT DOCUMENTS

| 2004/0032547 A1 * | 2/2004 | Yano et al. ........................ 349/96 |
| 2006/0203169 A1 * | 9/2006 | Ozawa et al. .................. 349/141 |
| 2007/0051960 A1 * | 3/2007 | Yu .................................... 257/88 |
| 2008/0259254 A1 | 10/2008 | Kikuchi et al. |

FOREIGN PATENT DOCUMENTS

| JP | 2001-316346 A | 11/2001 |
| JP | 2003-295225 A | 10/2003 |
| JP | 2003-327966 A | 11/2003 |
| JP | 2005-202383 A | 7/2005 |
| WO | WO 2005/090520 A1 | 9/2005 |
| WO | WO 2006137593 A1 * | 12/2006 |

* cited by examiner

*Primary Examiner* — Michael Caley
(74) *Attorney, Agent, or Firm* — Buchanan Ingersoll & Rooney PC

(57) ABSTRACT

A liquid crystal display device has at least a pair of transparent substrates, polymer-stabilized blue phase liquid crystal layer disposed therebetween, and a transparent film having an absolute value |Re| of in-plane retardation Re of 10 nm or smaller in the visible light region, having an absolute value |Rth| of thickness-wise retardation Rth of 30 nm or smaller in the visible light region, having an absolute value |Re(400)–Re(700)| of difference between values of in-plane retardation Re at 400 nm and 700 nm of 10 nm or smaller, and having an absolute value |Rth(400)–Rth(700)| of difference between values of thickness-wise retardation Rth at 400 nm and 700 nm of 35 nm or smaller.

11 Claims, 6 Drawing Sheets

Electric Field

Glass substrate

Electrode

Glass substrate

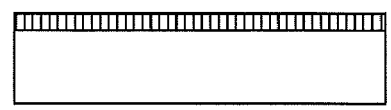
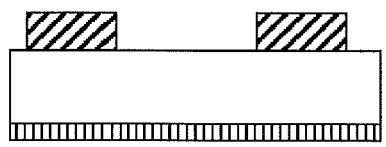
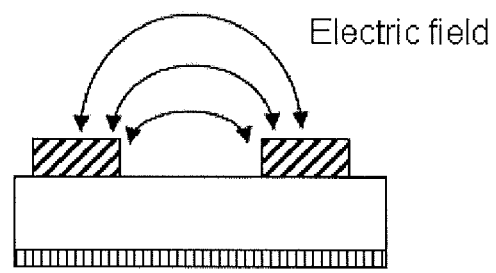
OFF state
ON state
FIG. 6A
FIG. 6B

LIQUID CRYSTAL DISPLAY DEVICE HAVING POLYMER-STABILIZED BLUE PHASE LIQUID CRYSTAL LAYER AND TRANSPARENT FILMS

CROSS-REFERENCE TO RELATED APPLICATIONS

This application claims benefit of priority under 35 U.S.C. 119 to Japanese Patent Application No. 2008-166377 filed on Jun. 25, 2008, which is expressly incorporated herein by reference in its entirety.

BACKGROUND OF THE INVENTION

1. Technical Field

The present invention relates to a liquid crystal display device employing a polymer-stabilized blue phase liquid crystal.

2. Background Art

Liquid crystal display elements have widely been used in the field of optical information processing. The liquid crystal display system includes various systems of TN, STN, IPS, VA, OCB and so forth, all of which being operated so as to change a preliminarily-controlled alignment of liquid crystal molecules into a different state of alignment by applying an electric field, to thereby change the direction or state of polarization of the transmitted light, and then convert this change into contrast ranging between brightness and darkness while making use of a polarizer plate or the like.

All of these conventional liquid crystal display systems need surface alignment treatment for controlling alignment of the liquid crystal molecules, and in particular those based on the systems other than VA need rubbing. The rubbing is an operation of rubbing the surface of an alignment film, which is formed by coating on the surface of a substrate to be brought into contact with a liquid crystal, using cloth or the like, but is causative of degradation in the yield ratio, consequent rise in the cost, and degradation in quality of display. In addition, the above-described systems make use of nematic liquid crystal, and have achieved a response time of 10 milliseconds or around at the shortest, the performance of which has limited display of movie on television.

In recent years, there have been proposed chiral nematic liquid crystals as the liquid crystal for the liquid crystal display element (Japanese Laid-Open Patent Publication Nos. 2003-295225, 2001-316346 and so forth). Other proposals for solving the above-described problems have been made on use of polymer-stabilized blue phase liquid crystals (Japanese Laid-Open Patent Publication No. 2003-327966, WO2005/090520), in place of the conventional nematic liquid crystals. The polymer-stabilized blue phase liquid crystals are novel materials distinctively expanded in the temperature range allowing therein exhibition of the blue phase, without impairing their rapid response performance. Since the polymer-stabilized blue phase is optically isotropic under the absence of electric field applied thereto, so that there is no need of controlling the alignment. Display is therefore established based on a novel system, making use of phenomena that retardation is not available under the absence of electric field, but is induced under applied electric field. The response time is 100 µs or around, which is distinctively faster than that of the conventional liquid crystal display elements. It is reported also that a desirable contrast may be obtained over a wide range of viewing angle, without causing leakage of light ascribable to retardation in the black state. To achieve a high contrast in the wider-viewing angles by reducing the light leakage caused from the polarizing plates, combing the retardation plate with the liquid crystal cell employing the polymer-stabilized blue phase has been proposed (JPA No. 2005-202383).

SUMMARY OF THE INVENTION

It has, however, been found out from investigations by the present inventors that the liquid crystal alignment in the polymer-stabilized blue phase easily becomes nonuniform and easily causes defects because the phase may be stabilized with its polymer-network. In the defect portions of the liquid crystal phase, the scattering phenomenon may occur, which may cause the lower contrast along the normal line direction compared with those of other liquid crystal displays. It has been also found out from further investigations by the present inventors that retardation of the retardation layer, which is disposed between the liquid crystal cell and the rear polarizer, is one factor of reducing the normal contrast (the contrast along the normal line direction).

It is therefore an object of the present invention to provide a liquid crystal display device showing the low light-leakage and the high contrast along the normal line direction, and the low coloration in oblique directions in the black state, and the rapid response ability.

The means for achieving the object are as follows.

[1] A liquid crystal display device comprising in the following order:
a light source,
a first polarizer,
a first transparent film,
a liquid crystal cell comprising:
a pair of transparent substrates and
a polymer-stabilized blue phase liquid crystal layer disposed therebetween;
a second transparent film, and
a second polarizer;
wherein |Re(550)|, which is an absolute value of retardation in plane at 550 nm, Re(550), of the first transparent film is equal to or smaller than 10 nm; and |Rth (550)|, which is an absolute value of retardation along the thickness direction at 550 nm, Rth(550), of the first transparent film is equal to or smaller than 30 nm.

[2] The liquid crystal display device of [1], wherein |Re(400)−Re(700)| of the first transparent film is equal to or smaller than 10 nm; and |Rth(400)−Rth(700)| of the first transparent film is equal to or smaller than 35 nm.

[3] The liquid crystal display device of [2], wherein the first transparent film is a cellulose acylate-base film.

[4] The liquid crystal display device of [1], wherein |Re(400)−Re(700)| of the first transparent film is equal to or smaller than 5 nm; and |Rth(400)−Rth(700)| of the first transparent film is equal to or smaller than 10 nm.

[5] The liquid crystal display device of [4], wherein the first transparent film is an acryl-base polymer film.

[6] The liquid crystal display device of [5], wherein the acryl-base polymer film comprises, as a major ingredient, an acryl-base polymer having at least one unit selected from the group consisting of lactone ring unit, maleic anhydride unit, and glutaric anhydride unit.

[7] The liquid crystal display device of [1], wherein the first transparent film is a cycloolefin polymer-base film.

[8] The liquid crystal display device of any one of [1]-[7], wherein the first transparent film is or comprises an optically biaxial film.

[9] The liquid crystal display device of any one of [1]-[7], wherein the second transparent film is or comprises an optically uniaxial film.

[10] The liquid crystal display device of any one of [1]-[9], wherein |Re(550)|, which is an absolute value of retardation in plane at 550 nm, Re(550), of the second transparent film is equal to or smaller than 10 nm; and

|Rth (550)|, which is an absolute value of retardation along the thickness direction at 550 nm, Rth(550), of the second transparent film is equal to or smaller than 30 nm.

[11] The liquid crystal display device of any one of [1]-[7], wherein the second transparent film is a biaxial film whose Re(550) is from 200 to 350 nm and Rth(550) is from −88 to 88 nm.

[12] The liquid crystal display device of any one of [1]-[7], wherein the second transparent film comprises a biaxial film whose Re(550) is from 20 to 120 nm and Rth(550) is from 125 to 225 nm, and a biaxial film whose Re(550) is from −30 to 30 nm and Rth(550) is from 50 to 150 nm.

[13] The liquid crystal display device of any one of [1]-[7], wherein the second transparent film comprises a uniaxial film whose Re(550) is from 60 to 210 nm and Rth(550) is from 30 to 105 nm, and a uniaxial film whose Re(550) is from −30 to 30 nm and Rth(550) is from 70 to 170 nm.

[14] The liquid crystal display device of any one of [1]-[13], wherein the light source is an LED light source.

According to the invention, it is possible to provide a liquid crystal display device showing the low light-leakage and the high contrast along the normal line direction, and the low coloration in oblique directions in the black state, and the rapid response ability.

BRIEF DESCRIPTION OF THE DRAWINGS

FIG. 6A is a sectional view schematically illustrating an overall configuration of an essential portion of the display element under the absence of applied electric field, and FIG. 6B is a sectional view schematically illustrating an overall configuration of the essential portion of the display element under applied electric field.

Figure 1:
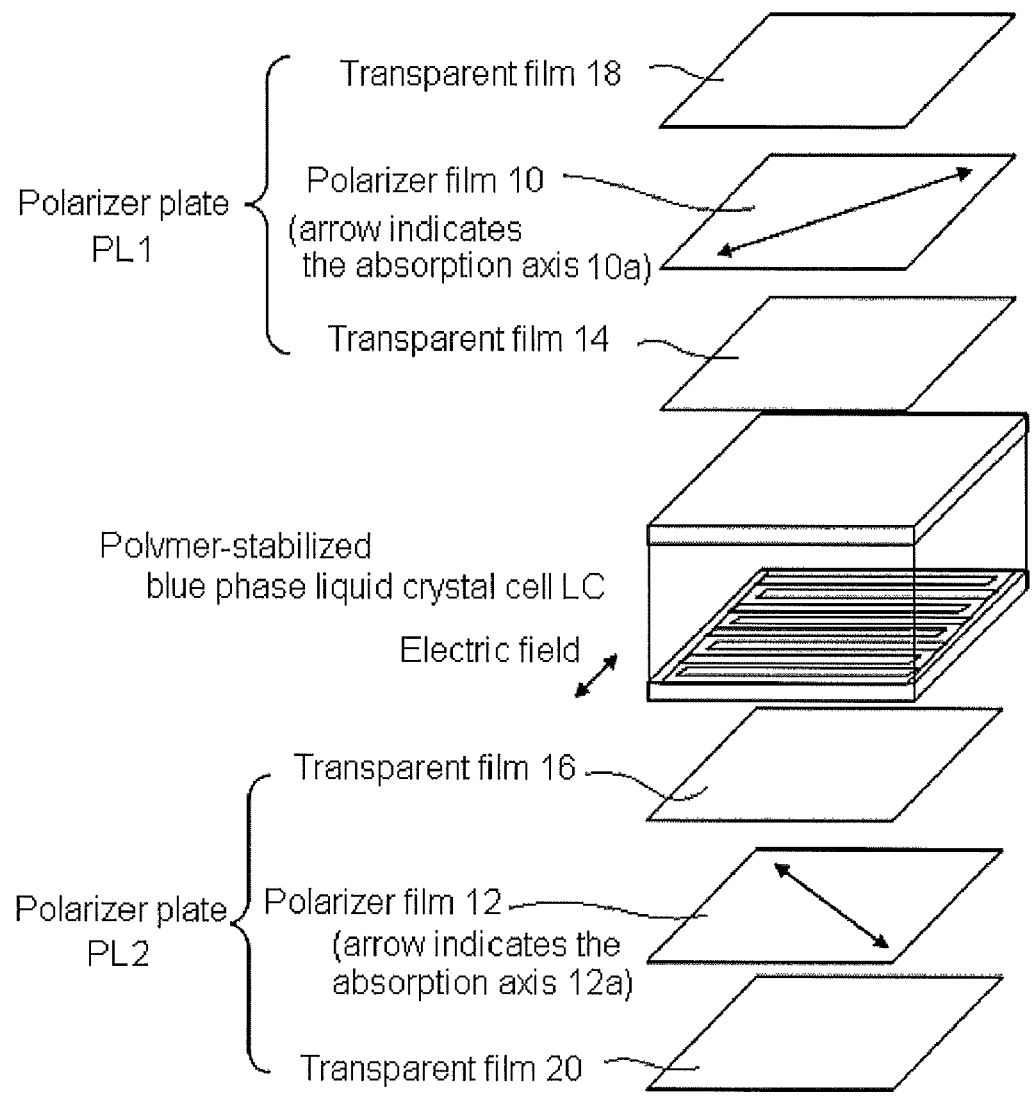
FIG. 1 is a schematic drawing illustrating an exemplary configuration of a liquid crystal display device of the present invention.

Reference numerals and symbols in the drawings represent the following:
10, 12: polarizer film;
10a, 12a: absorption axis of polarizer film;
14: second transparent film;
16: first transparent film;
18, 20: transparent film;
LC: liquid crystal display element; and
PL1, PL2: polarizer plate.

PREFERRED EMBODIMENT OF THE INVENTION

The present invention will be detailed below. Note that, in this patent specification, any numerical expression in a style of " . . . to . . . " will be used to indicate a range including the lower and upper limits represented by the numerals given before and after "to", respectively.

First of all, the terms to be used in the description will be explained.

[Definitions of Re and Rth]

In the description, Re($\lambda$) (unit: nm) and Rth($\lambda$) (unit: nm) each indicate retardation in plane and retardation along the thickness direction of a sample, a film or the like, at a wavelength $\lambda$. Re($\lambda$) is measured by applying a light having a wavelength of $\lambda$ nm in the normal direction of the film, using KOBRA-21ADH or WR (by Oji Scientific Instruments).

When a film to be tested is represented by an uniaxial or biaxial refractive index ellipsoid, then its Rth($\lambda$) is calculate according to the method mentioned below.

With the in-plane slow axis (determined by KOBRA 21ADH or WR) taken as the inclination axis (rotation axis) of the film (in case where the film has no slow axis, the rotation axis of the film may be in any in-plane direction of the film), Re($\lambda$) of the film is measured at 6 points in all thereof, up to +50° relative to the normal direction of the film at intervals of 10°, by applying a light having a wavelength of $\lambda$ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be calculated according to the following formulae (21) and (22):

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (21)$$

$$Rth = \left[\frac{nx+ny}{2} - nz\right] \times d \quad (2)$$

wherein Re(θ) means the retardation value of the film in the direction inclined by an angle θ from the normal direction; nx means the in-plane refractive index of the film in the slow axis direction; ny means the in-plane refractive index of the film in the direction vertical to nx; nz means the refractive index of the film vertical to nx and ny; and d is a thickness of the film.

When the film to be tested can not be represented by a monoaxial or biaxial index ellipsoid, or that is, when the film does not have an optical axis, then its Rth(λ) may be calculated according to the method mentioned below.

With the in-plane slow axis (determined by KOBRA 21ADH or WR) taken as the inclination axis (rotation axis) of the film, Re(λ) of the film is measured at 11 points in all thereof, from −50° to +50° relative to the normal direction of the film at intervals of 10°, by applying a light having a wavelength of λ nm from the inclined direction of the film. Based on the thus-determined retardation data of Re(λ), the mean refractive index and the inputted film thickness, Rth(λ) of the film is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In the description, Re and Rth are at a wavelength of 550 nm unless the wavelength in their measurement is not specifically defined. And the term "in-plane slow axis" means the direction in plane providing the maximum refractive index, and the term "in-plane fast axis" means the direction perpendicular to the in-plane slow axis. The term "visible light range" means the range from to nm.

In this description, the numerical data and the numerical ranges indicating optical characteristics and others should be interpreted as numerical data and numerical ranges that include generally-acceptable errors for liquid-crystal display devices and their constitutive members, as well as the directions of optical axes such as a polarizing axis of a polarizer and a slow axis of an optically anisotropic layer and the angles between them.

The present inventors found out with respect to the liquid crystal display element making use of the polymer-stabilized blue phase liquid crystal, that the leakage of light observed in the direction along the normal line relative to the displaying plane in the black state may be reduced, and that the coloration of the blackness observed I the oblique directions may be moderated, by controlling optical characteristics of the transparent film which is disposed between the backlight-side polarizer and the liquid crystal layer.

The optical characteristics of the transparent film contributive to display characteristics of the liquid crystal display element making use of the polymer-stabilized blue phase liquid crystal include retardation in plane (Re) and retardation along the thickness direction (Rth). Furthermore, wavelength-dispersion characteristics of Re and Rth may influence on the display characteristics. By controlling these values, leakage of light observed in the direction along the normal line relative to the displaying plane in the black state may be reduced, and coloration observed in the oblique directions in the black state may be moderated.

More specifically, a large value of contrast, which is a ratio of brightness of the white state and the black state in the direction along the normal line, may be achieved by controlling the optical characteristics, and the coloration of the black state observed in the oblique directions may be reduced by suppressing leakage of light in the black state over a wide range of visible light region.

The conventional liquid crystal display devices, making use of the polymer-stabilized blue phase liquid crystal, generally adopt polarizer plates such as those having "Fujitac" from FUJIFILM Corporation as a protective film for a polarizer film. The present inventors however found out that leakage of light in the black state of the liquid crystal display elements, making use of the polymer-stabilized blue phase liquid crystal, could not fully be suppressed, and that high contrast could not readily be obtained, only by simply using commercially-available conventional polarizer plates. According to the invention, by optimizing values of retardation in plane (Re), retardation along the thickness direction (Rth), and preferably wavelength-dispersion characteristics of Re and Rth of the transparent film which is disposed between the backlight-side polarizer and the liquid crystal cell, low leakage of light in the black state and high contrast in the direction along the normal line are achieved.

The liquid crystal display device of the present invention is compatible to the same-plane switching system, and is suitable for increase in size and improvement in quality of liquid crystal display screen.

The liquid crystal display device of the present invention, making use of the polymer-stabilized blue phase liquid crystal, has also advantages below.

First, surface alignment treatment for controlling alignment of liquid crystal material is no more necessary, so that all processes of alignment/washing/drying, which are specifically formation-by-coating of alignment film onto the surface of substrate/drying/heat curing/rubbing, which have been indispensable for the conventional display elements, may be omissible. Since these processes have induced contamination by foreign matters such as dust and particles, static electricity and scratching, all of which having been causative of degradation in the yield ratio and display performances, so that omission of these processes may contribute to avoid such degradation in the yield ratio and display performances.

Secondly, the conventional liquid crystal display elements, based on changes in the state of alignment of nematic liquid crystal in principle, have intrinsically been limited in the response speed, and have been inferior to the competitive plasma display panel, EL display panel and so forth in terms of movie display performances. Use of the polymer-stabilized blue phase liquid crystal, capable of responding within 100 μs or around, now solves the problem.

Examples of the polymer-stabilized blue phase liquid crystal material adoptable to the present invention include a composite liquid crystal composition which contains a low-molecular-weight liquid crystal capable of exhibiting blue phase between the cholesteric phase and the isotropic phase, and a polymer network formed in the low-molecular-weight liquid crystal. The polymer network is formed by polymerization of non-crystalline or crystalline monomers together with a crosslinking agent. The polymer-stabilized blue phase liquid crystal material preferably contains a chiral dopant. The amount of chiral dopant relative to the polymer-stabilized blue phase liquid crystal affects the wavelength of diffraction expressed by the polymer-stabilized blue phase liquid crystal. The amount of addition of the chiral dopant may be adjustable also so as to make the wavelength of diffraction expressed by the polymer-stabilized blue phase liquid crystal fall outside the visible light region (380 to 750 nm). The liquid crystal display device making use of the polymer-stabilized blue phase liquid crystal material containing such amount of chiral dopant may further be reduced in leakage of light in the black state.

The monomer(s) which can be used for forming the polymer-network may be selected from non-liquid crystalline monomers or liquid-crystalline monomers; and non-liquid crystalline monomers are more effective compared with liquid crystalline monomers.

Non-liquid crystalline monomer may be selected from monomers capable of polymerizing according to a photo-polymerization or thermal polymerization and having no rod-like molecular structure (for example, molecular structures of biphenyl or biphenyl.cyclohexyl residues having the terminal alkyl, cyano, fluorine atom or the like); and examples of such a monomer include, but are not limited to, monomers having a polymerizable group such as acryloyl, methacryloyl, vinyl, epoxy, fumarate, or cinnamoyl.

Examples of the monomer, which can be used in the invention, other than the non-liquid crystalline monomers include monomers having a rod-like or plate-like frame of phenyl or cyclohexyl group and showing liquid crystallinity in the singular state or in the mixture state with other molecules.

Monomers having two or more polymerizable groups in each molecule may be also used.

Preferable examples of the non-liquid crystalline monomer include acrylate-base monomers having an acryloyl or methacryloyl group(s); and more preferable examples include branched acrylate-base monomers having an alkyl as a side chain(s). For example, the monomer having at least one side chain of $C_{1-4}$ alkyl per a molecule may be preferably used. Specific examples of the acryl-base monomer include cyclohexyl acrylate; and specific examples of the acryl-base monomer having alkyl side chain include 2-ethylhexyl acrylate and 1,3,3-trimethylhexyl acrylate.

The polymer network can be formed by employing such monomer(s) along with crosslinking agent(s) in polymerization. The crosslinking agent may be selected from non-liquid crystalline or liquid crystalline compounds having a reactive moiety which can form a network structure by connecting the molecules of monomer to be used together. For example, according to one preferable embodiment in which the acrylate-base monomer is used, the crosslinking agent may be selected from diacrylate monomers showing liquid crystallinity.

On the other hand, low-molecular weight liquid crystal, which is one of the ingredient of the polymer-stabilized blue phase liquid crystal may be selected from low-molecular weight liquid crystal capable of forming a blue phase between the cholesteric phase (chiral nematic phase) and the isotropic phase. Preferably, it is selected from thermotropic liquid crystals whose molecules have a long elongated rod-like geometric configuration, and may be selected from liquid crystal materials which have been developed for liquid crystal display elements. Examples of such a low-molecular weight liquid crystal include compounds having a biphenyl, terphenyl or biphenyl-terphenyl moiety and showing a cholesteric phase (chiral nematic phase), whose helical pitch is equal to or shorter than 500 nm, in the singular state due to the present of the chiral atom or in the mixture state with chiral material (chiral dopant). In general, plural types of such low-molecular liquid crystal may be used in combination.

The chiral dopant is selected from compounds capable of making liquid crystal helical state. Examples of the chiral dopant include "ZLI-4572", CB15 and Compounds (a)-(h) having a furo[3,2-b]furan.

Chiral dopant ZLI-4572

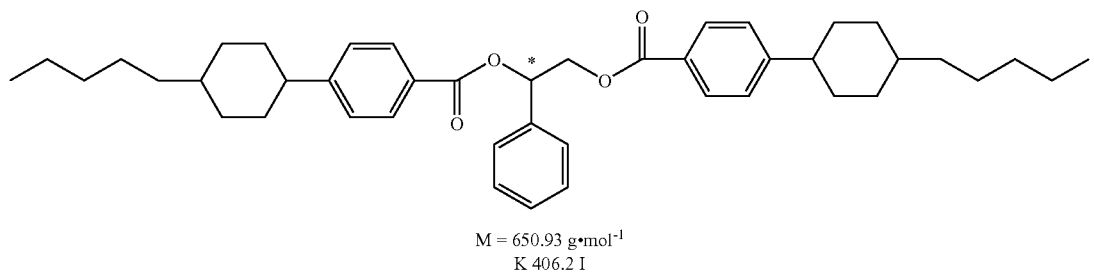

$M = 650.93$ g·mol$^{-1}$
K 406.2 I

Chiral dopant CB15

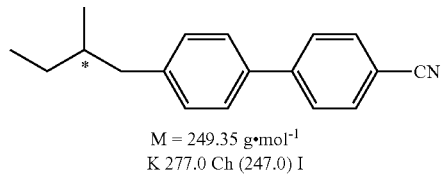

$M = 249.35$ g·mol$^{-1}$
K 277.0 Ch (247.0) I (a)

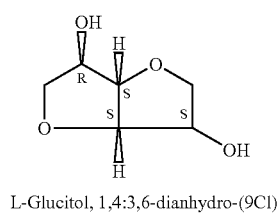

L-Glucitol, 1,4:3,6-dianhydro-(9CI)

(b)

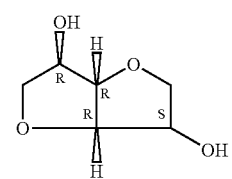

Glucitol, 1,4:3,6-dianhydro-, DL-(8CI)

(c)

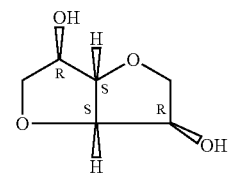

D-Iditol, 1,4:3,6-dianhydro-(9Cl)

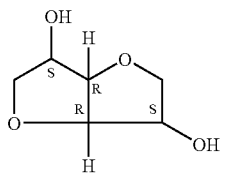

L-Iditol, 1,4:3,6-dianhydro-(9Cl)

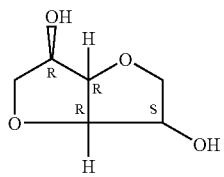

D-Glucitol, 1,4:3,6-dianhydro-(9Cl)

-continued (d)

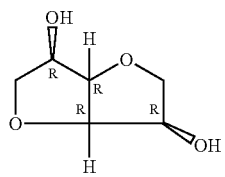

Mannitol, 1,4:3,6-dianhydro-(6Cl, 7Cl, 8Cl, 9Cl)

(e)

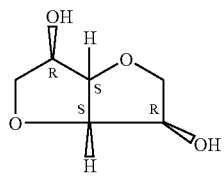

Iditol, 1,4:3,6-dianhydro-(6Cl, 7Cl, 8Cl, 9Cl)

(f)

(g)

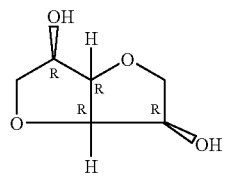

D-Mannitol, 1,4:3,6-dianhydro-(9Cl)

(h)

In general, the chiral dopant may be used as an additive capable of stabilizing helical structures of TN-modes or inducing helical phases such as cholesteric phases or chiral smectic phases According to the invention, the helical pitch is preferably shorter than usual; and adding the chiral dopant having a large Helical Twisting Power (HTP) with the high concentration is preferable. Therefore, the chiral dopant is preferably selected from the compounds showing a large HTP and high solubility relative to liquid crystals.

The blue phase may be formed as follows. Monomer(s) and crosslinking agent(s) are dispersed in the low-molecular weight liquid crystal; and then the polymerization of the dispersion is carried out at the temperature at which the blue phase is maintained.

The polymerization may be carried out according to thermal polymerization or photo-polymerization, and photo-polymerization employing ultraviolet light is preferable since thermal polymerization may have the limit in terms of the overlap between the polymerization temperature and the blue-phase and the state of the polymer network may be varied depending on heat. For promoting polymerization, at least one polymerization initiator is preferably dispersed in the low-molecular weight liquid crystal along with monomer, chiral dopant and crosslinking agent. Examples of the photo-polymerization initiator include acetophenone-base, benzophenone-base, benzoinether-base and thioxanthone-base compounds; and specific examples include 2,2-dimethoxy-2-phenyl acetophenone.

The amount of chiral dopant relative to the polymer-stabilized blue phase liquid crystal so as to make the wavelength of diffraction expressed by the polymer-stabilized blue phase liquid crystal fall outside the visible light region (380 to 750 nm), may be adjustable typically by the procedures below.

(1) A polymer-stabilized blue phase liquid crystal added with an appropriate amount of chiral dopant is prepared.

(2) The wavelength of diffraction of the surface of the liquid crystal is measured by general procedures using a grating spectrometer (for example, microscopic UV/visible photometer 350 from JASCO Corporation).

(3) The amount of chiral dopant making the wavelength of diffraction fall outside the visible light region is determined.

The amount of chiral dopant measured as described in the above depends on HTP (Helical Twisting Power) of the chiral dopant, and varies depending on species of chiral dopant and liquid crystal. For an exemplary case where the liquid crystal is JC1041-XX and the chiral dopant is ZLI-4572, the amount of ZLI-4572 is approximately 6 to 10 mol %, meanwhile the amount of CB15 used instead as the chiral dopant is approximately 85 to 95 mol %.

FIG. 1 schematically illustrates an exemplary configuration of a liquid crystal display device of the present invention. The liquid crystal display device illustrated in FIG. 1 is configured by a polymer-stabilized blue phase liquid crystal display element LC placed between two polarizer plates PL1 and PL2. The polarizer plate PL1 is configured by a polarizer film 10 held between two transparent films 14, 18, and the polarizer plate PL2 is configured by a polarizer film 12 held between two transparent films 16, 20. Of two sets of these transparent films, transparent films 14 and 16 held on the side closer to the polymer-stabilized blue phase liquid crystal display element LC may affect the display performance, meanwhile the transparent films 18 and 20 placed on the side far from the polymer-stabilized blue phase liquid crystal display element serve as protective films of the polarizer films 10 and 12, and may not affect the display performance. The liquid crystal display device shown in FIG. 1 (in FIG. 1, the position of the backlight (not-shown) is at the bottom) has a transparent film 16 disposed at the backlight-side, whose Re, Rth and preferably the wavelength-dispersion characteristics of Re and Rth are adjusted to the appropriate ranges, and, by having a such transparent film at the position, the liquid crystal display device exhibits lower leakage of light in the direction along the normal line in the black state, higher contrast and less coloration in the oblique directions in the black state, compared with the conventional liquid crystal display devices employing the polymer-stabilized blue phase liquid crystal.

More specifically, the absolute value of Re at 550 nm, |Re(550)|, of the transparent film 16 is equal to or smaller than 10 nm and the absolute value of Rth at 550 nm, |Rth(550)| of the transparent film 16 is equal to or smaller than 35 nm. Preferably, |Re(550)| is equal to or smaller than 5 nm, and preferably, |Rth(550)| is equal to or smaller than 10 nm. Furthermore, Re and Rth of the transparent film 16 preferably show a small dependency on the wavelength, and the absolute values of Re and Rth preferably satisfy the above described conditions at all over the visible light range. More specifically, regarding the wavelength-dispersion characteristics of Re and Rth of the transparent film 16, |Re(400)−Re(700)| is preferably equal to or smaller than 10 nm, and |Rth(400)−Rth(700)| is preferably equal to or smaller than 35 nm; and |Re(400)−Re(700)| is more preferably equal to or smaller than 5 nm, and |Rth(400)−Rth(700)| is more preferably equal to or smaller than 10 nm.

Re(400) of the transparent film 16 is preferably from −5 to 5 nm; and Rth(400) of the transparent film 16 is preferably from −10 to 10 nm.

Re(700) of the transparent film 16 is preferably from −5 to 5 nm; and Rth(400) of the transparent film 16 is preferably from −10 to 10 nm.

By controlling the optical properties of the transparent film 14 to be disposed at the displaying plane side, it is possible to more improve the displaying properties of the device.

In one example, the transparent film 14 may also satisfy the optical properties which the transparent film 16 is required to show.

In another example, the transparent film 14 may be an optically biaxial film. In the example, preferably, the transparent film 14 has Re of from about 200 to about 350 nm and Rth of from about −88 to about 88 nm, and more preferably, the transparent film 14 has Re of from about 250 to about 300 nm and Rth of from −45 nm to −45 nm.

In another example, the transparent film 14 essentially consists of two optically biaxial films. In the example, preferably, one of the two films has Re of from about 20 to about 120 nm (more preferably Re of from about 40 to about 100 nm) and Rth of from about 125 to about 225 nm (more preferably Rth of from about 145 to about 205 nm); and preferably another of the two films has Re of from about −30 to about 30 nm (more preferably Re of from about −10 to about 10 nm) and Rth of from about 50 to about 150 nm (more preferably Rth of from about 80 to about 120 nm).

In another example, the transparent film 14 essentially consists of two optically uniaxial films. In the example, preferably, one of the two films has Re of from about 60 to about 210 nm (more preferably Re of from about 110 to about 160 nm) and Rth of from about 30 to about 105 nm (more preferably Rth of from about 55 to about 80 nm); and preferably another of the two films has Re of from about −30 to about 30 nm (more preferably Re of from about −10 to about 10 nm) and Rth of from about 55 to about 80 nm (more preferably Rth of from about 100 to about 140 nm).

The liquid crystal display element LC is a liquid crystal display element having a pair of substrates, and a polymer-stabilized blue phase liquid crystal material encapsulated between the substrates, wherein electric field is applied in parallel with the substrate plane. The electric field is preferably applied by two comb-shaped electrodes assembled, in a mutually staggered manner, to the surface of one substrate. On the practical basis, a feasible method may be such as using either one of two these electrodes as a source electrode of a thin film transistor (TFT), and using the other as a common electrode, so as to enable ON-OFF switching of the electric field based on TFT operation. More specifically, it may be preferable to assemble the common electrode with the TFT electrode to the surface of one substrate, and to apply the electric field between the TFT electrode and the common electrode corresponding to input signals, with the aid of the ON-OFF switching of TFT.

The pair of substrates may preferably be transparent substrates, for which glass, plastic film, optical crystal and so forth may be adoptable.

The distance between the pair of substrates is generally adjusted to 2 to 100 μm or around.

The electric field to be applied generally falls in the range from 1000 to 100000 V/cm or around. It may be good enough to apply the electric field substantially in parallel with the substrates (or normal to the direction of display).

There is no special limitation on the system of applying the electric field, where one simple configuration therefore may be such as assembling two comb-shaped electrodes in a mutually staggered manner on the surface of one substrate. Each comb-shaped electrode preferably has approximately 2 to 100 teeth, a length of approximately 1 to 10000 μm, a width of approximately 1 to 50 μm, and a tooth-to-tooth distance of approximately 1 to 100 μm.

Figure 2:
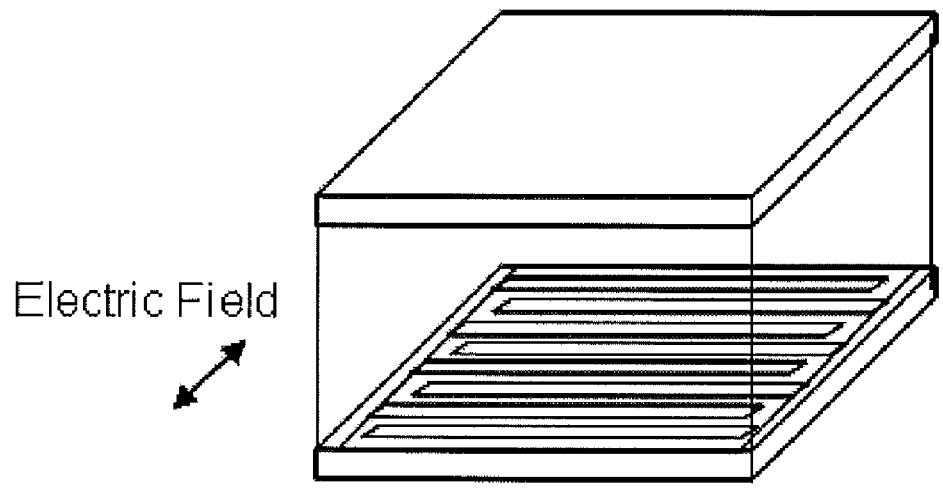
FIG. 2 is a sectional view illustrating an example of a liquid crystal display element adoptable to the present invention.

FIG. 2 illustrates an exemplary configuration of the liquid crystal display element LC illustrated in FIG. 1.

In this configuration, two comb-shaped electrodes 2 are assembled on the same plane of the substrate in a mutually staggered manner, and voltage is applied therebetween so as to produce the electric field normal to the teeth and in parallel with the substrate plane. The other substrate is a glass plate having no electrode formed thereon, and is opposed therewith while placing a spacer such as thin film in between. A gap corresponding to the thickness of the spacer is consequently produced between the pair of substrates, into which a liquid crystal material is injected to manufacture the liquid crystal display element LC.

When voltage is applied between two opposed comb-shaped electrodes, monoaxial refractive index anisotropy generates, while aligning the optical axis thereof in the direction of electric field, or in the direction normal to the teeth.

By disposing the liquid crystal display element LC between two polarizer plates PL1 and PL2, aligning absorption axes 10a and 12a of the individual polarizer plate PL1 and PL2 orthogonal to each other (so-called, crossed Nicol arrangement), and by adjusting the direction of electric field 45° inclined away from the individual absorption axes, the liquid crystal display element LC shows no transmissivity under the absence of the electric field (since the retardation is zero), and allows transmission of light under applied electric field (since the cell having retardation raised therein acts just like a wave plate). As a consequence, the ON-OFF switching of voltage may produce contrast ranging between brightness and darkness. The transmissivity reaches maximum, when the retardation made equal to a half of the wavelength of the transmitted light.

Figure 5:
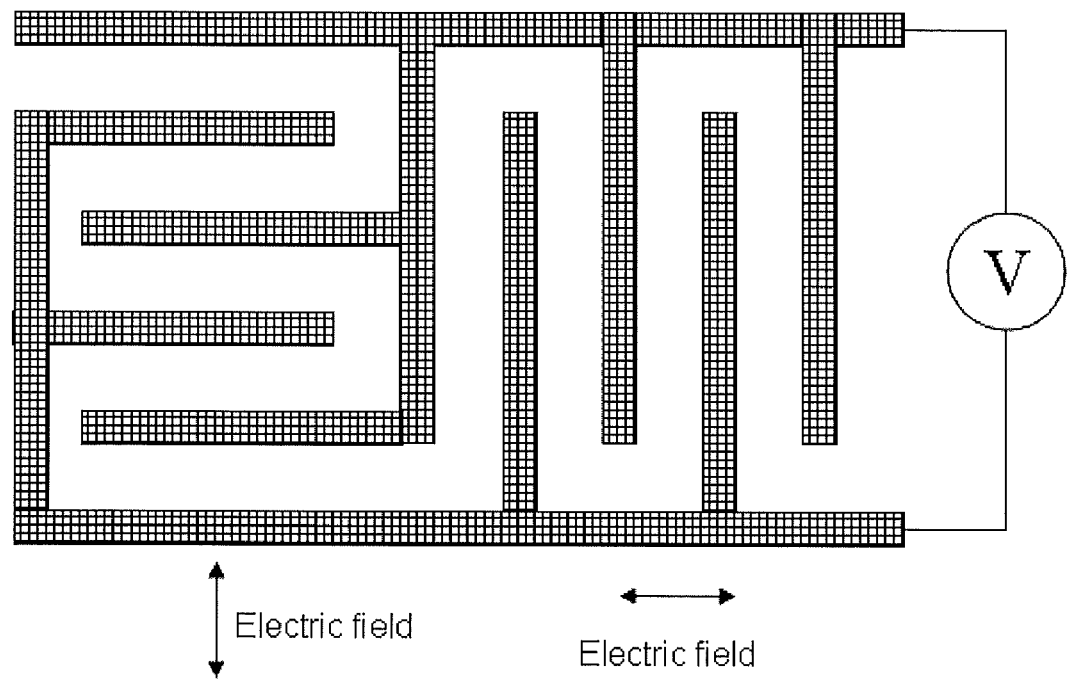
FIG. 5 is a top view of an exemplary configuration of electrodes of the liquid crystal display element adoptable to the present invention.

As has been described in the above, the longitudinal direction of the "comb" of the comb-shaped electrode of the liquid crystal display element LC is most preferably 45° inclined away from the absorption axes 10a and 12a of the polarizer plates PL1 and PL2, in view of maximizing the efficiency of retardation. Provision of two regions of +45° and −45° may be preferable, because domain division may be established under applied voltage, and more uniform display characteristics may be obtained in azimuth directions. For example, an electrode illustrated in FIG. 5 is configured to have two domains on the right half and the left half. Alternatively, two domains may be obtained also by zigzag comb-shaped electrodes illustrated in FIG. 8, described later.

The electrode structure adoptable to the present invention is not specifically limited, so far as it allows switching on the same plane. For example, the electrode structure has, as illustrated by a sectional view in FIG. 3, the common electrode and the pixel electrode, both of which being configured as a comb-shaped electrode, meanwhile the electrode structure has, as illustrated by a sectional view in FIG. 4, an insulating layer placed between a sheet-type common electrode and a comb-shaped pixel electrode.

Figure 7:
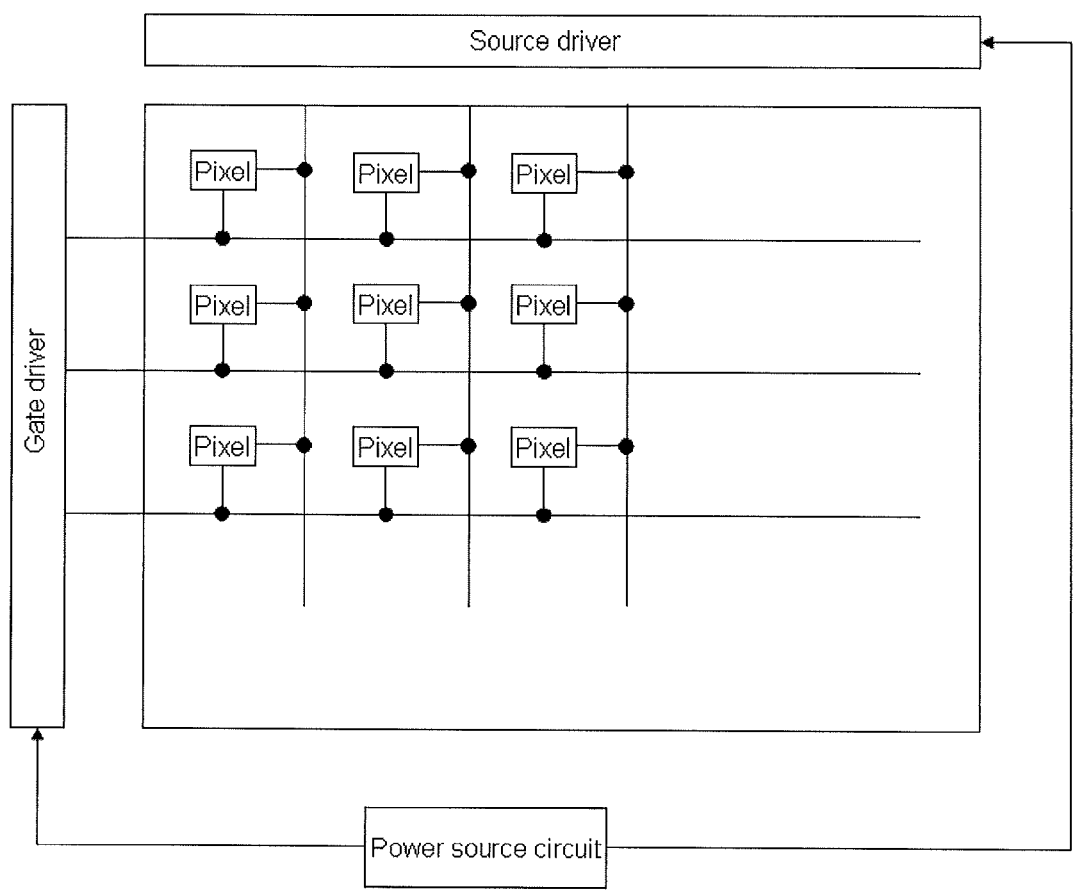
FIG. 7 is a block diagram illustrating an overall configuration of an essential portion of an exemplary display device of the present invention.

FIG. 6A is a sectional view schematically illustrating an overall configuration of an essential portion of the display element according to this embodiment, in the absence of applied voltage (OFF state), and FIG. 6B is a sectional view schematically illustrating an overall configuration of an essential portion of the display element according to this embodiment, in the presence of applied voltage (ON state). FIG. 7 is a block diagram illustrating an exemplary overall configuration of an essential portion of a display device using the display element according to this embodiment. The display element of this configuration is used while being provided to a display device together with a drive circuit.

The display device illustrated in FIG. 7 has a display element having pixels arranged therein to form a matrix, a source driver and a gate driver as the drive circuits, a power source circuit and so forth.

The display element is further provided with a plurality of data signal lines, and a plurality of scanning signal lines respectively crossing the individual data signal lines, wherein every combination of each data signal line and each scanning signal line is provided with a pixel.

The power source circuit supplies the source driver and the gate driver with voltage necessary for giving display on the display element, thereby the source driver drives the data signal lines of the display element, and the gate driver drives the scanning signal lines of the display element.

Each pixel is provided with a switching element not illustrated. FET (field effect transistor) or TFT (thin film transistor) may typically be adoptable to the switching element, wherein the gate electrode of the switching element is connected to each scanning signal line, the source electrode is connected to each data signal line, and the drain electrode is connected to each pixel electrode not illustrated. In this configuration, when scanning signal lines are selected in the individual pixels, the switching elements turn on, and thereby signal voltage determined based on display data signals input from an unillustrated controller is applied by the source driver through the data signal lines to the display element. Over a duration of time in which the switching elements are kept disconnected after completion of the selection period of the scanning signal lines, the display element ideally keeps the voltage achieved at the time of disconnection.

In this embodiment, the display element is configured to produce display by using a medium [liquid crystalline media (liquid crystal materials), dielectric substances] capable of exhibiting optical isotropy (which may be sufficient from a macroscopic and specific point of view, if the isotropy is observed over the visible light region, or more specifically on the scale of wavelength of visible light, or still on a larger scale) in the presence or absence of electric field (voltage).

The display element illustrated in FIGS. 6A and 6B has a pair or substrates opposed with each other, as a means for holding the medium (a means for holding optical modulation layer); a medium layer composed of a medium (referred to as medium "A", hereinafter) optically modulated under applied voltage, and held between the pair of substrates; and polarizer plates respectively provided outside the pair of substrates, that is, on the surfaces of both substrates opposite to those opposed with each other.

Figure 8:
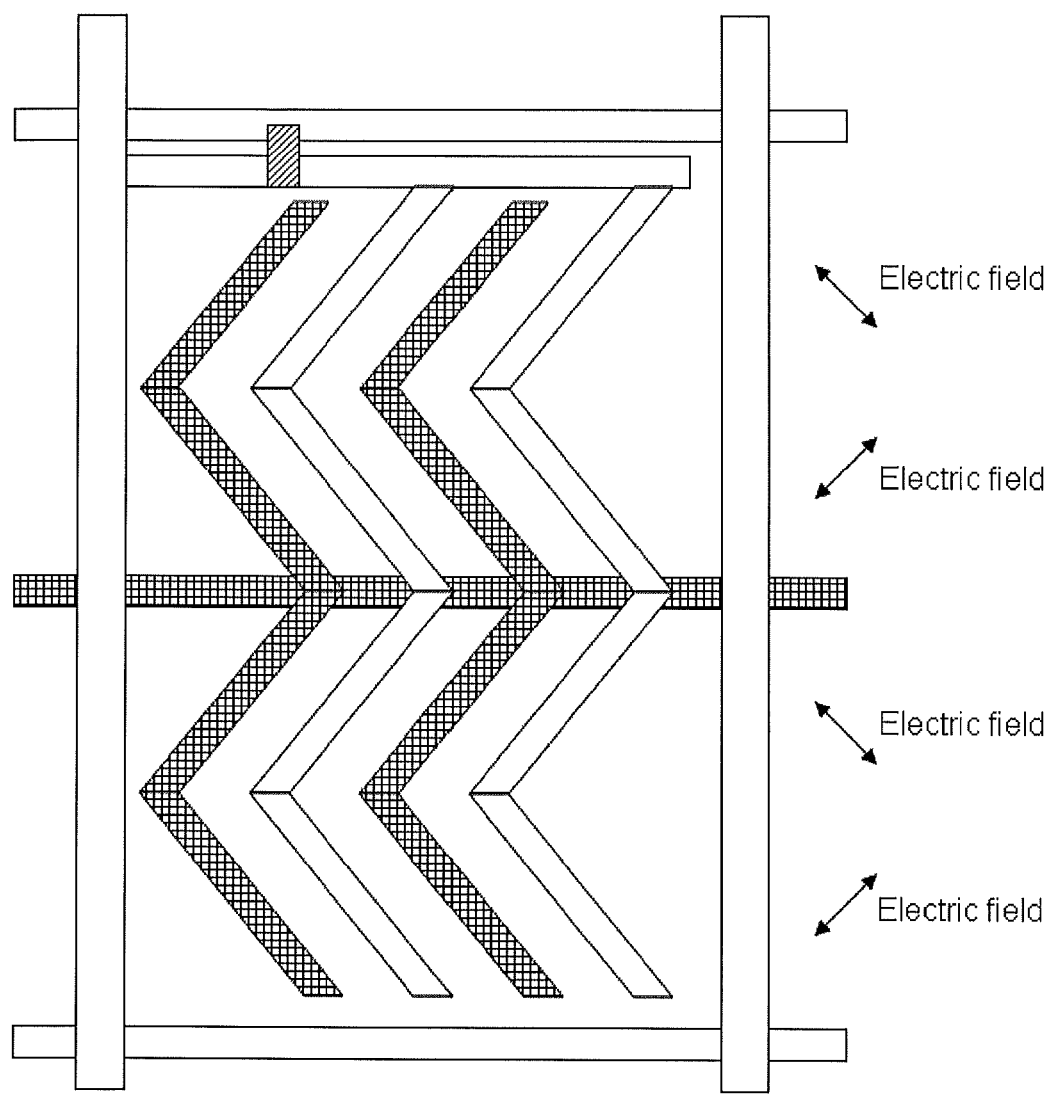
FIG. 8 is a top view illustrating an exemplary configuration of electrodes of the liquid crystal display element adoptable to the present invention.

At least one of the pair of substrates has transmissivity of light, and may be composed of a transparent substrate such as a glass substrate or the like. On one substrate of the pair of substrates, and on the surface thereof opposed with the other substrate, the comb-shaped electrodes, capable of applying an electric field nearly in parallel with the substrate 1 (transverse electric field) as illustrated in FIG. 6B to the medium layer, may be disposed as a means for applying electric field (electric field application component), so that the tooth portions (comb-shaped electrode) are engaged with each other as illustrated in FIG. 5. Alternatively, zigzag comb-shaped electrodes are oppositely disposed as illustrated in FIG. 8.

The comb-shaped electrodes are typically composed of an electrode material such as transparent electrode material including ITO (indium tin oxide), and are adjusted to 5 µm in the line width, 5 µm in the electrode-to-electrode distance (electrode distance), and 0.3 µm in the thickness. Note that the electrode material, and the above-described values of the line width, the electrode distance and the thickness are merely exemplary ones, without limiting the present invention.

In a typical process of manufacturing the display element, the substrate having the comb-shaped electrode formed thereon is bonded with the other substrate, using a sealing material not illustrated, while optionally placing unillustrated spacers such as plastic beads, glass fibers or the like, and a liquid crystal layer is formed therebetween.

The liquid crystal adoptable to this embodiment is a medium variable in the degree of optical anisotropy under applied voltage. A substance externally applied with electric field $E_j$ produces electric displacement $D_{ij}=\in_{ij}\cdot E_j$, and concomitantly produces a slight change in the dielectric constant ($\in_{ij}$). Since refractive index (n) squared is equivalent to dielectric constant at frequencies of light, the medium "A" may be said also as a substance causing changes in the refractive index under applied voltage.

The conventional liquid crystal display elements were such as those giving display, while making use of only changes in the direction of alignment of liquid crystal molecules based on rotation induced by applied voltage as described in the above. The response speed has therefore been largely affected by the inherent viscosity of the liquid crystal, since the liquid crystal molecules rotate altogether, while keeping their uniform state of alignment unchanged. In contrast, the liquid crystal display device of this embodiment gives display making use of changes in the degree of optical anisotropy of the medium. Accordingly, the response speed is no more largely affected by the inherent viscosity of liquid crystal, unlike the conventional liquid crystal display elements, and thereby rapid response may be realized. The liquid crystal display device of this embodiment is applicable also typically to display devices based on the field sequential color system, by virtue of its rapid response nature.

Next, the transparent film (reference numerals 14 and 16 in FIG. 1) adoptable to the present invention will be explained.

The transparent film of the present invention preferably functions also as the protective film of the polarizer plate, from the viewpoint of thinning of the liquid crystal display device. Therefore, according to the invention, the polymer films formed of various materials, which can be used as a protective film, may be used as the transparent film.

[Cellulose Acylate-Base Film]

Cellulose acylate-base films are preferable as the first or second transparent film from the viewpoint of adoptability to processing of the polarizer plate. By adding the retardation reducing agent described later, the cellulose acylate-base films satisfying the optical properties, or, in other words, low Re and low Rth, which the first transparent film is required to have, may be prepared. Furthermore, by adding the wavelength-dispersion controlling agent described later, the cellulose acylate-base films showing the desired wavelength-dispersion characteristics of Re and Rth, or, in other words, |Re(400)−Re(700)| of not more than 10 nm and |Rth(400)−Rth(700)| of not more than 35 nm, may be prepared.

On the other hand, by adding the retardation enhancer described later and/or by carrying out stretching treatment, the cellulose acylate-base polymers showing an optical biaxiality or uniaxiality may be prepared, and such cellulose acylate films may be used as the second transparent film.

The cellulose material for cellulose acylate includes cotton liter and wood pulp (hardwood pulp, softwood pulp), and cellulose acylate obtained from any such cellulose material is usable herein. As the case may be, those cellulose materials may be mixed for use herein. The cellulose materials are described in detail, for example, in Marusawa & Uda's "Plastic Material Lecture (17), Cellulose Resin" by Nikkan Kogyo Shinbun (1970) and Hatsumei Kyokai's Disclosure Bulletin 2001-1745 (pp. 7-8), and those celluloses described therein may be usable herein. However, there should not be any specific limitation to the cellulose acylate.

Cellulose acylate to be produced from the above-mentioned cellulose material is described. Cellulose acylate is produced by acylating the hydroxyl group in cellulose, in which the substituent acyl group may have from 2 carbon atoms (acetyl group) to 22 carbon atoms. In cellulose acylate, the degree of substitution of the hydroxyl group in cellulose is not specifically defined. Concretely, the degree of substitution may be calculated by measuring the bonding degree of acetic acid and/or fatty acid having from 3 to 22 carbon atoms substituted for the hydroxyl group in cellulose. It may be measured according to the method of ASTM D-817-91.

As so mentioned hereinabove, the degree of substitution of the hydroxyl group in cellulose to give cellulose acylate is not specifically defined. Preferably, however, the degree of acyl substitution of the hydroxyl group in cellulose is from 2.50 to 3.00, more preferably from 2.75 to 3.00, even more preferably from 2.85 to 3.00.

Of acetic acid and/or fatty acid having from 3 to 22 carbon atoms to be introduced in the place of a hydrogen atom of the hydroxyl group in cellulose, the acyl group having from 2 to 22 carbon atoms may be an selected from aliphatic groups or aromatic groups, not specifically defined. One or more different types of such acids may be used for the substitution either singly or as combined. The cellulose acylate includes, for example, alkylcarbonyl esters, alkenylcarbonyl esters, aromatic carbonyl esters and aromatic alkylcarbonyl esters of cellulose, which may be further substituted. Preferred examples of the acyl group are acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Of those, more preferred are acetyl, propionyl, butanoyl, dodecanoyl, octadecanoyl, t-butanoyl, oleoyl, benzoyl, naphthylcarbonyl and cinnamoyl; and even more preferred are acetyl, propionyl and butanoyl.

When the acyl substituent to be substituted for the hydroxyl group in cellulose is substantially at least two types selected from acetyl group, propionyl group and butanoyl group and when the overall degree of substitution with it is from 2.50 to 3.00, then the optical anisotropy of the cellulose acylate-base film may be lowered. Therefore, for preparing the cellulose acylate film to be used as the first transparent film, using cellulose acylate whose degree of acyl substitution is from 2.60 to 3.00 (even more preferably from 2.65 to 3.00) is preferable. For preparing the cellulose acylate film to be used as the second transparent film, the types and the degree of acyl substitution may be decided depending on the desired optical properties. For example, for preparing the cellulose acylate film to be used as the second transparent film, any cellulose acylate having an aromatic group such as phenyl may be used.

The degree of polymerization of the cellulose acylate preferably used in the invention is from 180 to 700 in terms of the viscosity-average degree of polymerization thereof. Concretely, the viscosity-average degree of polymerization of cellulose acetate is from 180 to 550, more preferably from 180 to 400, even more preferably from 180 to 350. If having a too high degree of polymerization, the viscosity of the dope solution of the cellulose acylate may increase, and the film formation from it by casting may be difficult. If, however, the polymer has a too low degree of polymerization, then the strength of the film formed from it may lower. The mean degree of polymerization may be determined according to an Uda et al's limiting viscosity method (Kazuo Uda, Hideo Saito; *the Journal of the Textile Society of Japan*, Vol. 18, No. 1, pp. 105-120, 1962). It is described in detail in JPA NO. 9-95538.

The molecular weight distribution of the cellulose acylate preferably used in the invention may be determined through gel permeation chromatography, and it is desirable that the polydispersion index Mw/Mn (Mw is a mass-average molecular weight, and Mn is a number-average molecular weight) of the polymer is smaller and the molecular weight distribution thereof is narrower. Concretely, the value of Mw/Mn of the polymer preferably falls between 1.0 and 3.0, more preferably between 1.0 and 2.0, most preferably between 1.0 and 1.6.

When a low-molecular component is removed from it, then the mean molecular weight (degree of polymerization) of the cellulose acylate may increase but the viscosity thereof may be lower than that of ordinary cellulose acylate, and therefore the cellulose acylate of the type is favorable. The cellulose acylate having a reduced low-molecular content may be obtained by removing a low-molecular component from cellulose acylate produced in an ordinary method. For removing the low-molecular component from it, cellulose acylate may be washed with a suitable organic solvent. When the cellulose acylate having a reduced low-molecular content is produced, it is desirable that the amount of the sulfuric acid catalyst in acetylation is controlled to fall between 0.5 and 25 parts by mass relative to 100 parts by mass of cellulose. The amount of the sulfuric acid catalyst falling within the range is preferred in that the cellulose acylate produced may have a preferred (uniform) molecular weight distribution. In forming it into films, the cellulose acylate preferably has a water content of at most 2% by mass, more preferably at most 1% by mass, even more preferably at most 0.7% by mass. It is known that cellulose acylate generally contain water and its water content is from 2.5 to 5% by mass. In order that the cellulose acylate for use in the invention is made to have the preferred water content as above, it must be dried. The method of drying it is not specifically defined so far as the dried polymer may have the desired water content. The cellulose acylate for use in the invention, the cellulose material for it and the method for producing it are described in detail in Hatsumei Kyokai's Disclosure Bulletin No. 2001-1745 (issued Mar. 15, 2001), pp. 7-12.

One or more different types of cellulose acylates may be used herein either singly or as combined.

At least one selected from various additives (e.g., optical anisotropy-reducing compound, wavelength dispersion-controlling agent, UV inhibitor, plasticizer, antioxidant, fine particles, optical properties-controlling agent) may be added to the cellulose acylate-base films. For preparing the cellulose acylate-base film to be used as the first transparent film having low Re and low Rth, using at least one compound capable of reducing the optically anisotropy is preferable. Examples of such a compound include those satisfying the following conditions.

$$(Rth_{(A)} - Rth_{(0)})/A \leq -1.0$$

$$0.01 \leq A \leq 30$$

In the condition, "$Rth_{(A)}$" indicates Rth (nm) of a film containing a compound capable of reducing optically anisotropy in the amount of "A" %; "$Rth_{(0)}$" indicates Rth(nm) of a film not containing the compound at all; and "A" indicates the percentage (%) by mass of the compound to the mass of the major polymer contained in the film.

The compound capable of reducing optically anisotropy preferably satisfies the following conditions.

$$(Rth_{(A)} - Rth_{(0)})/A \leq -2.0$$

$$0.1 \leq A \leq 20$$

The optical anisotropy-reducing compound may be selected from the compounds which are well miscible with the polymer and itself do not have a rod-like structure and a flat structure. Concretely, when the compound has plural flat functional groups such as aromatic groups, then it is advantageous that the structure of the compound is so designed that it may have the functional groups not in the same plane but in a non-plane.

For preparing the cellulose acylate-base film to be used as the first transparent film, a compound capable of inhibiting the polymer in the film from being aligned in the in-plane direction and in the thickness direction to thereby lower optical anisotropy of the film may be added thereto, as so mentioned in the above. Preferably, the compound has an octanol-water partition coefficient (log P value) of from 0 to 7. The compound having a log P value of larger than 7 is poorly miscible with polymer, and it may whiten the film formed or may make the film dusty. On the other hand, the compound having a log P value of smaller than 0 is highly hydrophilic and it may worsen the waterproofness of the film formed. More preferably, the log P value of the compound is from 1 to 6, even more preferably from 1.5 to 5.

The octanol-water partition coefficient (log P value) may be determined according to the flask dipping method described in JIS, Nippon Industrial Standards Z7260-107 (2000). In place of actually measuring it, the octanol-water partition coefficient (log P value) may be estimated according to a calculative chemical method or an experiential method. For the calculative method, preferred are a Crippen's fragmentation method (*J. Chem. Inf. Comput. Sci.*, 27, 21 (1987)), a Viswanadhan's fragmentation method (*J. Chem. Inf. Comput. Sci.*, 29, 163 (1989)), a Broto's fragmentation method (*Eur J. Med. Chem.—Chim. Theor*, 19, 71 (1984)); and more preferred is a Crippen's fragmentation method (*J. Chem. Inf. Comput. Sci.*, 27, 21 (1987)). When a compound has different log P values, depending on the measuring method or the computing method employed, then the compound may be judged as to whether or not it falls within the scope of the invention preferably according to the Crippen's fragmentation method.

The compound capable of reducing optical anisotropy may or may not have an aromatic compound. Preferably, the compound capable of reducing optical anisotropy has a molecular weight of from 150 to 3000, more preferably from 170 to 2000, even more preferably from 200 to 1000. Having a molecular weight that falls within the range, the compound may have a specific monomer structure or may have an oligomer structure or a polymer structure that comprises a plurality of such monomer units bonded.

The compound capable of reducing optical anisotropy is preferably liquid at 25° C. or a solid having a melting point of from 25 to 250° C., more preferably liquid at 25° C. or a solid having a melting point of from 25 to 200° C. Also preferably, the compound capable of reducing optical anisotropy does not vaporize in the process of dope casting and drying for film formation.

The amount of the optical anisotropy-reducing compound to be added to the film is preferably from 0.01 to 30% by mass of the solid content (essentially the polymer) of the film, more preferably from 1 to 25% by mass, even more preferably from 5 to 20% by mass.

When the film is formed from a polymer solution (dope), the compound may be added anytime while the dope is prepared. For example, it may be added to the dope finally in the process of preparing the dope.

Regarding the content of the optical anisotropy-reducing compound in the transparent film, the mean content of the compound in the part of 10% of the overall thickness from the surface of at least one side of the film is from 80 to 99% of the mean content of the compound in the center part of the film. The amount of the compound existing in the film of the invention may be determined by measuring the amount of the compound in the surface area and in the center part of the compound, according to a method of infrared spectrometry as in JPA No. 8-57879.

Examples of the compound capable of reducing optically anisotropy include formula (13) below.

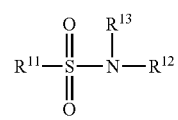

Formula (13)

In formula (13), $R^{11}$ represents an alkyl group or an aryl group; $R^{12}$ and $R^{13}$ each independently represent a hydrogen atom, an alkyl group or an aryl group. Especially preferably, the number of all carbon atoms of $R^{11}$, $R^{12}$ and $R^{13}$ is at least 10. The alkyl group and the aryl group may have a substituent. For the substituent, preferred examples include a fluorine atom, an alkyl group, an aryl group, an alkoxy group, a sulfone group and a sulfonamido group; and more preferred examples include an alkyl group, an aryl group, an alkoxy group, a sulfone group and a sulfonamido group. The alkyl group may be straight, branched or cyclic, preferably having from 1 to 25 carbon atoms, more preferably from 6 to 25 carbon atoms, especially preferably from 6 to 20 carbon atoms (e.g., methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl, didecyl). The aryl group preferably has from 6 to 30 carbon atoms, more preferably from 6 to 24 carbon atoms (e.g., phenyl, biphenyl, terphenyl, naphthyl, binaphthyl, triphenylphenyl). Preferred examples of the compounds of formula (13) are mentioned below, to which the invention should not be limited.
A-1
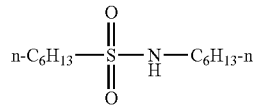
A-2
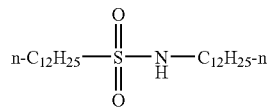
A-3
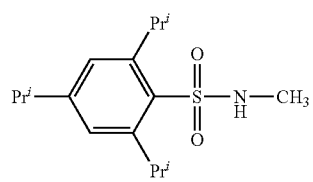
A-4
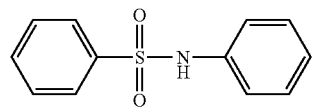
A-5
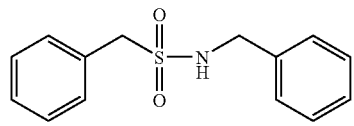
A-6
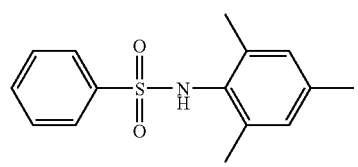
A-7
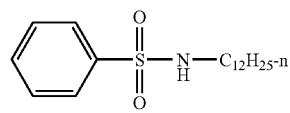
A-8
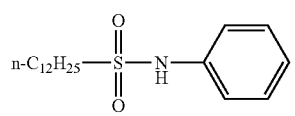
A-9
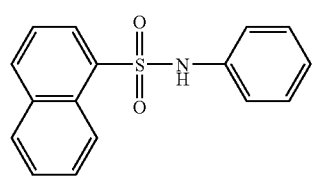
A-10
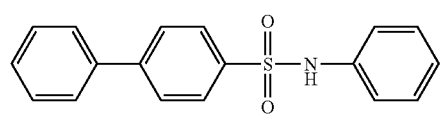
A-11
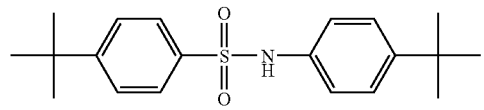
-continued
A-12
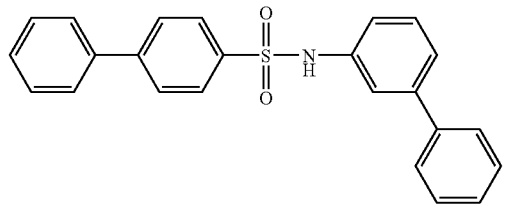
A-13
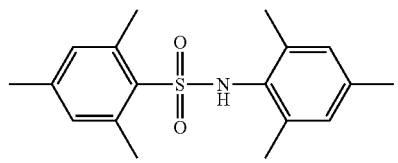
A-14
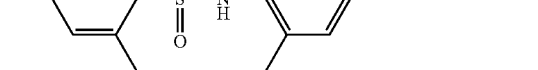
A-15
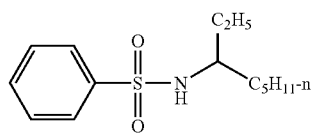
A-16
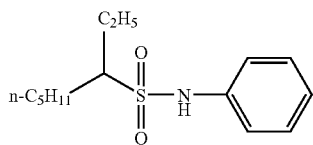
A-17
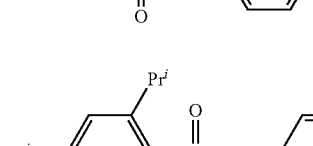
A-18
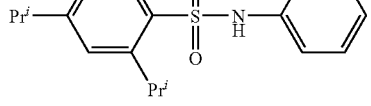
A-19
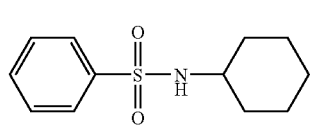
A-20
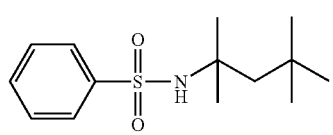
A-21
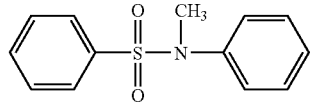

A-22
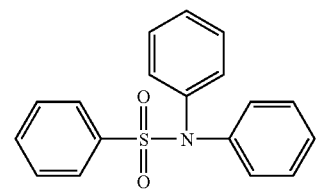
A-23
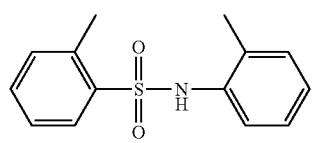
A-24
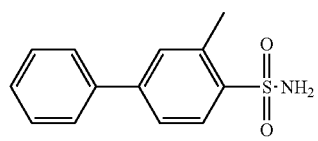
A-25
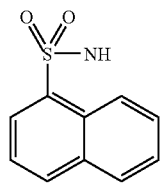
A-26
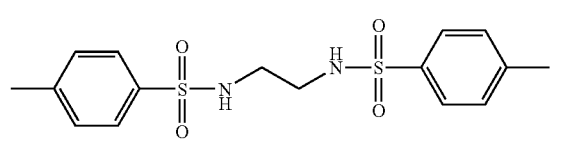
A-27
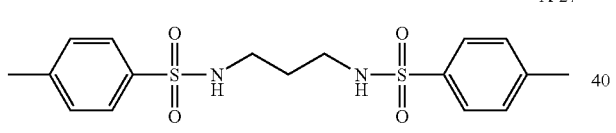
A-28
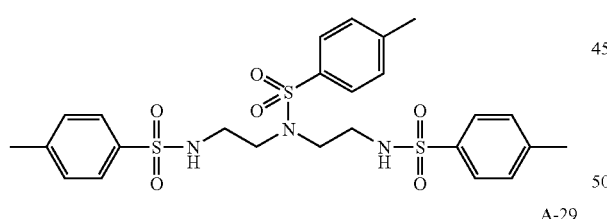
A-29
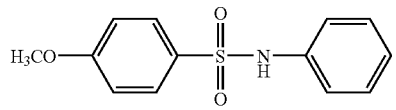
A-30
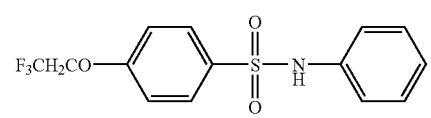
A-31
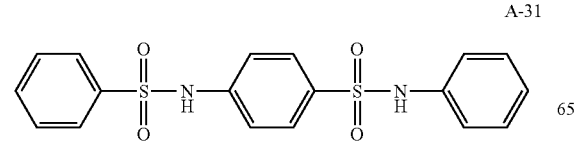
A-32
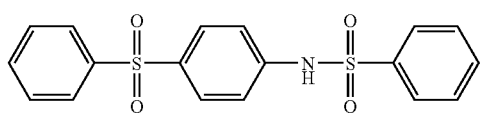
A-33
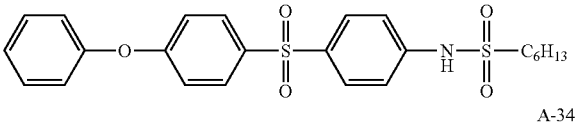
A-34
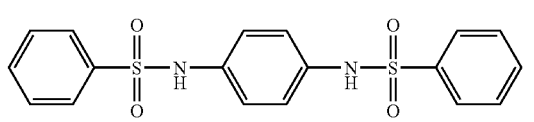
A-35
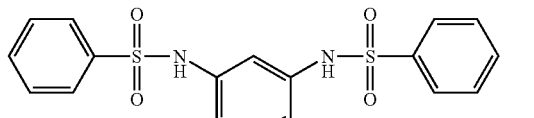
A-36
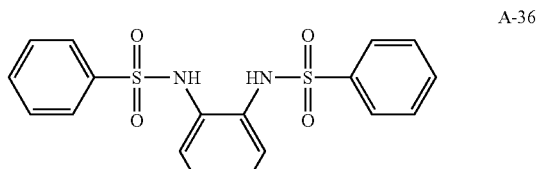
A-37
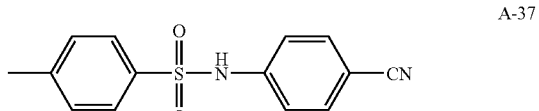
A-38
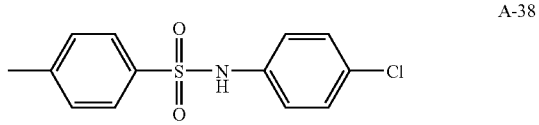
A-39
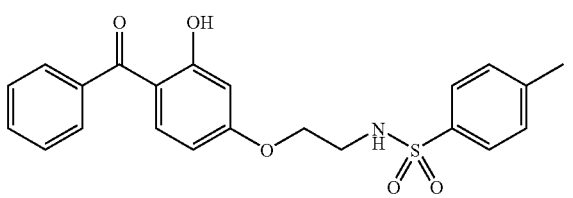
A-40
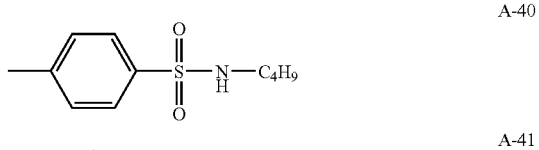
A-41
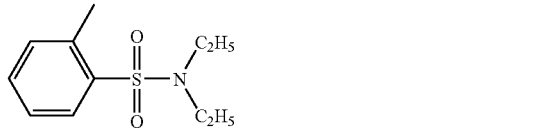
A-42
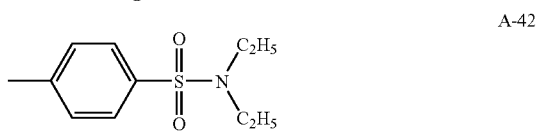
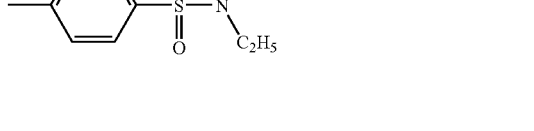

mido group; more preferred are an alkyl group, an aryl group, an alkoxy group, a sulfone group, and a sulfonamido group.

Among the compounds represented by formula (18), compounds represented by formula (19) are preferable.

Formula (19)

$$R^{114}-\overset{O}{\underset{}{C}}-\underset{\underset{R^{115}}{|}}{N}-R^{116}$$

In formula (19), $R^{114}$, $R^{115}$ and $R^{116}$ each independently represent an alkyl group or an aryl group. The alkyl group may be straight, branched or cyclic; and the aryl group may be phenyl.

Examples of the compound represented by formula (18) or (19) include, however are not limited to, those shown below. In the formulae, "Bu$^i$" indicates isobutyl.

Examples of the compound capable of reducing optically anisotropy include formula (18) below.

Formula (18)

$$R^{14}-\overset{O}{\underset{}{C}}-\underset{\underset{R^{15}}{|}}{N}-R^{16}$$

In formula (18), $R^{14}$ represents an alkyl group or an aryl group; $R^{15}$ and $R^{16}$ each independently represent a hydrogen atom, an alkyl group or an aryl group. $R^{14}$ preferably represents phenyl or cycloalkyl. $R^{15}$ and $R^{16}$ each represent phenyl or alkyl. The alkyl group may be straight, branched or cyclic These groups may have at least one substituent. For the substituent, preferred are a fluorine atom, an alkyl group, an aryl group, an alkoxy group, a sulfone group, and a sulfona- FA-9
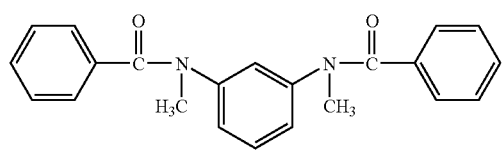
FA-10
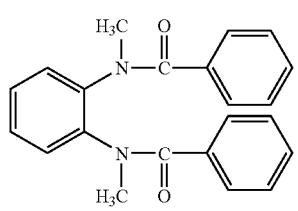
FA-11
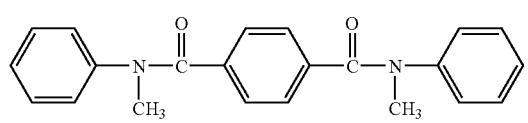
FA-12
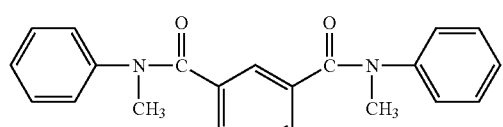
FA-13
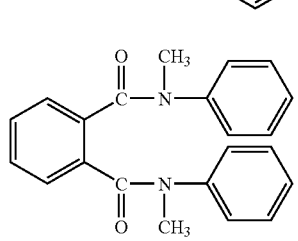
FA-14
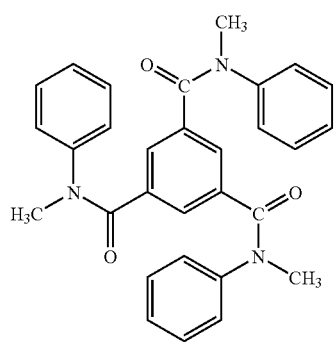
FA-15
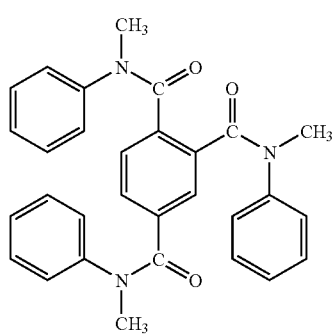
FA-16
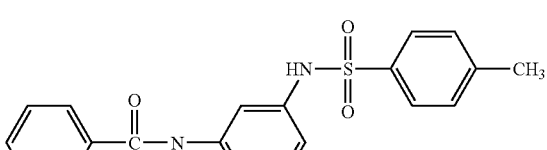
FA-17
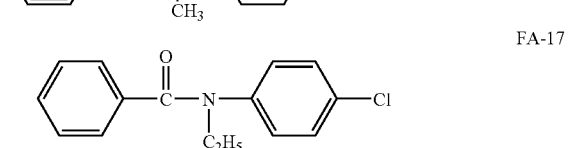
FA-18
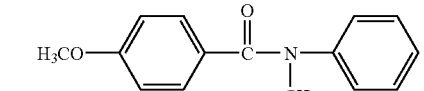
FA-19
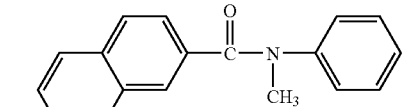
FA-20
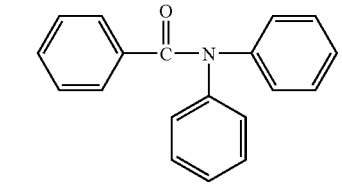
FA-21
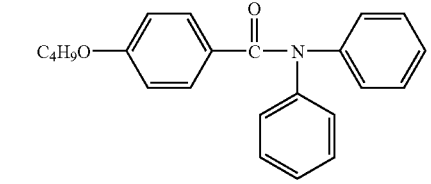
FA-22
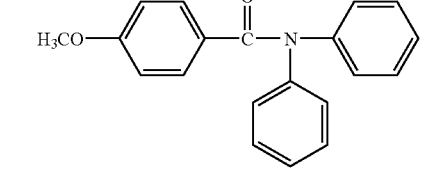
FA-23
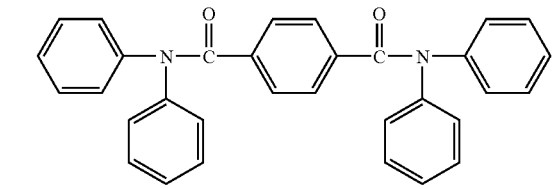
FA-24
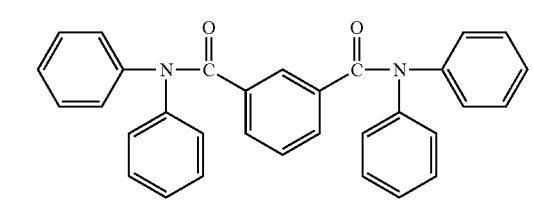

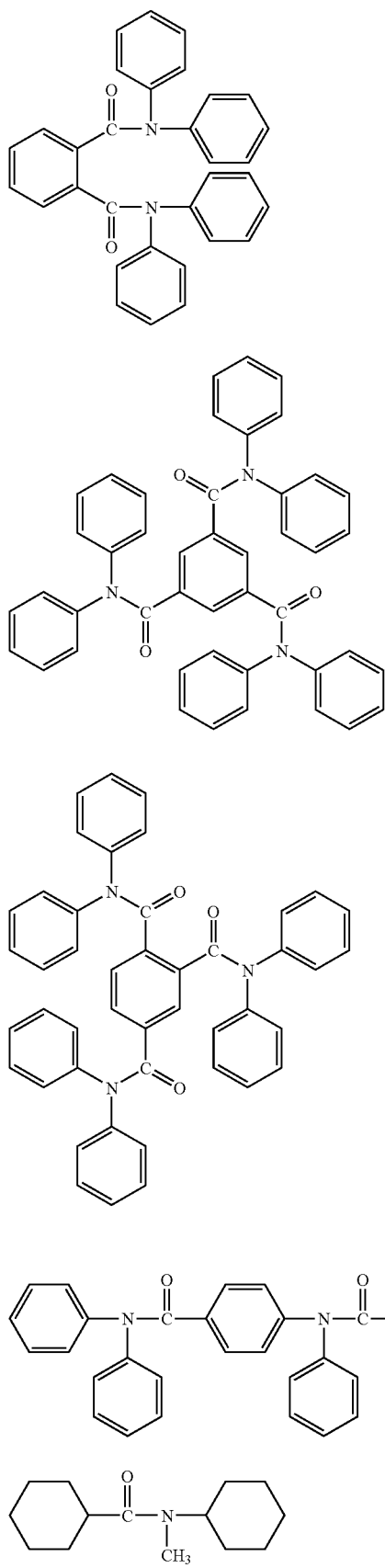

FB-12
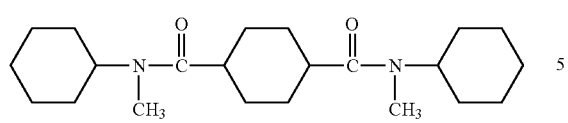
FB-13
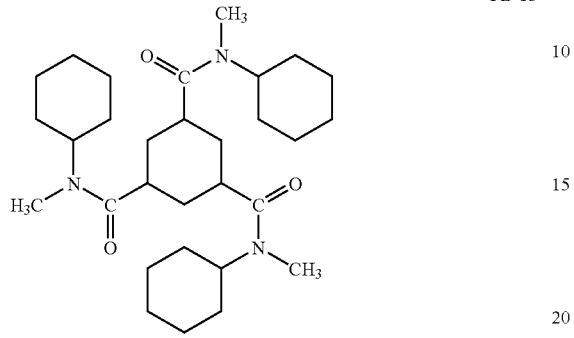
FB-14
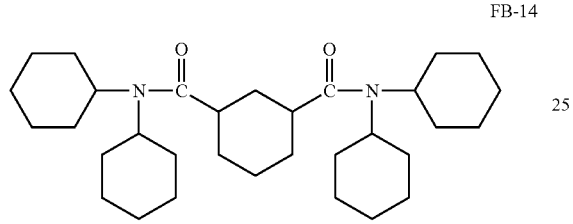
FB-15
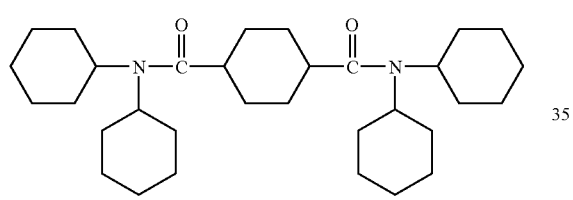
FB-16
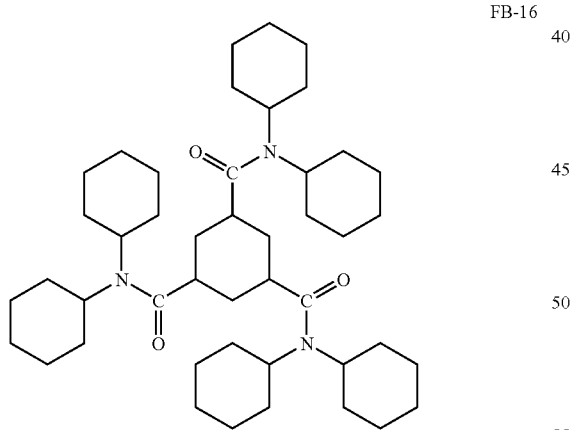
FB-17
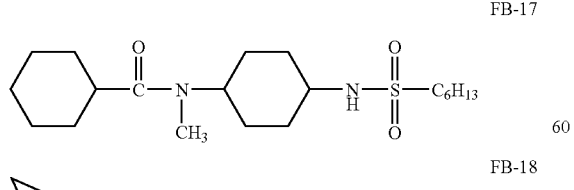
FB-18
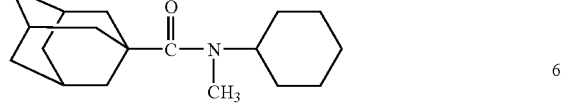
FB-19
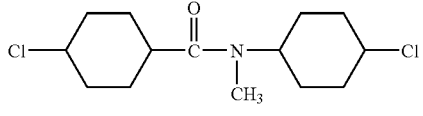
FB-20
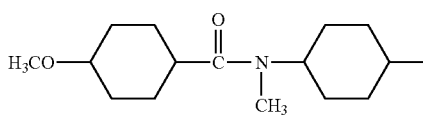
FB-21
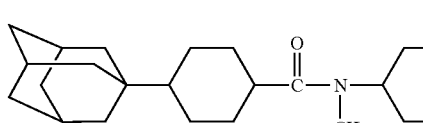
FB-22
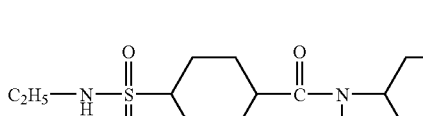
FB-23
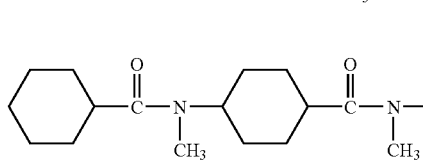
FB-24
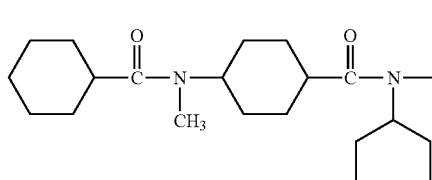
FC-1
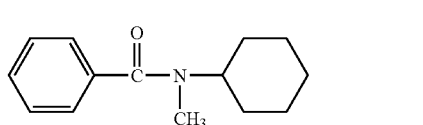
FC-2
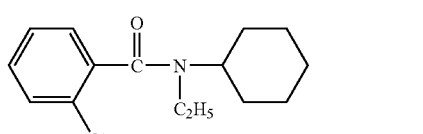
FC-3
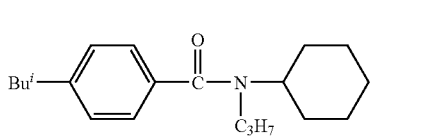
FC-4
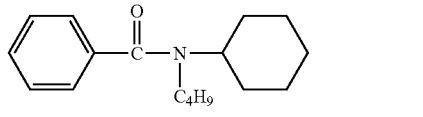
FC-5
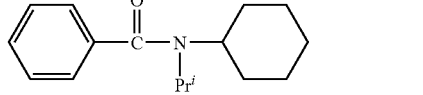

FC-6
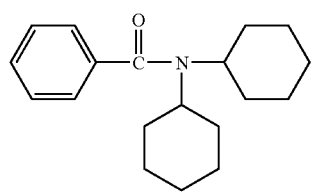
FC-7
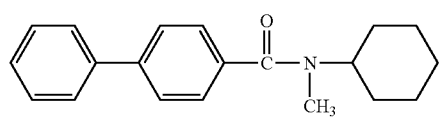
FC-8
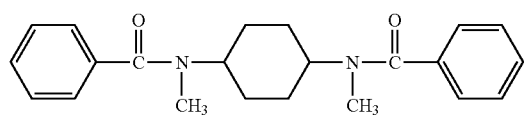
FC-9
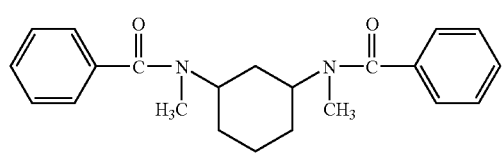
FC-10
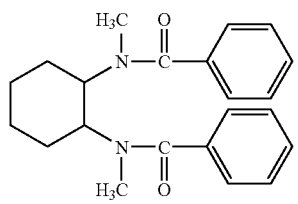
FC-11
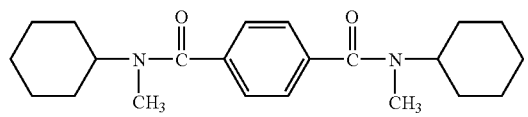
FC-12
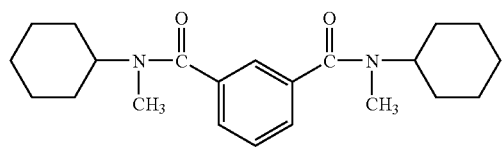
FC-13
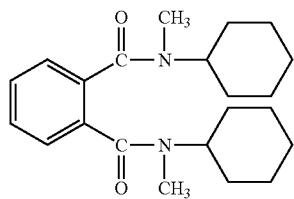
FC-14
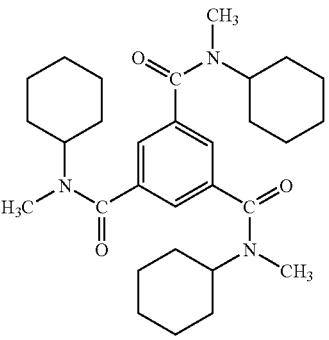
FC-15
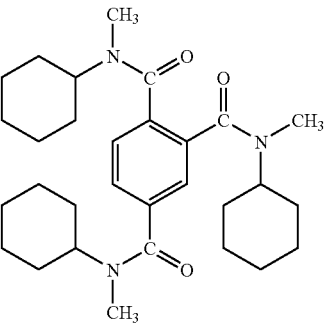
FC-16
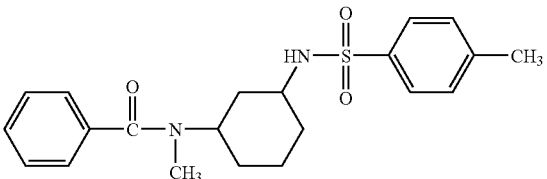
FC-17
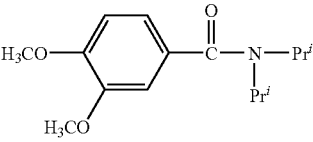
FC-18
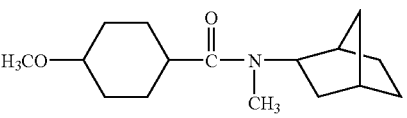
FC-19
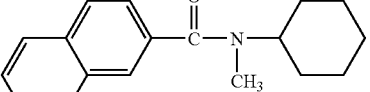
FC-20
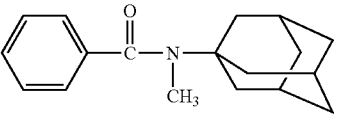

FC-21
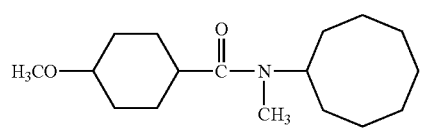
FC-22
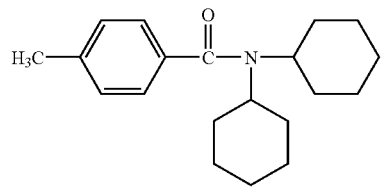
FC-23
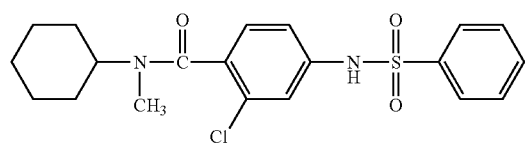
FC-24
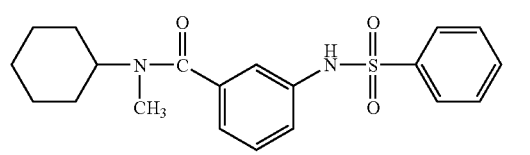
FC-25
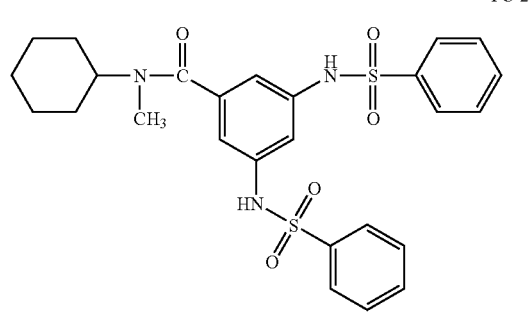
FD-1
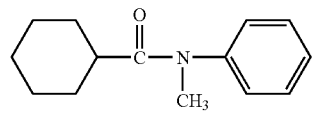
FD-2
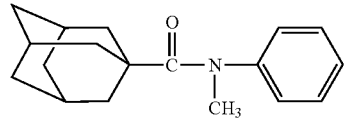
FD-3
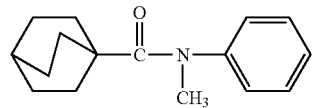
FD-4
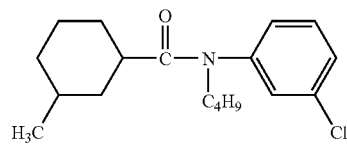
FD-5
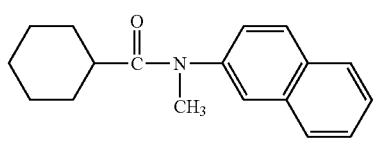
FD-6
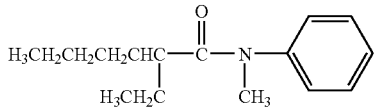
FD-7
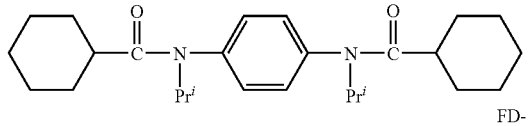
FD-8
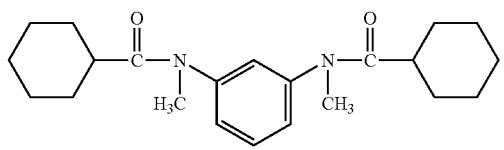
FC-9
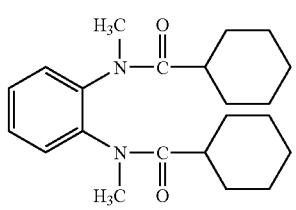
FD-10
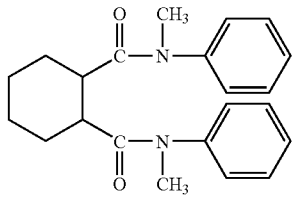
FD-11
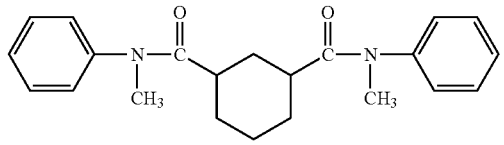
FD-12
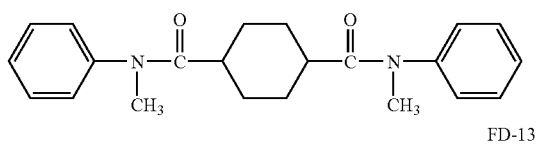
FD-13
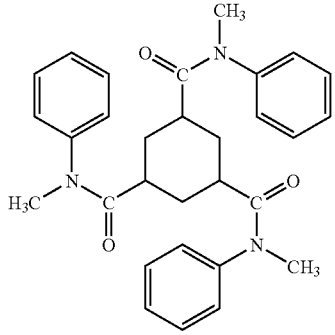

FD-14
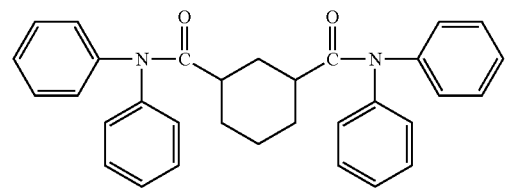

FD-15
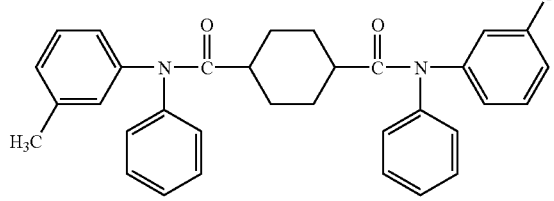

FD-16
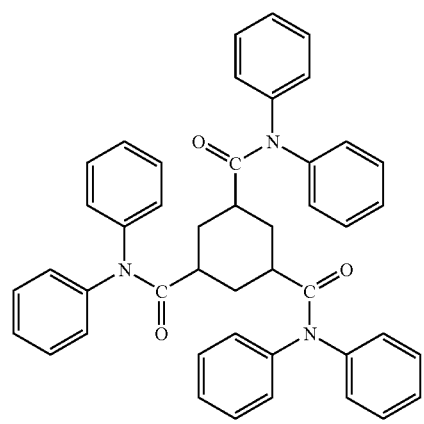

FD-17
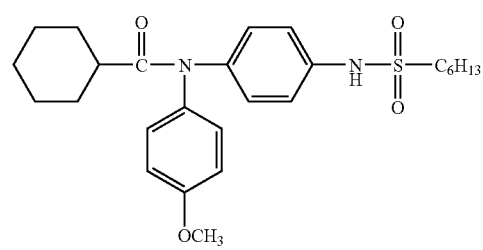

FD-18
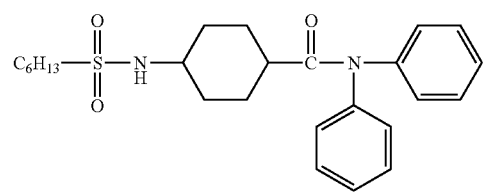

FD-19
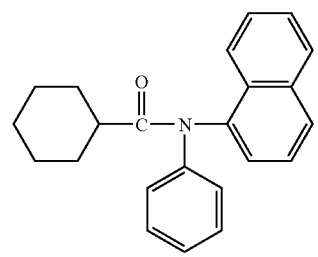

FD-20
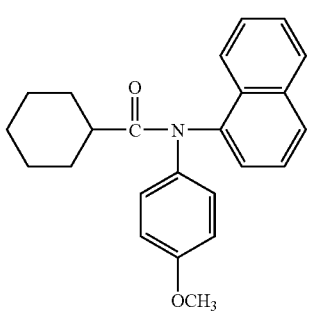

FD-21

FD-22
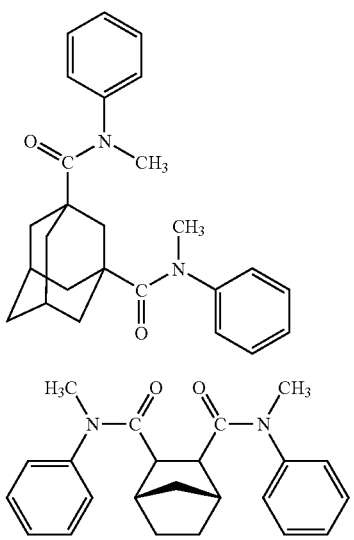

For preparing the cellulose acylate film to be used as the first transparent film, using at least one compound capable of moderating the wavelength dispersion of retardation is preferable. Such a compound is occasionally referred to as "wavelength dispersion-controlling agent" hereinafter. For adjusting the wavelength dispersion characteristics to the above mentioned preferable range, any compound satisfying the conditions below may be used.

$$(\Delta Rth_{(B)} - \Delta Rth_{(0)})/B \leq -2.0$$

$$0.01 \leq B \leq 30$$

It is to be noted that ΔRth is defined as ΔRth=|Rth(400)−Rth(700)|; "ΔRth$_{(B)}$" indicates ΔRth (nm) of a film containing a compound capable of moderating the wavelength dispersion characteristic of retardation in the amount of "B" %; "Rth$_{(0)}$" indicates ΔRth (nm) of a film not containing the compound at all; and "B" indicates the percentage (%) by mass of the compound to the mass of the major polymer contained in the film.

The compound capable of moderating the wavelength dispersion characteristic of retardation more preferably satisfies the following conditions.

$$(\Delta Rth_{(B)} - \Delta Rth_{(0)})/B \leq -3.0$$

$$0.05 \leq B \leq 25$$

The compound capable of moderating the wavelength dispersion characteristic of retardation even more preferably satisfies the following conditions.

$$(\Delta Rth_{(B)} - \Delta Rth_{(0)})/B \leq -4.0$$

$$0.1 \leq B \leq 20$$

The wavelength dispersion-controlling agent may be selected from any compounds which have a absorption peak within the ultraviolet region of from 200 to 400 nm and is capable of reducing both of the values of |Re(400)−Re(700)| and |Rth(400)−Rth(700)|; and such a compound may be added with an amount of from 0.01 to 30% by mass with respect to the solid content of cellulose acylate.

In particular, Re and Rth of a polymer, cellulose acetate that is preferred for the transparent film are characterized in that their wavelength dispersion is generally larger on the long wavelength side than on the short wavelength side. Accordingly, the wavelength dispersion of the film can be smoothed by increasing the relatively small values of Re and Rth on the short wavelength side. On the other hand, a compound having an absorption in a UV region of from 200 to 400 nm is characterized in that its wavelength dispersion of absorbance is larger on the long wavelength side than on the short wavelength side. When the compound itself is isotropically exists inside the transparent film, then the birefringence of the compound itself and therefore the wavelength dispersion of Re and Rth may be larger on the short wavelength side, like the wavelength dispersion of absorbance of the film.

Accordingly, when a compound which has an absorption in a UV region of from 200 to 400 nm and of which the wavelength dispersion of Re and Rth would be larger on the short wavelength side is used in a transparent film, then the wavelength dispersion of Re and Rth of the transparent film could be controlled. For this, the compound having the ability to control the wavelength dispersion must be fully uniformly miscible with the polymer for the film. Preferably, the absorption band range in the UV region of the compound falls between 200 and 400 nm, more preferably between 220 and 395 nm, even more preferably between 240 and 390 nm.

The compound to be used as the wavelength dispersion-controlling agent may be required not to increase a spectral transmittance of a film. it is desired that the cellulose acylate film to be used as the transparent film may have good spectral transmittance. Preferably, the transparent film has a spectral transmittance of from 45% to 95% at a wavelength of 380 nm, and a spectral transmittance of at most 10% at a wavelength of 350 nm.

Preferably, the wavelength dispersion-controlling agent is not volatile in any stage of formation of the transparent film.

From the viewpoint of its volatility, it is desirable that the wavelength dispersion-controlling agent that is preferably used in the invention has a molecular weight of from 250 to 1000, more preferably from 260 to 800, even more preferably from 270 to 800, still more preferably from 300 to 800. Having a molecular weight falling within the range, the compound may have a specific monomer structure or may have an oligomer structure or a polymer structure comprising a plurality of such monomer units as combined.

It is desirable that the amount of the wavelength dispersion-controlling agent preferably used in the invention is from 0.01 to 30% by weight, more preferably from 0.1 to 20% by weight, even more preferably from 0.2 to 10% by weight of the solid content (essentially the polymer) of the film.

For the wavelength dispersion-controlling agent, one or more different types of compounds may be used either singly or as combined in any desired ratio.

Regarding the time when the wavelength dispersion-controlling agent is added to the film, the compound may be added to the dope in any stage of preparing the dope, or may be added thereto finally after the process of preparing the dope.

Preferred examples of the wavelength dispersion-controlling agent for use in the invention are benzotriazole compounds, benzophenone compounds, cyano group-containing compounds, oxybenzophenone compounds, salicylate compounds, nickel complex compounds. However, the invention should not be limited to these compounds.

Preferable examples of the wavelength dispersion-controlling agent include formula (101) below:

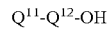

$Q^{11}$-$Q^{12}$-OH   Formula (101)

In the formula, $Q^{11}$ represents a nitrogen-containing aromatic heteroring, and $Q^{12}$ represents an aromatic ring.

The nitrogen-containing aromatic heteroring represented by $Q^{11}$ is preferably a five-to-seven-membered, nitrogen-containing aromatic heteroring, and more preferably five- or six-membered, nitrogen-containing aromatic heteroring, wherein examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthooxazole, azabenzimidazole, purine, pyridine, pyrazine, pyrimidine, pyridazine, triazine, triazaindene and tetrazaindene. Among others, the five-membered, nitrogen-containing aromatic heteroring is preferable, wherein specific examples thereof include imidazole, pyrazole, triazole, tetrazole, thiazole, oxazole, benzotriazole, benzothiazole, benzoxazole, thiadiazole, and oxadiazole. Benzotriazole is particularly preferable.

The aromatic ring represented by $Q^{12}$ may be an aromatic hydrocarbon ring or may be an aromatic heteroring. The aromatic ring may be monocycle, or may further form a condensed ring with other ring.

The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring.

The aromatic heteroring is preferably a nitrogen-atom-containing or sulfur-atom-containing aromatic heteroring. Specific examples of the aromatic heteroring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heteroring is preferably pyridine, triazine or quinoline. $Q^{12}$ preferably represents an aromatic hydrocarbon ring, more preferably represents a naphthalene ring or benzene ring, and particularly preferably represents a benzene ring.

Each of $Q^{11}$ and $Q^{12}$ may further have a substituent group which is preferably selected from the substituent group T listed below.

Substituent Group T:

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C_{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl.

These substituents may be substituted by at least one substituent selected from these. When two substituents are selected, they may be same or different each other. Two or more may, if possible, bond each other to form a ring.

Among the compounds represented by the formula (101), triazole compounds represented by a formula (101-A) are preferred.

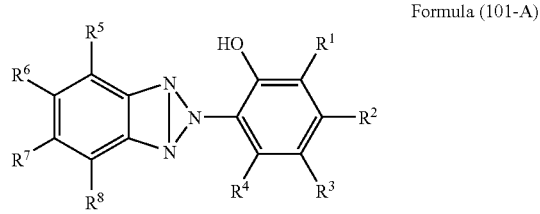

Formula (101-A)

In the formula, $R^1$, $R^2$, $R^3$, $R^4$, $R^5$, $R^6$, $R^7$ and $R^8$ respectively represent a hydrogen atom or a substituent group.

The substituent represented by $R^1$, $R^2$, $R^3$, $R^4$, $R^5$, $R^6$, $R^7$ or $R^8$ is selected from Substituent Group T described above. The substituent may be substituted with at least one substituent group or form a condensed ring by bonding each other.

It is preferred that $R^1$ and $R^3$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^1$ and $R^3$ respectively represent a hydrogen atom, an alkyl group, an aryl group, an alkoxy group, an aryloxy group or a halogen atom; it is much more preferred that $R^1$ and $R^3$ respectively represent a hydrogen atom or a $C_{1-12}$ alkyl group; and it is further much more preferred that $R^1$ and $R^3$ respectively represent a $C_{1-12}$ (preferably $C_{4-12}$) alkyl group.

It is preferred that $R^2$ and $R^4$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^2$ and $R^4$ respectively represent a hydrogen atom, an alkyl group, an aryl group, an alkoxy group, an aryloxy group or a halogen atom; it is much more preferred that $R^2$ and $R^4$ respectively represent a hydrogen atom or a $C_{1-12}$ alkyl group; it is further much more preferred that $R^2$ and $R^4$ respectively represent a hydrogen atom or methyl; and it is most preferred that $R^2$ and $R^4$ respectively represent a hydrogen atom.

It is preferred that $R^5$ and $R^8$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^5$ and $R^8$ respectively represent a hydrogen atom, an alkyl group, an aryl group, an alkoxy group, an aryloxy group or a halogen atom; it is much more preferred that $R^5$ and $R^8$ respectively represent a hydrogen atom or a $C_{1-12}$ alkyl group; it is further much more preferred that $R^5$ and $R^8$ respectively represent a hydrogen atom or methyl; and it is most preferred that $R^5$ and $R^8$ respectively represent a hydrogen atom.

It is preferred that $R^6$ and $R^7$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^6$ and $R^7$ respectively represent a hydrogen atom, an alkyl group, an aryl group, an alkoxy group, an aryloxy group or a halogen atom; it is much more preferred that $R^6$ and $R^7$ respectively represent a hydrogen atom or a halogen atom; and it is further much more preferred that $R^6$ and $R^7$ respectively represent a hydrogen atom or a chlorine.

Among the compounds represented by the formula (101), the compounds represented by a formula (101-B) are more preferred.

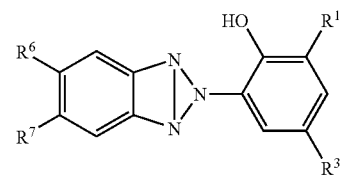

Formula (101-B)

In the formula, $R^1$, $R^3$, $R^6$ and $R^7$ are respectively same as those in the formula (101-A), and the preferred scopes of them are also same.

Examples of the compound represented by the formula (101) include, however not to be limited to, those shown below.

UV-1
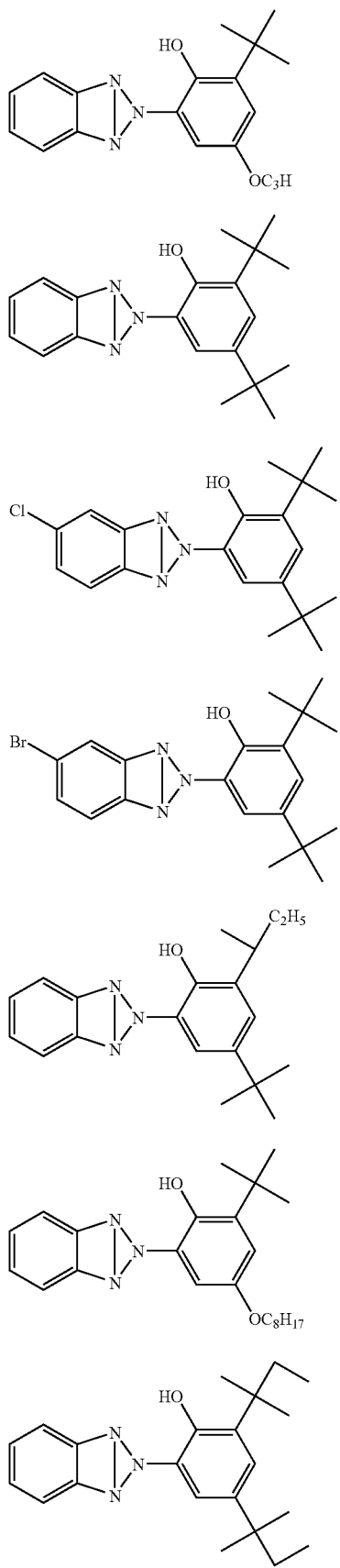
UV-2
UV-3
UV-4
UV-5
UV-6
UV-7
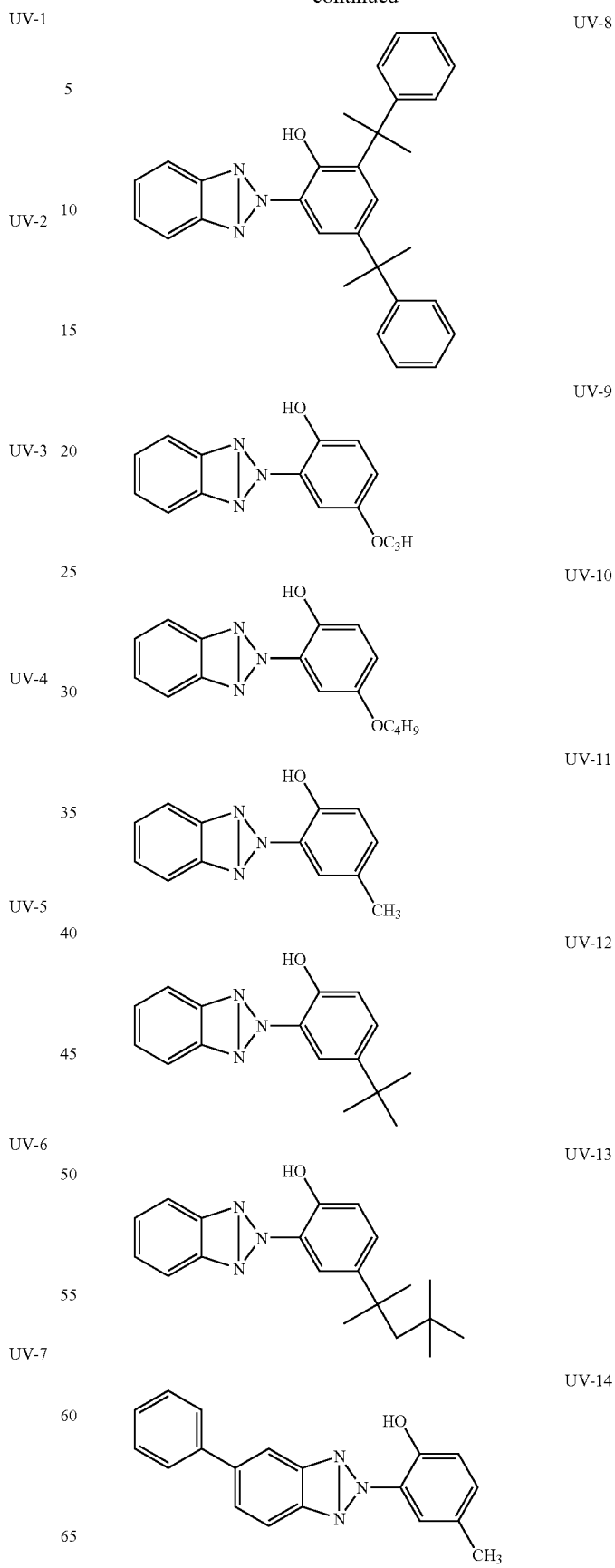
UV-8
UV-9
UV-10
UV-11
UV-12
UV-13
UV-14

UV-15
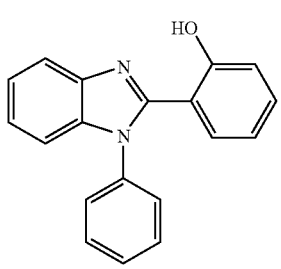

UV-16
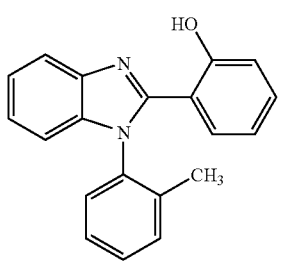

UV-17
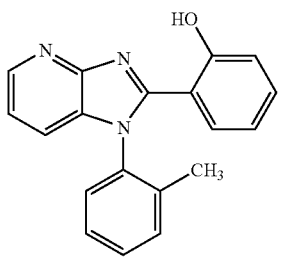

UV-18
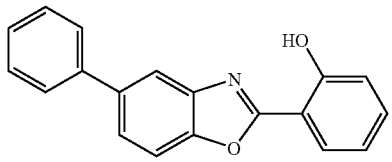

UV-19
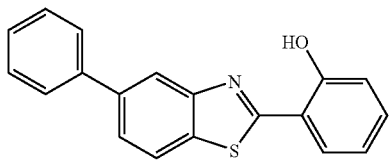

UV-20
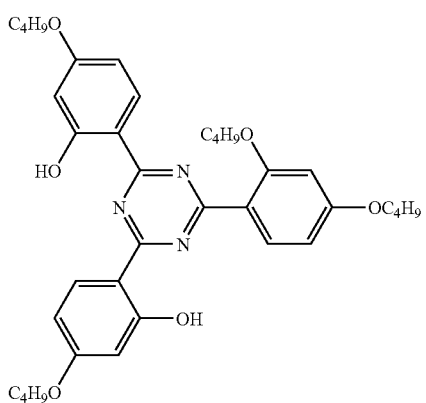

UV-21
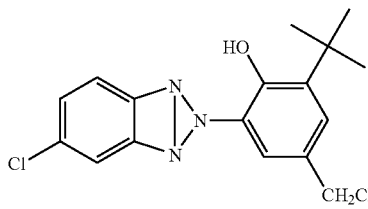

UV-22
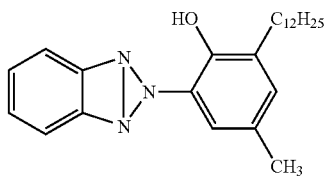

UV-23
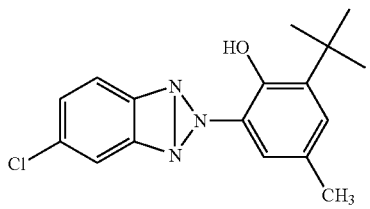

Among benzotriazole compounds shown above as examples, the compounds having a molecular-weight of greater than 320 are preferably used for producing the cellulose acylate film from the viewpoint of retention.

One of other preferable examples of the wavelength dispersion adjusting agent is a compound represented by a formula (102) below.

Formula (102)
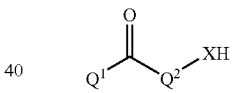

In the formula, $Q^1$ and $Q^2$ independently represent an aromatic ring, and X represents NR(R is a hydrogen atom or a substituent group), oxygen atom or sulfur atom.

The aromatic ring represented by $Q^1$ and $Q^2$ may be an aromatic hydrocarbon ring or may be an aromatic heteroring. The aromatic ring may be monocycle, or may further form a condensed ring with other ring.

The aromatic hydrocarbon ring represented by $Q^1$ and $Q^2$ is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring.

The aromatic heteroring represented by $Q^1$ and $Q^2$ may be an aromatic heteroring preferably containing at least any one of an oxygen atom, nitrogen atom and sulfur atom. Specific examples of the heteroring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heteroring is preferably pyridine, triazine or quinoline.

Each of $Q^1$ and $Q^2$ preferably represents an aromatic hydrocarbon ring, more preferably an aromatic hydrocarbon ring having the number of carbon atoms of 6 to 10, and still more preferably a substituted or non-substituted benzene ring.

Each of $Q^1$ and $Q^2$ may further have a substituent group. The substituent group may preferably be selected from the substituent group T listed above, but never contain carboxylic acid, sulfonic acid or quaternary ammonium salt. A plurality of the substituent group may bind with each other to produce a cyclic structure.

X is preferably NR(R represents a hydrogen atom or a substituent group. The above-described substituent group T is applicable to the substituent group), oxygen atom (O) or sulfur atom (S), wherein X is preferably NR(R is preferably an acyl group or sulfonyl group, and these substituent groups may further be substituted), or O, and particularly preferably O.

Among the compounds represented by the formula (102), the benzophenone compounds represented by a formula (102-A) are preferred.

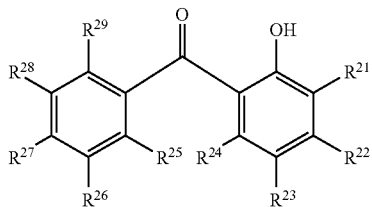

Formula (102-A)

In the formula, $R^{21}$, $R^{22}$, $R^{23}$, $R^{24}$, $R^{25}$, $R^{26}$, $R^{27}$, $R^{28}$ and $R^{29}$ respectively represent a hydrogen atom or a substituent.

The substituent represented by $R^{21}$, $R^{22}$, $R^{23}$, $R^{24}$, $R^{25}$, $R^{26}$, $R^{27}$, $R^{28}$ or $R^{29}$ is selected from Substituent Group T described above. The substituent may be substituted with at least one substituent group or form a condensed ring by bonding each other.

It is preferred that $R^{21}$, $R^{23}$, $R^{24}$, $R^{25}$, $R^{26}$, $R^{25}$ and $R^{29}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{21}$, $R^{23}$, $R^{24}$, $R^{25}$, $R^{26}$, $R^{28}$ and $R^{29}$ respectively represent a hydrogen atom, an alkyl group, an aryl group, an alkoxy group, an aryloxy group or a halogen atom; it is much more preferred that $R^{21}$, $R^{23}$, $R^{24}$, $R^{25}$, $R^{26}$, $R^{28}$ and $R^{29}$ respectively represent a hydrogen atom or a $C_{1-12}$ alkyl group; it is further much more preferred that $R^{21}$, $R^{23}$, $R^{24}$, $R^{25}$, $R^{26}$, $R^{28}$ and $R^{29}$ respectively represent a hydrogen atom or methyl; and it is most preferred that $R^{21}$, $R^{23}$, $R^{24}$, $R^{25}$, $R^{26}$, $R^{28}$ and $R^{29}$ respectively represent a hydrogen atom.

It is preferred that $R^{22}$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{22}$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{22}$ represents a $C_{1-20}$ alkoxy group; and it is further much more preferred that $R^{2f}$ represents a $C_{1-12}$ alkoxy group.

It is preferred that $R^{27}$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{27}$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{27}$ represents a hydrogen atom or a $C_{1-20}$ (desirably $C_{1-12}$, more desirably $C_{1-8}$ and much more desirably methyl) alkyl group; and it is further much more preferred that $R^{27}$ represents a hydrogen atom or methyl.

Among the compounds represented by the formula (102), the compounds represented by a formula (102-B) are more preferred.

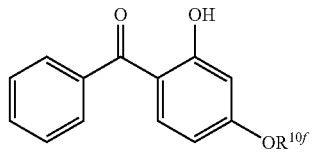

Formula (102-B)

In the formula, $R^{10}$ represents a hydrogen atom, a substituted or non-substituted alkyl group, a substituted or non-substituted alkenyl group, a substituted or non-substituted alkynyl group or substituted or non-substituted aryl group.

The substituent is selected from Substituent Group T shown above.

It is preferred that $R^{10}$ represents a substituted or non-substituted alkyl group; it is more preferred that $R^{10}$ represents a $C_{5-20}$ substituted or non-substituted alkyl group; it is much more preferred that $R^{10}$ represents $C_{5-12}$ substituted or non-substituted alkyl group such as n-hexyl, 2-ethylhexyl, n-octyl, n-decyl, n-dodecyl or benzyl; and it is further more preferred that $R^{10}$ represents a $C_{6-12}$ substitute or non-substituted alkyl group such as 2-ethylhexyl, n-octyl, n-decyl, n-dodecyl or benzyl.

The compounds represented by the formula (102) can be synthesized by a publicly-known method disclosed in Japanese Laid-Open Patent Publication "Tokkaihei" No. 11-12219.

Specific examples of the compounds represented by formula (102) will be listed below, wherein the present invention is by no means limited to the specific examples listed below.

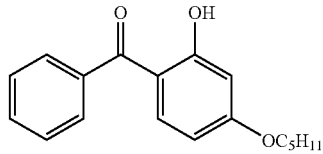

UV-101

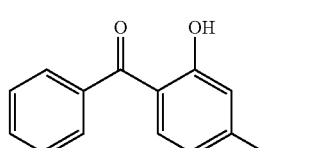

UV-102

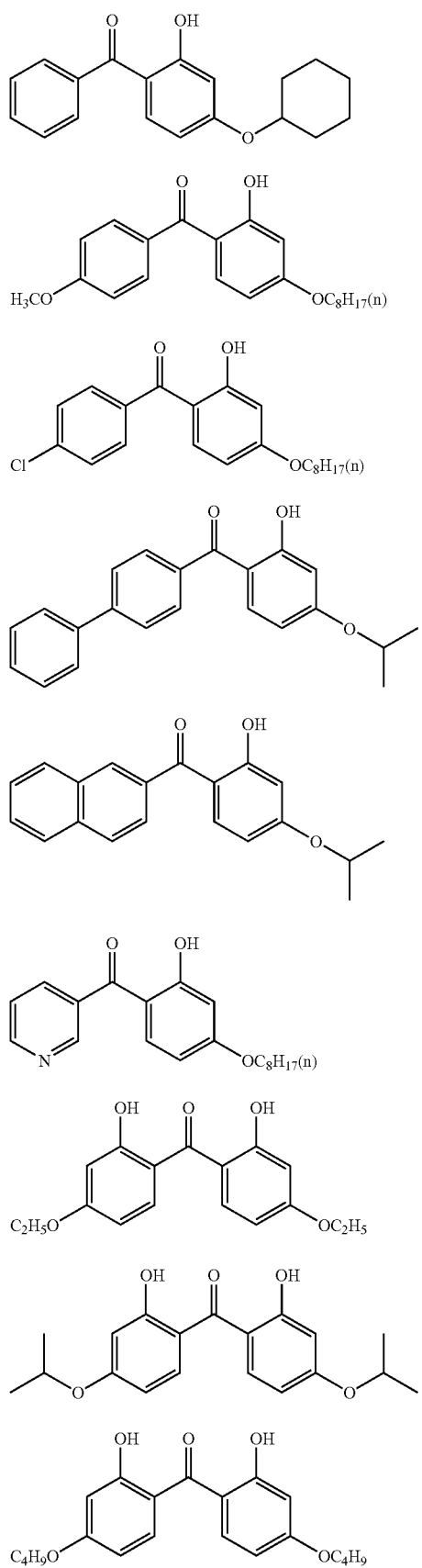
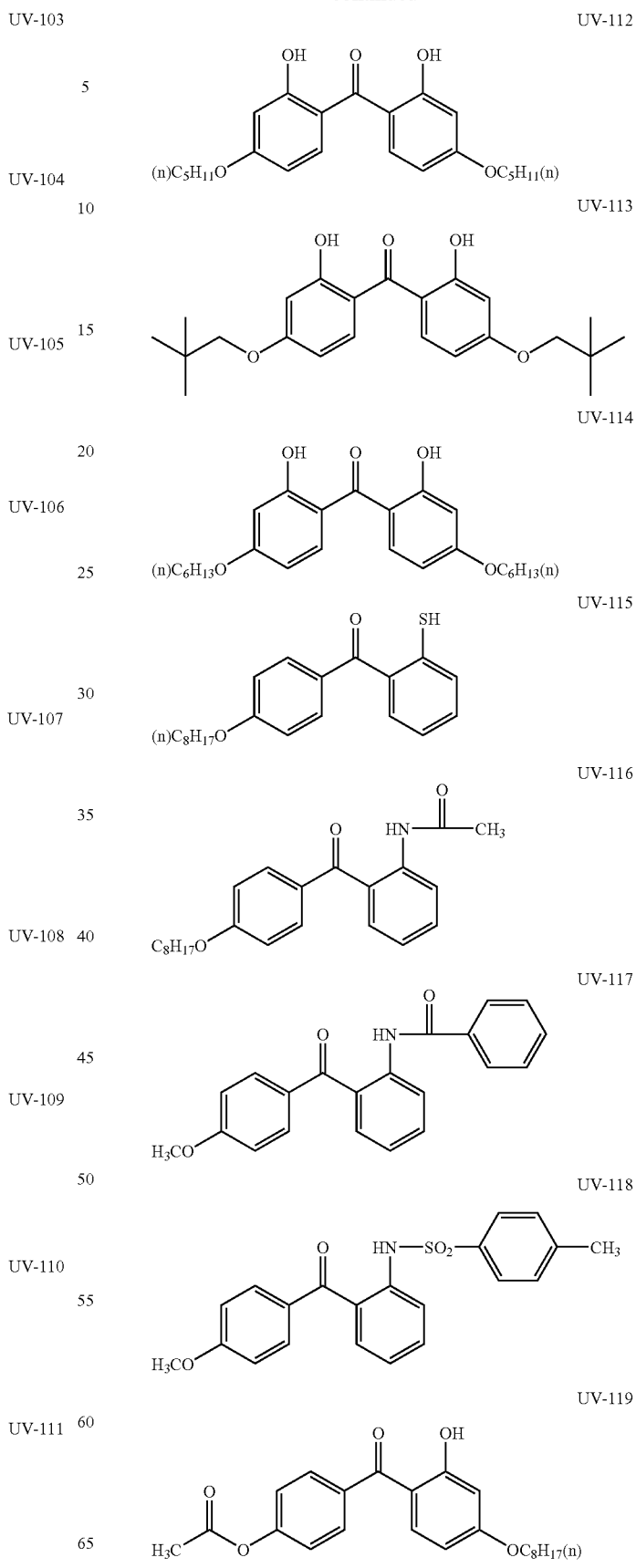

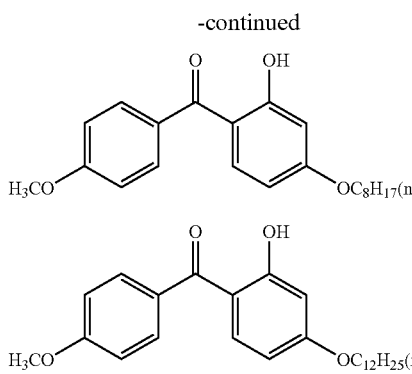

One of other preferable examples of the wavelength dispersion-controlling agent is a compound having cyano represented by a formula (103) below.

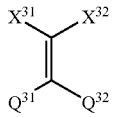

Formula (103)

In the formula, $Q^{31}$ and $Q^{32}$ independently represent an aromatic ring. Each of $X^{31}$ and $X^{32}$ represents a hydrogen atom or a substituent group, wherein at least either one of which represents a cyano group, carbonyl group, sulfonyl group or aromatic heterocing.

The aromatic ring represented by $Q^{31}$ and $Q^{32}$ may be an aromatic hydrocarbon ring or an aromatic heterocing. These may be a monocycle, or may further form a condensed ring with other ring.

The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, more preferably an aromatic hydrocarbon ring having the number of carbon atoms of 6 to 12, and still more preferably a benzene ring.

The aromatic heterocing is preferably a nitrogen-atom-containing or sulfur-atom-containing aromatic heterocing. Specific examples of the heterocing include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene: The aromatic heterocing is preferably pyridine, triazine or quinoline.

Each of $Q^{31}$ and $Q^{32}$ preferably represents an aromatic hydrocarbon ring, and more preferably a benzene ring. Each of $Q^{31}$ and $Q^{32}$ may further have a substituent group, wherein the substituent group is preferably selected from the above-described substituent group T.

Each of $X^{31}$ and $X^{32}$ represents a hydrogen atom or a substituent group, wherein at least either one of which represents a cyano group, carbonyl group, sulfonyl group or aromatic heterocing. The above-described substituent group T is applicable to the substituent group represented by $X^{31}$ and $X^{32}$. The substituent group represented by $X^{31}$ and $X^{32}$ may further be substituted by other substituent group, or $X^{31}$ and $X^{32}$ may be condensed with each other to thereby form a ring structure.

Each of $X^{31}$ and $X^{32}$ is preferably a hydrogen atom, alkyl group, aryl group, cyano group, nitro group, carbonyl group, sulfonyl group or aromatic heterocing, more preferably a cyano group, carbonyl group, sulfonyl group or aromatic heterocing, still more preferably a cyano group or carbonyl group, and particularly preferably a cyano group or alkoxycarbonyl group (—C(═O)OR, where R is an alkyl group having the number of carbon atoms of 1 to 20, aryl group having the number of carbon atoms of 6 to 12, and combinations thereof).

Among the compounds represented by the formula (103), the compounds represented by a formula (103-A) are preferred.

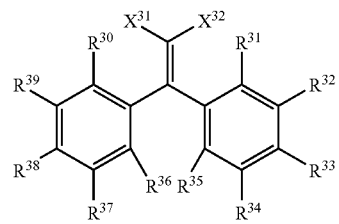

Formula (103-A)

In the formula, $R^{31}$, $R^{32}$, $R^{33}$, $R^{34}$, $R^{35}$, $R^{36}$, $R^{37}$, $R^{38}$, $R^{39}$ and $R^{30}$ respectively represent a hydrogen atom or a substituent group. The substituent is selected from Substituent Group T shown above. The substituent may be substituted with at least one substituent group or form a condensed ring by bonding each other. $X^{31}$ and $X^{32}$ are respectively same as those in the formula (103) and the preferred scopes are also same.

It is preferred that $R^{31}$, $R^{32}$, $R^{33}$, $R^{34}$, $R^{35}$, $R^{36}$, $R^{37}$, $R^{38}$, $R^{39}$ and $R^{30}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{31}$, $R^{32}$, $R^{33}$, $R^{34}$, $R^{35}$, $R^{36}$, $R^{37}$, $R^{38}$, $R^{39}$ and $R^{30}$ respectively represent a hydrogen atom, an alkyl group, an aryl group, an alkoxy group, an aryloxy group or a halogen atom; it is much more preferred that $R^{31}$, $R^{32}$, $R^{33}$, $R^{34}$, $R^{35}$, $R^{36}$, $R^{37}$, $R^{38}$, $R^{39}$ and $R^{30}$ respectively represent a hydrogen atom or a $C_{1-12}$ alkyl group; it is further much more preferred that $R^{31}$, $R^{32}$, $R^{33}$, $R^{34}$, $R^{35}$, $R^{36}$, $R^{37}$, $R^{38}$, $R^{39}$ and $R^{30}$ respectively represent a hydrogen atom or methyl; and it is most preferred that $R^{31}$, $R^{32}$, $R^{33}$, $R^{34}$, $R^{35}$, $R^{36}$, $R^{37}$, $R^{38}$, $R^{39}$ and $R^{30}$ respectively represent a hydrogen atom.

It is preferred that $R^{33}$ and $R^{38}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{3g}$ and $R^{8g}$ respectively represent a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{3g}$ and $R^{8g}$ respectively represent a hydrogen atom, a $C_{1-12}$ alkyl group or a $C_{1-12}$ alkoxy group; and it is most preferred that $R^{3g}$ and $R^{8g}$ respectively represent a hydrogen atom.

Among the compounds represented by the formula (103), the compounds having a cyano group represented by a formula (103-B) are more preferred.

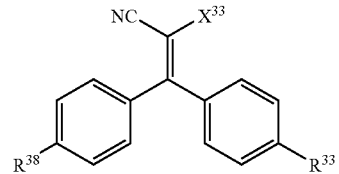

Formula (103-B)

In the formula, $R^{33}$ and $R^{38}$ are respectively same as those in the formula (103-A), and the preferred scopes are also same.

$X^{33}$ represents a hydrogen atom or a substituent group. The substituent is selected from Substituent Group T shown above. The substituent may be substituted with at least one substituent group or form a condensed ring by bonding each other. It is preferred that $X^{33}$ represents a hydrogen atom, an alkyl group, an aryl group, a cyano group, a nitro group, a carbonyl group, a sulfonyl group or an aryl heteroring; it is more preferred that $X^{33}$ represents a cyano group, a carbonyl group, a sulfonyl group or an aryl heteroring; it is much more preferred that $X^{33}$ represents a cyano group or a carbonyl group; and it is further much more preferred that $X^{33}$ represents a cyano group or an alkoxycarbonyl group, or in other words —C(=O)OR$^{301}$ where R$^{301}$ represents a $C_{1-20}$ alkyl group, a $C_{6-12}$ aryl group or a combination thereof.

Among the compounds represented by the formula (103), the compounds represented by a formula (103-C) are much more preferred.

Formula (103-C)

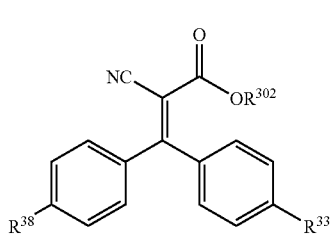

In the formula, $R^{33}$ and $R^{38}$ are respectively same as those in the formula (103-A), and the preferred scopes are also same. $R^{302}$ represents a $C_{1-20}$ alkyl group.

When both of $R^{33}$ and $R^{38}$ are hydrogen atoms, $R^{302}$ preferably represents a $C_{2-12}$ alkyl group, more preferably represents a $C_{4-12}$ alkyl group, much more preferably represents a $C_{6-12}$ alkyl group, further much more preferably n-octyl, tert-octyl, 2-ethylhexyl, n-decyl or n-dodecyl, and most preferably represents 2-ethylhexyl.

When neither $R^{33}$ nor $R^{38}$ are hydrogen atoms, $R^{302}$ is preferably selected from alkyl groups having 20 or more carbon atoms such that the molecular weight of the compound represented by the formula (103-C) is not less than 300.

The compounds represented by the formula (103) can be synthesized by a method described in Journal of American Chemical Society, Vol. 63, p. 3452, (1941).

Specific examples of the compounds represented by the formula (103) will be listed below, wherein the present invention is by no means limited to the specific examples listed below.

UV-201

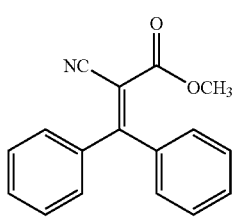

UV-202

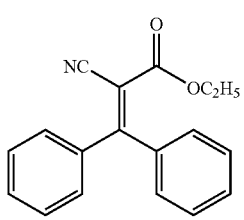

UV-203

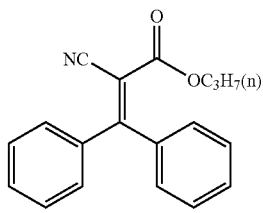

UV-204

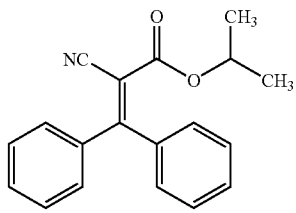

UV-205

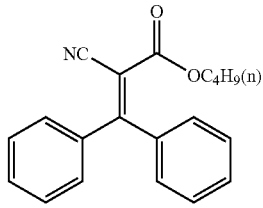

UV-206

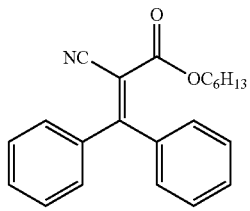

UV-207

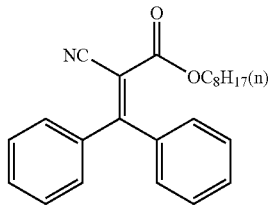

UV-208

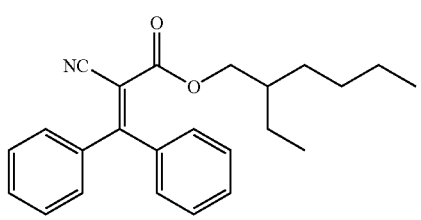

UV-209

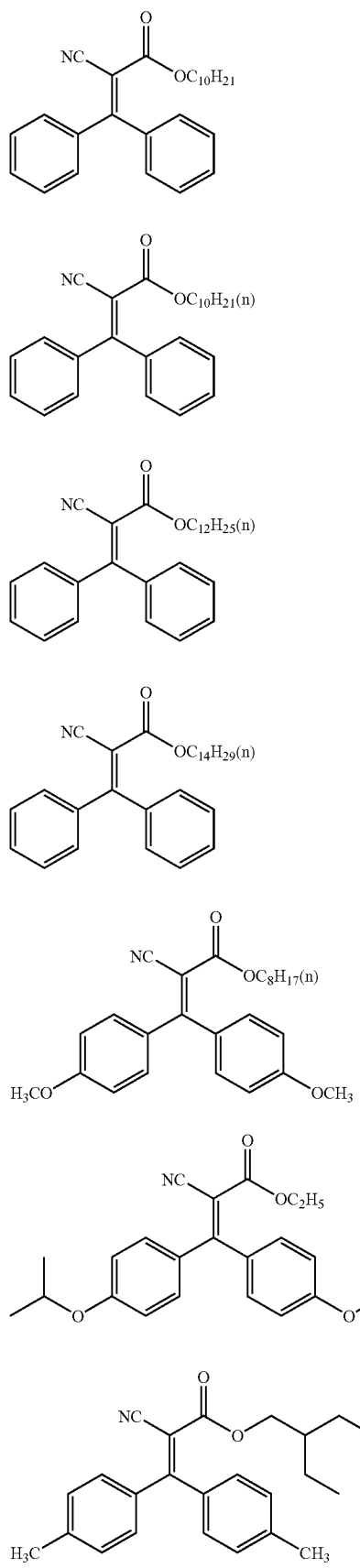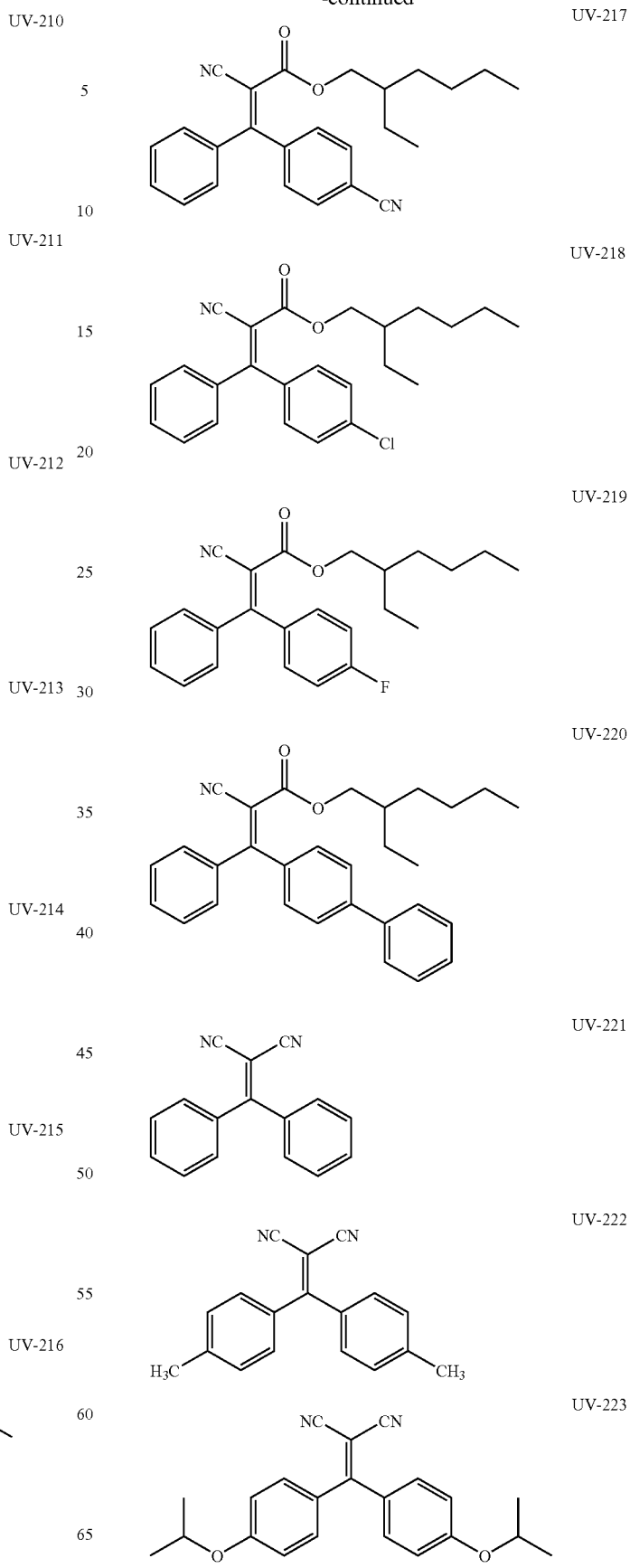

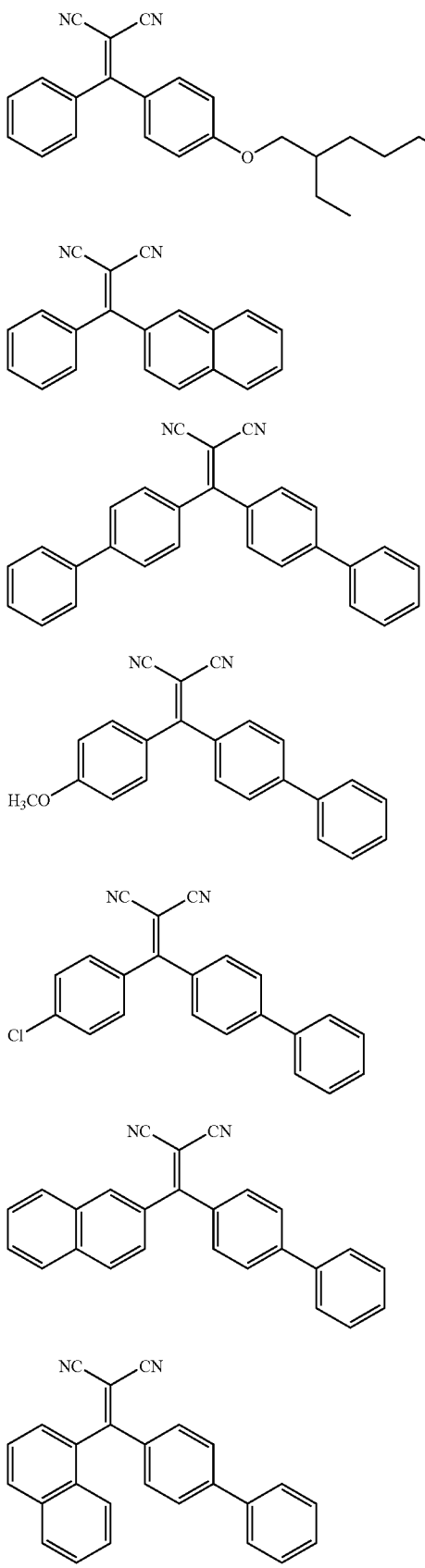
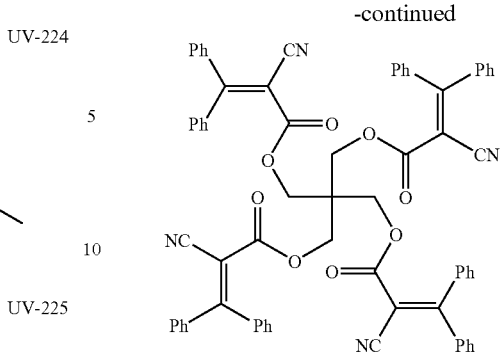

(Retardation Enhancer)

As described above, examples of the film to be used as the second transparent film in the invention include uniaxial or biaxial films. Cellulose acylate-case films having such an optical property may be prepared by being added with a retardation enhancer thereto.

Examples of the retardation enhancer, which is capable of increasing retardation of cellulose acylate-base films, include rod-like aromatic compounds described in JPA No. 2004-50561, pages 11-14.

And examples of the retardation enhancer, which is capable of increasing retardation of cellulose acylate-base films, also include those described in JPA No. 2002-277632, [0016]-[0024].

And examples of the retardation enhancer, which is capable of increasing retardation of cellulose acylate-base films, also include those described in JPA No. 2002-182215, [0033]-[0041].

One species or two or more species of compounds may be used as the retardation enhancer. The amount of the retardation enhancer is preferably from 0.1 to 20 mass % and more preferably from 0.5 to 10 mass % with respect to 100 parts mass of cellulose acylate. When the cellulose acylate-base film is produced according to a solvent cast method, the retardation enhancer may be added to the dope. The addition of the retardation enhancer to the dope may be conducted any stage, and for example, a solution of the retardation enhancer may be prepared by dissolving it in an organic solvent such as alcohol, methylene chloride or dioxolane and then added to the dope; or the retardation enhancer may be added to the dope directly.

(Mat Agent Fine Particles)

The cellulose acylate-base film to be used as the transparent film in the invention may contain fine particles as a mat agent. The fine particles usable in the invention are silicon dioxide, titanium dioxide, aluminium oxide, zirconium oxide, calcium carbonate, talc, clay, calcined kaolin, calcined calcium silicate, calcium silicate hydrate, aluminium silicate, magnesium silicate, and calcium phosphate. Preferably, the fine particles contain silicon as they are effective for reducing the haze of films. Especially preferably, they are silicon dioxide. It is desirable that the silicon dioxide fine particles have a primary mean particle size of at most 20 nm and an apparent specific gravity of at least 70 g/liter. More preferably, the mean particle size of the primary particles is small, falling between 5 and 16 nm, as they are effective for reducing the haze of the film. More preferably, the apparent specific gravity is from 90 to 200 g/liter, even more preferably from 100 to 200 g/liter. The particles having a larger apparent specific gravity may make it easier to form a dispersion having a higher concentration, and they are desirable as reducing the film haze and as preventing the formation of aggregates of the particles in the film.

The fine particles generally form secondary particles having a mean particle size of from 0.1 to 3.0 μm, and they exist as aggregates of their primary particles in the film, therefore forming projections having a size of from 0.1 to 3.0 μm in the film surface. The secondary mean particle size is preferably from 0.2 μm to 1.5 μm, more preferably from 0.4 μm to 1.2 μm, most preferably from 0.6 μm to 1.1 μm. The primary and secondary particle sizes are the diameters of the circumscribed circles of the particles in the film observed with a scanning electronic microscope. Concretely, 200 particles in different sites are observed and analyzed, and their mean value is the mean particle size.

As fine particles of silicon dioxide, for example, commercial products of Aerosil R972, R972V, R974, R812, 200, 200V, 300, R202, OX50, TT600 (all by Nippon Aerosil) are usable. As fine particles of zirconium oxide, for example, commercial products of Aerosil R976 and R811 (both by Nippon Aerosil) are usable.

Of those, Aerosil 200V and Aerosil R972V are fine particles of silicon dioxide having a primary mean particle size of at most 20 nm and having an apparent specific gravity of at least 70 g/liter, and these are especially preferred as they are effective for reducing the friction factor of optical films while keeping the haze of the films low.

For mixing the mat agent with other ingredients, an in-line mixer may be used. Preferably, the concentration of silicon dioxide fine particles to be mixed and dispersed in a solvent to prepare a dispersion of the particles is from 5 to 30% by mass, more preferably from 10 to 25% by mass, most preferably from 15 to 20% by mass. The dispersion concentration is preferably higher, as the liquid turbidity could be smaller relative to the amount of the particles in the dispersion, the haze of the film could be lower and the content of the aggregates in the film could be smaller. The amount of the mat agent to be finally in the polymer dope solution is preferably from 0.001 to 1.0% by mass, more preferably from 0.005 to 0.5% by mass, and even more preferably from 0.01 to 0.1% by mass.

When the transparent film of the invention is formed from a dope solution, lower alcohols may be used as the solvent in the process of casting the dope and drying it. Preferred examples of the lower alcohols are methyl alcohol, ethyl alcohol, propyl alcohol, isopropyl alcohol, butyl alcohol. The other solvents than such lower alcohols are not specifically defined for use herein. Preferably, the solvents generally used in film formation from cellulose esters may be used.

(Process of Preparing Cellulose Acylate-Base Films)

The process for preparing the cellulose acylate film to be used as the second is not limited, and the film may be prepared according to any film-forming method. For example, the film may be prepared according to a solvent casting method or a melt extrusion method. The solvent casting method is preferable.

[Acryl-Base Polymer Film]

Next, the acryl polymer films which can be used as the first or second transparent film will be explained below. It is known that an acryl-base polymer containing an acryl-base polymer as a major ingredient exhibits a high light-transmission and low birefringence. Such an acryl-base polymer film may exhibit low Re and low Rth which the first transparent film is required to exhibit. Furthermore, the acryl-base polymer film exhibits moderate wavelength dispersion characteristics and exhibits the appropriate wavelength dispersion characteristics for the first transparent film, or in other words, using the acryl-base polymer(s) as a major ingredient, it is possible to prepare the film whose |Re(400)−Re(700)| is equal to or smaller than 10 nm and |Rth(400)−Rth(700)| is equal to or smaller than 35 nm, more preferably, |Re(400)−Re(700)| is equal to or smaller than 5 nm and |Rth(400)−Rth(700)| is equal to or smaller than 10 nm.

An acryl-base polymer film is a film containing, as a major ingredient, an acryl-base polymer having at least one repeated unit derived from (meth)acrylic acid ester. Preferable examples of the acryl-base polymer include acryl-base polymers having at least one unit selected from the group consisting of a lactone unit, maleic anhydride unit and glutaric anhydride unit along with the repeated unit derived from (meth)acrylic acid ester.

[Other Polymer Films]

Other than the above-mentioned polymer films, polymer films, having both of a positive intrinsic retardation component and a negative intrinsic retardation component, may be used in the invention as the transparent film.

Modified polycarbonate film such as 'PURE-ACE' from Teijin Limited; and norbornene-base polymer films disclosed in Japanese Laid-Open Patent Publication Nos. 2003-292639 and 2003-321535; may also be used in the invention as the transparent film.

Cycloolefin-base polymer films such as norbornene-base polymer films may show low moisture-permeability and high light-transmission.

By controlling the conditions in the preparation process thereof such as film-forming condition and stretching condition, cycloolefin-base polymer films may exhibit low Re and low Rth or uniaxiality or biaxiality, which may be used as the first transparent film or the second first film in the invention.

One examples of the second transparent film is a transparent film having Nz of about 0.5, provided that Nz is defined as follows: Nz=Rth(550)/Re(550)+0.5. The films having the Nz value and showing reversed wavelength dispersion characteristics of retardation are preferable. Or in other words, the films having greater retardation at longer wavelength are preferable. The films showing retardation proportional to the wavelength are more preferable. By using such a film as the second transparent film, it is possible to reduce the degree of leakage regarding the wide visible light range in the black state.

Two transparent films each of which has Nz of about 0.5 may be used in the invention. Both of the two films may have retardation of about ¼λ. Or the two films may have retardation which is different from each other and, in such a case, the total retardation of the two films is preferably about ½λ. According to these embodiments, it is possible to make the retardation absolute value of each of the two films smaller. Usually, a film having not too large retardation can be prepared with good productivity, and the defects such as surface-unevenness may be hardly developed in such a film. Furthermore, it is possible to reduce the thickness of the film, and therefore it is also possible to reduce the cost for preparing the film.

Or, two transparent films having retardation of ½λ, one of which has Nz of about 0.25, another of which has Nz of about 0.75, may be used in the invention. By using the two transparent films, it is possible to compensate the leakage of light generating due to the wavelength dispersion characteristics of the films and to reduce the leakage of all over the visible light region in the black state.

Or, the transparent film, especially the second transparent film, may be an optically anisotropic layer formed of a liquid crystal composition, or any laminations of the layer and a polymer film. The optically anisotropic layer may be prepared by using single or plural types of liquid crystal materials such as rod-like and discotic liquid crystals. For example, an optically anisotropic film prepared by curing the alignment state such as vertical alignment state of a curable liquid crystal composition containing a rod-like liquid crystal compound may be used.

[Stretching Treatment]

The transparent film, especially the second transparent film, which can be used in the invention, may be a film subjected to a stretching treatment. By being subjected to a stretching treatment, a film may develop retardation falling within the desired range. The stretching step may be carried out along the transverse direction of the film, or in other words, stretching along the transverse direction (referred to as "TD stretching) may be carried out. Using the transversely-stretched film, it is possible to prepare a polarizing plate in which the transmission axis of the polarizing film and the slow axis of the transparent film is parallel to each other according to the roll to roll-process.

A method of stretching in a transverse direction is described, for example, in JPA Nos. syo 62-115035, hei 4-152125, hei 4-284211, hei 4-298310, and hei 11-48271.

Film stretching is attained at room temperature or under heat. The film may be stretched while dried, and in case where a solvent has remained in the film, dry stretching is especially effective. In TD stretching, the film is conveyed while held by a tenter in such a manner that the tenter width is gradually broadened, and the film may be TD-stretched. After dried, the film may be stretched using a stretcher (preferably uniaxial stretching with a long stretcher).

The draw ratio in stretching the film (elongation relative to the unstretched film) is preferably from 1% to 200%, more preferably from 5% to 150%.

Or, as the transparent film, a film prepared according to process containing a shrinking step (in the shrinking step, the film is allowed to shrink while being held along the transverse direction) may be used The method containing both of the stretching step (in the step the film is stretched transversely) and the shrinking step (in the step the film is shrunk along the machine direction (MD)) may be carried out as follows. The film is stretched along the transverse direction while the film is held by a tenter employing a pantograph or linear-motor manner; at the same time, the film is shrunk along the machine direction while the space between the clips is narrowed gradually.

The above-mentioned stretching step (in the step, the film is stretched along either the mechanical or transverse direction while being shrunk along another direction, and, as same time, the film thickness is increased) may be carried out by using a stretching machine such as "FITZ" provided by ICHIKIN. The stretching machine is described in detail in JPA No. 2001-38802.

The stretching ratio in the stretching step and the shrinking ration in the shrinking step may be determined arbitrarily depending to desired values of Re and Rth. According to one preferred example, the step may be carried out with the stretching ratio equal to or more than 10% and the shrinking ratio equal to or more than 5%.

It is to be noted that the term "shrinking ratio" means a ratio of a length along a shrinking direction of a film after being subjected to a shrinking treatment to a length along the direction of a film before being subjected to a shrinking treatment. The shrinking ratio is preferably from 5 to 40% and more preferably from 10 to 30%.

[Thickness of Transparent Film]

The thickness of the transparent film to be used in the invention is not limited. Usually, the thickness is preferably from 10 to 200 μm, more preferably from 20 to 150 μm, and more preferably from 30 to 100 μm.

[Saponification Treatment]

The transparent film to be used in the invention, especially the transparent cellulose acylate-base film, may be subjected to a saponification treatment. By being subjected to a saponification treatment, a film may develop the adhesiveness-ability to a polarizing film such as polyvinyl alcohol film and is preferably used as a protective film of the polarizing plate.

The saponification treatment may be carried out as follows. A surface of a film is immersed in an alkali solution, then antalkaline with an acidic solution, washed with water and dried. Examples of the alkaline solution include potassium hydroxy solution and sodium hydroxy solution. The concentration of hydroxy ion in the alkaline solution is preferably from 0.1 to 5.0 mol/L, and more preferably from 0.5 to 4.0 mol/L. The temperature of the alkaline solution is preferably from a normal temperature to 90 degrees Celsius, and more preferably from 40 to 70 degrees Celsius.

EXAMPLES

The present invention will further specifically be explained, referring to Examples. Note that any materials, reagents, amounts and ratios of substances, operations and so forth may appropriately be altered without departing from the spirit of the present invention. The present invention is therefore not limited to the specific examples described below.

1. Preparation of Polymer-Stabilized Blue Phase Liquid Crystal Display Element

JC1041-XX (from CHISSO Corporation) as the a fluorine-containing mixed liquid crystal; 4-cyano-4'-pentylbiphenyl (5CB) (from Aldrich); and ZLI-4572 (from Merck) as the chiral agent were mixed under heating. The ratio of mixing of the individual components was 37.2/37.2/5.6 (mol %). In order to control the wavelength of diffraction of the blue phase (BP) to be expressed at 380 nm or below, the (JC041-XX/5CB/ZLI-4572) mixed liquid crystal was further introduced with a chiral agent CB15 (from Aldrich). The ratio of addition was adjusted to 20 (mol %). The mixed liquid was further added with monofunctional 2-ethylhexyl acrylate (EHA) (from Aldrich) and bifunctional RM257 (from Merck) at a ratio of 7:3, as photo-polymerizable monomers for forming a polymer network. The ratio of addition was adjusted to 6.5 (mol %). Furthermore, 2,2-dimethoxyphenylacetophenone (DMPAP) (from Aldrich) was added as a photo-polymerization initiator. The ratio of addition was adjusted to 0.33 (mol %). The mixed liquid was prepared in this way.

Figure 3:
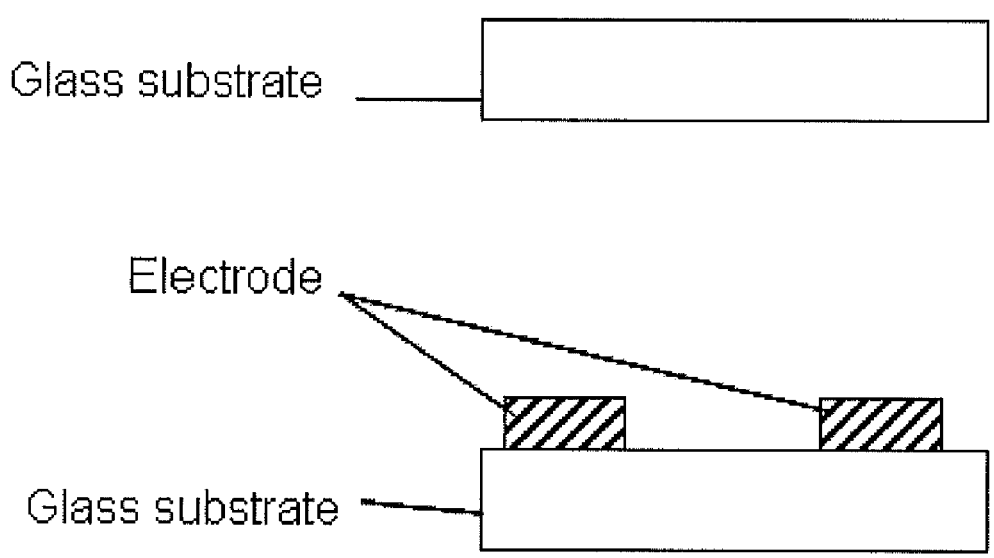
FIG. 3 is a sectional view illustrating an example of a liquid crystal display element adoptable to the present invention.

Based on the electrode structure illustrated in FIG. 3, a glass substrate (from E.H.C. Co., Ltd.) of 1.1 mm thick, having comb-shaped ITO electrodes (resistivity of ITO electrode: 100Ω) with an electrode-to-electrode distance of 50 μm formed thereon, and a glass substrate of 1.1 mm thick, having no electrode formed thereon, were used to manufacture a sandwich-type glass cell. The thickness of the cell was adjusted to 25 μm, by placing a spacer in between.

The mixed liquid, kept in an isotropic phase, was injected into the glass cell, with the aid of capillary phenomena. Liquid crystal phases expressed by thus-prepared mixed liquid were BP-II, BP-I and chiral nematic phases in the order of appearance from the higher temperature side.

Next, a polymer-stabilized BP was prepared by photo-polymerization. UV light was irradiated at a temperature 2K higher than a BP/N* phase transition temperature observed under a polarizing microscope. In the irradiation, the temperature of the glass cell was kept constant over a temperature range in which the composite system expresses BP-I, and UV light was irradiated at an irradiation intensity of 1.5 mWcm$^{-2}$ (365 nm) to thereby prepare the polymer-stabilized blue phase.

Thus-prepared, polymer-stabilized BP, before and after being applied with electric field, was observed under a polarizing microscope at 293K. A sine-wave AC electric field having a frequency of 100 kHz, and an intensity of 4.9 V·µm$^{-1}$ was used as the electric field to be applied in the white state. Under the absence of applied voltage in the black state, a dark field image was observed under the polarizing microscope, since the state of polarization of the incident light is kept unchanged even after passing through the polymer-stabilized BP which is optically isotropic. The glass cell applied with electric field (FIG. 6B) showed a distinct increase in the energy of transmitted light, which indicates that retardation was induced in the polymer-stabilized BP between the electrodes, and was confirmed that it was successfully switched by light as the liquid crystal display device. The polymer-stabilized blue phase liquid crystal display element was manufactured in this way.

Figure 4:
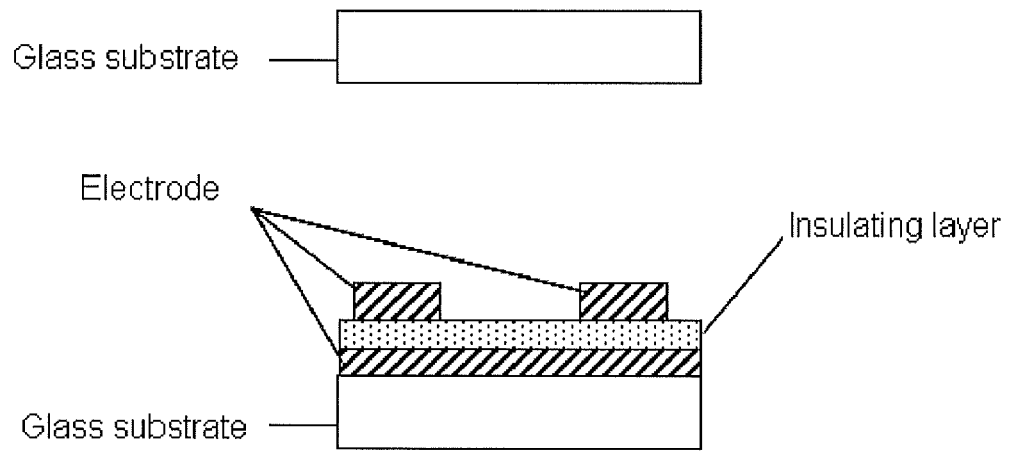
FIG. 4 is a sectional view illustrating an example of a liquid crystal display element adoptable to the present invention.

Besides the electrode structure illustrated in FIG. 3 and explained in this Example, a similar experiment was conducted also on the electrode structure illustrated in FIG. 4. The electrode-to-electrode distance was set equal to that in this Example. As a consequence, similarly to Example in the above, the glass cell showed a distinct increase in the energy of transmitted light, which indicates that retardation was induced in the polymer-stabilized BP between the electrodes, and was confirmed that it was successfully switched by light as the liquid crystal display device.

Similar experiments were similarly conducted still also on the electrode structures illustrated in FIG. 5 and FIG. 8. As a consequence, similarly to Example in the above, each of glass cells showed a distinct increase in the energy of transmitted light, which indicates that retardation was induced in the polymer-stabilized BP between the electrodes, and was confirmed that they were successfully switched by light as the liquid crystal display device.

2. Preparation of Transparent Film 1

A commercially-available cellulose acetate film (Fujitac TD80UF, from FUJIFILM Corporation, referred to as 'TAC film', hereinafter) was used as Transparent Film 1. Optical characteristics are as follow:

Re(550)=1 nm;
Rth(550)=38 nm;
Re(400)=0.6 nm;
Rth(400)=22 nm;
Re(700)=1.4 nm;
Rth(700)=42 nm;
|Re(400)−Re(700)|=0.8 nm; and
|Rth(400)−Rth(700)|=20 nm.

3. Preparation of Transparent Film 2

(Preparation of Cellulose Acetate Solution)

The ingredients below were placed in a mixing tank, and stirred to dissolve the individual ingredients, to thereby prepare cellulose acetate solution D.

Formulation of Cellulose Acetate Solution D

| | |
|---|---|
| Cellulose acetate having a degree of acetylation of 2.86 | 100.0 parts by mass |
| Methylene chloride (first solvent) | 402.0 parts by mass |
| Methanol (second solvent) | 60.0 parts by mass |

(Preparation of Matting Agent Dispersion)

Twenty parts by mass of silica particle (AEROSIL R972, from Nippon Aerosil Co., Ltd.) having an average particle size of 16 nm, and 80 parts by mass of methanol were thoroughly mixed under stirring for 30 minutes, to thereby prepare a silica particle dispersion.

The dispersion was placed into a disperser together with the composition below, and the mixture was further stirred to dissolve the individual ingredients, to thereby prepare a matting agent dispersion.

Formulation of Matting Agent Dispersion

| | |
|---|---|
| Dispersion of silica particle having an average particle size of 16 nm | 10.0 parts by mass |
| Methylene chloride (first solvent) | 76.3 parts by mass |
| Methanol (second solvent) | 3.4 parts by mass |
| Cellulose acetate solution D | 10.3 parts by mass |

(Preparation of Additive Solution)

The ingredients below were placed in a mixing tank, and stirred under heating to dissolve the individual ingredients, to thereby prepare an additive solution.

Composition of Additive Solution

| | |
|---|---|
| Compound A-19 (retardation reducing agent) shown below | 49.3 parts by mass |
| UV-102 (Wavelength dispersion controlling agent) | 7.6 parts by mass |
| Methylene chloride (first solvent) | 58.4 parts by mass |
| Methanol (second solvent) | 8.7 parts by mass |
| Cellulose acetate solution D | 12.8 parts by mass |

(Preparation of Cellulose Acetate Film Sample 2)

Mixed were 94.6 parts by mass of cellulose acetate solution D, 1.3 parts by mass of the matting agent solution, and 4.1 parts by mass of the additive solution, after being respectively filtered, and the mixture was cast using a band casting machine. The ratio of total amount of the additive compounds (Compound A-19 and UV-102) in the composition relative to cellulose acetate was 13.6% by mass.

The film having a residual solvent content of 30% was then separated from the band, dried at 140° C. for 40 minutes, to thereby manufacture a cellulose acetate film, Sample 2. Thus-obtained cellulose acetate film was found to have a residual solvent content of 0.2%, and a thickness of 40 µm.

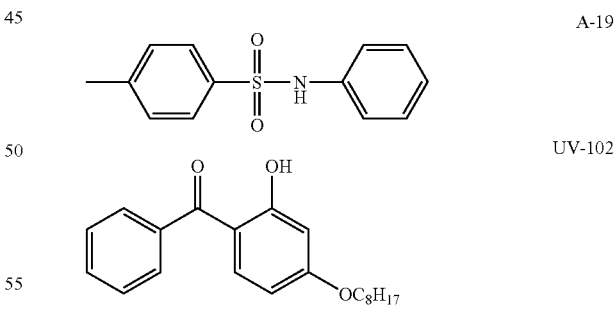

The optical properties of thus-manufactured cellulose acylate film were as follows:

Re(550)=0.3 nm,
Rth(550)=3.2 nm,
Re(400)=1.4 nm;
Rth(400)=−3.5 nm;
Re(700)=0.2 nm;
Rth(700)=4 nm;
|Re(400)−Re(700)|=1.2 nm and
|Rth(400)−Rth(700)|=7.5 nm.

The cellulose acylate film satisfied the optical properties which the first transparent film is required to have, and the film was used as Transparent Film 2.

4. Preparation of Transparent Film 3

Preparation of Acryl-Base Polymer MA-2 Containing Maleic Anhydride Unit:

According to 'heat-resistant acryl resin' described in paragraph [0049] of Japanese Laid-Open Patent Publication No. 2007-113109, a polymer composed of 10 mol % of maleic anhydride, 16 mol % of styrene, and 74 mol % of methyl methacrylate was synthesized. The resin was found to have Tg=112° C.

Thus-prepared acryl-base polymer MA-2 was dried at 90° C. in a vacuum dryer so as to reduce the moisture content to 0.03% or below, added with 0.3 wt % of a stabilizer (Irganox 1010, from CIBA-GEIGY Limited), extruded at 230° C. under nitrogen gas flow, from a vented double-screw kneader/extruder into water in a form of strand, and then cut to obtain pellets of 3 mm in diameter and 5 mm in length.

These pellets were dried at 90° C. in a vacuum drier so as to reduce the moisture content to 0.03% or below, and then kneaded and extruded using a single-screw kneader/extruder at temperatures listed in "Conditions" below. A 300-mesh screen filter was then disposed between the extruder and a gear pump. Thereafter, the melt was allowed to pass through the gear pump under "Conditions" below, allowed to pass through a leaf disc filter having a filter rating of 7 μm, extruded from a die, and then cast under "Conditions" below. Note that 'differential pressure before and after gear pump' listed in "Conditions" below is defined by subtracting pressure on the following stage from pressure in the preceding stage, and that 'shift of point of melt landing from middle point between touch roll and cast roll' defines positive landing on the touch roll side, and negative landing on the cast roll side.

The melt (molten resin) was then extruded over triple cast rolls. In this process, a touch roll was brought into contact with a cast roll (chill roll) on the most upstream side, at surface pressures listed in "Conditions" below. The touch roll used herein was such as that described in Example 1 of Japanese Laid-Open Patent Publication No. 11-235747 (same as that described as a dual presser roll, but having a thickness of a thinned metal sleeve of 2 mm), and was used at Tg−5° C. under touch pressures listed in the table below. As for the temperature of the triple cast rolls including the chill roll, the temperature of the cast roll (first roll), brought into contact with the touch roll on the most upstream side, was adjusted to (cast roll temperature-touch roll temperature) as listed in "Conditions" below, the temperature of the next cast roll (second roll) was adjusted to (first roll temperature−5° C.), and the temperature of the further next cast roll (third roll) was adjusted to (first roll temperature−10° C.).

The film was trimmed on both edges (5 cm each from the whole width), immediately before being wound up, and then knurled on both edges to as wide as 10 mm, and to as thick as 20 μm. The film of 1.5 m wide and 3000 m long was manufactured at a speed of 30 m/min and wound up. As-cast unstretched film was 60 μm thick.

The cast roll on the most upstream side was brought into contact with the touch roll under the surface pressures listed in "Conditions" below. Various conditions such as temperature difference of the screw, amount of discharge, differential pressure before and after the gear pump, temperature difference between the top and back of melt on the cast roll, gap between the landing point of melt and the midpoint of the touch roll and the cast roll, touch pressure of the touch roll, variation in the film width, and mean film width were shown below.

(Condition)

temperature difference of the screw (outlet-inlet): 30 degrees Celsius amount of discharge: 200 kg/hr differential pressure before and after the gear pump (pre-pressure-post-pressure): −3 MPa temperature difference between the cast roll and the touch roll: −5 degrees Celsius gap between the landing point of melt and the midpoint of the touch roll and the cast roll: −3 mm touch pressure of the touch roll: 0.1 MPa variation in the film width: 6% mean film width: 25 m

The optical properties of thus-prepared acryl-base polymer film are as follows.

Re(550)=2 nm;
Rth(550)=−2 nm;
Re(400)=2.1 nm;
Rth(400)=2.6 nm;
Re(700)=1.99 nm;
Rth(700)=−1.5 nm;
|Re(400)−Re(700)|=0.11 nm; and
|Rth(400)−Rth(700)|=1.1 nm.

The film was used as Transparent Film 3, and Transparent Film 3 showed the optical properties which the first transparent film is required to have.

5. Preparation of Transparent Film 4

(Preparation of Polymer Solution)

1) Cellulose Acylate

Cellulose Acylate "A":

Cellulose acetate powder having a degree of substitution of 2.94 was used. The viscosity-average degree of polymerization of the cellulose acylate "A" was 300, and the degree of substitution by acetyl group at the 6-position was 0.94.

2) Solvent

The solvent "A" described below was used. The moisture content of the solvent "A" was found to be 0.2% by mass or less.

Solvent "A": dichloromethane/methanol/butanol=83/15/2 (ratio by mass)

3) Additive

Additive "A"

Silicon dioxide particle (particle size=20 nm, Mohs hardness=approx. 7) (0.08 parts by mass)

4) Dissolution

While stirring and dispersing the above-described solvent and the additive in a 400-liter stainless steel tank, equipped with a stirring propeller and configured to allow cooling water to circulate therearound, the above-described cellulose acylate was gradually added. After completion of addition, the mixture was stirred at room temperature for 2 hours, allowed to swell for 3 hours, and stirred again to thereby obtain a cellulose acylate solution.

The stirring was conducted by using a dissolver-type eccentric stirrer axis capable of stirring at a peripheral speed of 15 m/sec (shear stress=$5 \times 10^4$ kgf/m/sec$^2$ [$4.9 \times 10^5$ N/m/sec$^2$]), and a central stirrer axis having an anchor blade, capable of stirring at a peripheral spped of 1 m/sec (shear stress=$1 \times 10^4$ kgf/m/sec$^2$ [$9.8 \times 10^4$ N/m/sec$^2$]). The swelling was conducted while interrupting the high-speed stirrer axis, but adjusting the peripheral speed of the stirring axis with the anchor blade to 0.5 m/sec.

The swelled solution was taken out from the tank, heated to 50° C. using a jacketed piping, and further heated to 90° C.

under a pressure of 2 MPa for thorough dissolution. The duration of heating was 15 minutes. Any filter, housing, and piping exposed to high temperatures used in this process were those composed of hastelloy and excellent in corrosion resistance, and having a jacket allowing a heat medium for keeping or elevating temperature to circulate therethrough.

The solution was then cooled to 36° C., to thereby obtain a cellulose acylate solution.

5) Filtration

Thus-obtained cellulose acylate solution was filtered through a filter paper (#63, from Toyo Roshi Co., Ltd.) having an absolute filter rating of 10 μm, and further filtered through sintered metal filter (FH025, from PALL Corporation) having an absolute filter rating of 2.5 μm, to thereby obtain a polymer solution.

(Preparation of Film)

The cellulose acylate solution was heated to 30° C., and cast through a casting geeser (described in Japanese Laid-Open Patent Publication No. 11-314233) onto a band-formed specular stainless steel base of 60 m long set to 15° C. The casting speed was adjusted to 50 m/min, and the width of coating was adjusted to 200 cm. The ambient temperature over the entire casting zone was adjusted to 15° C. The cellulose acylate film cast and conveyed by rotation was peeled off from the band at a position 50 cm ahead of the end point of the casting zone, and blown with a dry air at 45° C. The film was further dried at 110° C. for 5 minutes, and still further dried at 140° C. for 10 minutes, to thereby obtain a transparent cellulose acylate film of 65 μm thick.

(Preliminary Stretching)

The prepared cellulose acylate film was uniaxially stretched along the longitudinal direction (MD) using a roll stretcher. The rolls of the roll stretcher used herein were induction heating jacketed rolls having a specular finish, and were configured to allow independent temperature adjustment. The stretching zone was covered with a casing, and kept at temperatures listed in Table 1. The roll placed ahead of the stretching zone was set so as to be gradually heated up to a stretching temperature of 160° C. The factor of stretching was set to 40%, controlled by adjusting the peripheral speed of nip rolls. The aspect ratio (distance between the nip rolls/width of base inlet) was adjusted to 0.5, and the stretching speed was adjusted to 10%/min of the distance between the stretching rolls.

The factor of preliminary stretching of film was determined by giving marked lines on the film at regular intervals in the direction normal to the direction of feeding, and by measuring the intervals before and after annealing, based on the equation below:

Factor of preliminary stretching of film (%)=100×(interval of marked lines after annealing−interval of marked lines before annealing)/interval of marked lines before annealing)

(Annealing)

Thus-obtained film was held at both edges using tenter clips, and allowed to pass through a heating zone at 260° C. The ratio of dimensional change in the width-wise direction was adjusted by varying the ratio of expansion of the tenter. The ratio of dimensional change in the width-wise direction determined based on the temperature of the heating zone, and the above-described method was −12%.

(Re-Stretching)

Thus-obtained film was held at both edges using tenter clips, and was then stretched in the heating zone in the direction normal to the direction of feeding. The temperature of the heating zone was adjusted to 260° C., and factor of stretching by the tenter was adjusted to 2%. Note that, for the case where annealing was adopted, the film was held with the tenter clips at the entrance of the annealing zone, and then transferred to the re-stretching zone while keeping the tenter clips attached thereto.

Optical characteristics of thus-prepared transparent film, Transparent Film 4, observed herein were Re(550)=140 nm and Rth(550)=−2 nm.

6. Preparation of Transparent Film 4'

A transparent film was prepared similarly to Transparent Film 4, except that the thickness of the cellulose acylate film was adjusted to 125 μm by adjusting the casting geeser.

Optical characteristics of thus-manufactured Transparent Film 4' observed herein were Re(550)=287 nm and Rth(550)=−8 nm.

7. Preparation of Transparent Film 5

Synthesis of Cyclic Olefin-Base Resin (Resin A1):

In a reactor replaced with nitrogen, 250 parts of 8-methyl-8-methoxycarbonyltetracyclo[4.4.0.1$^{2,5}$.1$^{7,10}$]-3-dodecene (specific monomer), 18 parts of 1-hexene (molecular weight adjusting agent), and 750 parts of toluene (solvent for ring-opening polymerization reaction) were placed, and the solution was heated to 60° C. Next, the solution in the reactor was added with 0.62 parts of a toluene solution of triethyl aluminum (1.5 mol/l) as a polymerization catalyst, and 3.7 parts of a toluene solution of tungsten hexachloride (0.05 mol/l) denatured by t-butanol and methanol (t-butanol:methanol:tungsten=0.35 mol:0.3 mol:1 mol), the system was stirred under heating at 80° C. for 3 hours to proceed a ring-opening polymerization reaction, to thereby obtain a solution of ring-opened polymer. The polymerization conversion in this polymerization reaction was 97%, and the obtained ring-opened polymer was found to have an inherent viscosity (ηinh) of 0.75 dl/g when measured at 30° C. in chloroform.

Four thousand parts of thus-obtained ring-opened polymer solution is placed in an autoclave, 0.48 parts of RuHCl(CO)[P(C$_6$H$_5$)$_3$]$_3$ was added thereto, and the mixture was stirred for 3 hours under conditions of a hydrogen gas pressure of 100 kg/cm$^2$ and a reaction temperature of 165° C., to thereby proceed a hydrogenation reaction.

The obtained reaction solution (hydrogenated polymer solution) was cooled, and the hydrogen gas was discharged. The reaction solution was poured into a large amount of methanol, the precipitate was separated and collected, and then dried to obtain a hydrogenated polymer (referred to as 'Resin A1', hereinafter).

Preparation of Resin Film (a1-1):

Resin A1 was dissolved into toluene so as to adjust the concentration to 30% (viscosity of solution at room temperature is 30,000 mPa·s), added with pentaerythrityl tetrakis[3-(3,5-di-t-butyl-4-hydroxy phenyl)propionate] as an antioxidant to as much as 0.1 parts by weight per 100 parts by weight of polymer, and the mixture was then filtered through a sintered metal fiber filter having a filter rating of 5 μm, from PALL Corporation, while controlling the flow rate of the solution so that the differential pressure fall within a range of 0.4 MPa.

Thus-obtained polymer solution was coated using INVEX Labocoater from Inoue Metalworking Industry Co., Ltd., installed in a class-1000 clean room, onto a PET film (Lumirror U94, from Toray Industries, Inc.) which is composed of a base of 100 μm thick hydrophilized (adhesion enhanced) by an acrylate-base agent, so as to attain a dry thickness of 200 μm, and subjected to primary drying at 50° C., followed by secondary drying at 90° C. The resin film peeled off from the PET film was named (a1-1). Thus-obtained film was found to have a residual solvent content of 0.5%, and an all-light transmissivity of 93%.

A polyester film showing a shrinkage of 30% at 180° C. (Tg+10° C.), which is a temperature of stretching, was bonded onto the surface of the resin film (a1-1) using a pressure sensitive adhesive, so as to align the direction of shrinkage normal to the direction of stretching, and the product was then stretched by a factor of 2.0 at a stretching speed of 300%/min. The product was then cooled to 150° C. (Tg−20° C.) and kept for one minute in this atmosphere, further cooled to room temperature, taken out, peeled from the polyester film, to thereby obtain a transparent film 5.

Optical characteristics of thus-manufactured Transparent Film 5 observed herein were Re(550)=125 nm and Rth(550)=60 nm.

8. Preparation of Transparent Film 5'

Pellets of "TOPAS #6013 (Tg=136° C.) were dried at 110° C. for longer than 2 hours and extruded using a single-screw kneader/extruder. At the time, a screen filter, a gear pump and a leaf disc filter were disposed between the extruder and the die in this order, and theses were connected with pipes. The melt was extruded from the die with a width of 1900 nm and a lip gap of 1 mm at an extrusion temperature (discharge temperature) of 260° C.

Thereafter, the melt was allowed to pass through the center portion between a chill roll and a touch roll. A roll made of metal, with a HCr coated, having a diameter of 400 mm and a width of 2000 mm, was used as the chill roll; and a double-hold roll, used in Example 1 described in JPA No. H11-235747, the thickness of the metal cladding layer being 2 mm, having a diameter of 350 mm and a width of 1700 mm was used as the touch roll.

The temperature of the rolls were set at as Tg−5° C. And the film formation step was carried out in the atmosphere of 25° C. and RH60%.

The film was trimmed on both edges (5 cm each from the whole width), immediately before being wound up, and then knurled on both edges to as wide as 10 mm, and to as thick as 20 μm. The film of 1540 mm wide and 450 m long was prepared. The film was used us Transparent Film 5'.

The optical properties of thus-prepared cycloolefin polymer-base film are as follows.

Re(550)=2 nm;
Rth(550)=4 nm;
Re(400)=2.3 nm;
Rth(400)=4.5 nm;
Re(700)=1.8 nm;
Rth(700)=3.5 nm;
|Re(400)−Re(700)|=0.5 nm and
|Rth(400)−Rth(700)|=1 nm.

The cycloolefin polymer-base film satisfied the optical properties which the first transparent film is required to have, and the film was used as Transparent Film 5'.

9. Preparation of Transparent Film 6

The surface of Transparent Film 5 was saponified, and continuously coated with a coating liquid for forming alignment film having the formulation below, using a #14 wire bar. The coated film was dried by a hot air at 60° C. for 60 seconds, and further by a hot air at 100° C. for 120 seconds, to thereby form an alignment film.

Formulation of Coating Liquid for Forming Alignment Film

| | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

Modified polyvinyl alcohol $$-(CH_2-CH)_{86.3}-(CH_2-CH)_{12}-(CH_2-CH)_{1.7}-$$
$$\phantom{xxxxx}|\phantom{xxxxxxxxxxx}|\phantom{xxxxxxxxx}|\phantom{xxxxxx}CH_3$$
$$\phantom{xxxxx}OH\phantom{xxxxxxxxx}OCOCH_3\phantom{xxx}OCONHCH_2CH_2OCOC=CH_2$$

A coating liquid containing a rod-like liquid crystal compound, having the formulation shown below, was continuously coated on the alignment film prepared in the above using a #46 wire bar. The feeding speed of the film was adjusted to 20 m/min. The solvent was dried in the process of continuously heating the film from room temperature up to 90° C., the film was then heated in a heating zone at 90° C. for 90 seconds, to thereby align the rod-like liquid crystalline compound. The film was then kept at 60° C., irradiated by UV light to fix the alignment of the liquid crystal compound, to thereby form an optically anisotropic layer. The surface of the cellulose acetate film, opposite to the surface having the optically anisotropic layer formed thereon, was continuously saponified, to thereby prepare a transparent film, Transparent Film 6.

Formulation of Coating Liquid (S1) Containing Rod-Like Liquid Crystal Compound

| | |
|---|---|
| Rod-like liquid crystalline compound (I) shown below | 100 parts by mass |
| Photo-polymerization initiator (Irgacure 907, from CIBA-GEIGY Limited) | 3 parts by mass |
| Sensitizer (Kayacure DETX, from Nippon Kayaku Co., Ltd.) | 1 part by mass |
| Fluorine-Containing Polymer shown below | 0.4 parts by mass |

| | |
|---|---|
| Pyridinium salt shown below | 1 part by mass |
| Methyl ethyl ketone | 172 parts by mass |

Rod-like liquid crystal compound (I)

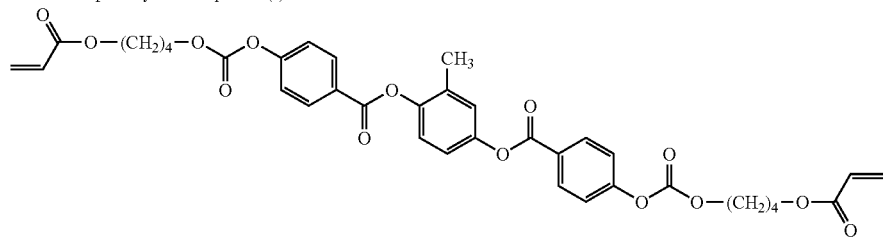

Fluorine-containing polymer

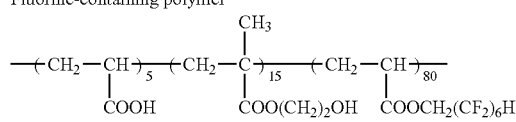

Pyridinium salt

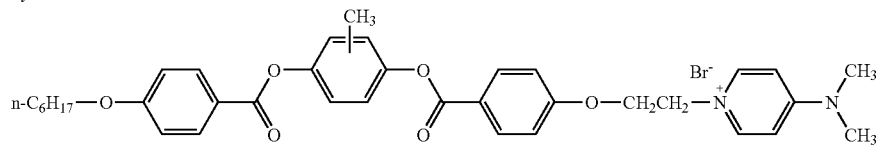

Only the optically anisotropic layer containing the rod-like liquid crystalline compound was peeled off from the thus-manufactured transparent film, Transparent Film 6, and optical characteristics were measured. Re(0) of the optically anisotropic layer only, measured at 550 nm, was found to be 0 mm, and Rth was found to be −130 nm. It was confirmed that Transparent Film 6, having the optically anisotropic layer having the rod-like liquid crystal molecule aligned therein substantially normal to the film surface, was obtained.

10. Preparation of Transparent Film 7

The ingredients shown below were placed in a mixing tank, stirred under heating so as to dissolve the individual ingredients, to thereby prepare a cellulose acetate solution. The solution was filtered through a filter paper (No. 63, from Advantec Co., Ltd.) having a retainable particle size of 4 μm and a drainage time of 35 seconds, under a pressure of 5 kg/cm² or below.

Formulation of Cellulose Acetate Solution

| | |
|---|---|
| Cellulose acetate having a degree of acetylation of 60.9% (degree of polymerization = 300, Mn/Mw = 1.5) | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 300 parts by mass |
| Methanol (second solvent) | 54 parts by mass |
| 1-Butanol (third solvent) | 11 parts by mass |

In another mixing tank, 8 parts by mass of the retardation enhancer "A" shown below, 10 parts by mass of retardation enhancer "B", 0.28 parts by mass of silicon dioxide particle (average particle size: 0.1 μm), 80 parts by mass of methylene chloride, and 20 parts by mass of methanol were placed, and the mixture was stirred under heating to thereby obtain a retardation enhancer solution (and particle dispersion). To 474 parts by mass of the cellulose acetate solution, 40 parts by mass of the retardation enhancer solution was added, and the mixture was thoroughly stirred to thereby prepare a dope.

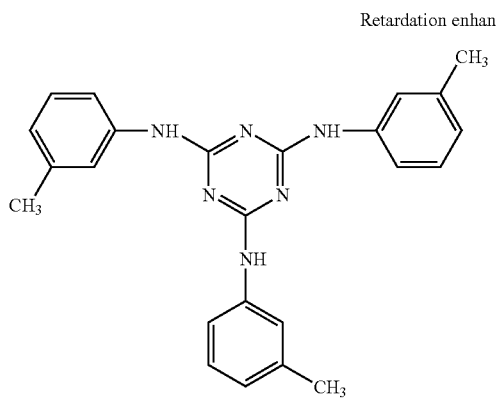

Thus-obtained dope was cast using a band casting machine. A film having a residual solvent content of 15% by mass was transversely stretched at 130° C., using a tenter by a factor of stretching of 20%, kept at 50° C. for 30 seconds while keeping the width attained at the end of stretching, and released from the clips, to thereby obtain a cellulose acetate film. The residual solvent content at the end of stretching was found to be 5% by mass. The film was further dried so as to reduce the residual solvent content to less than 0.1% by mass, to thereby manufacture a transparent film, Transparent Film 7.

The thickness of thus-obtained film 7 was found to be 80 μm. Measurement of dependence of Re on the angle of incidence of light, using an automatic birefringence meter (KOBRA-21ADH, from Oji Scientific Instruments), revealed that a first retardation region 1 manufactured in the above was found to show Re=70 nm and Rth=175 nm, and consequently Nz=3.0.

The surface of the transparent film manufactured in the above was saponified, and a commercially-available vertical aligner (JALS-204R, from JSR Corporation), diluted by methyl ethyl ketone at a ratio of 1:1, was coated thereon using a wire bar coater to as much as 2.4 mL/m². The coated film was immediately dried by hot air at 120° C. for 120 seconds.

Next, a solution containing 3.8 g of the rod-like liquid crystal compound shown below, 0.06 g of photo-polymerization initiator (Irgacure 907, from CIBA-GEIGY Limited), 0.02 g of sensitizer (Kayacure DETX, from Nippon Kayaku Co., Ltd.), and 0.002 g of the vertical aligner for the air interface side shown below, all of which dissolved in 9.2 g of methyl ethyl ketone, was prepared. The solution was coated on the alignment film formed on the film, using a #3.6 wire bar coater. The product was stretched over a metal frame, dried in a thermostat chamber at 100° C. for 2 minutes, to thereby align the rod-like liquid crystal compound. The film was then irradiated by UV light at 80° C. for 20 seconds, using a 120-W/cm high pressure mercury lamp so as to crosslink the rod-like liquid crystal compound, and then cooled to room temperature, to thereby manufacture a retardation layer.

Rod-Like Liquid Crystal Compound

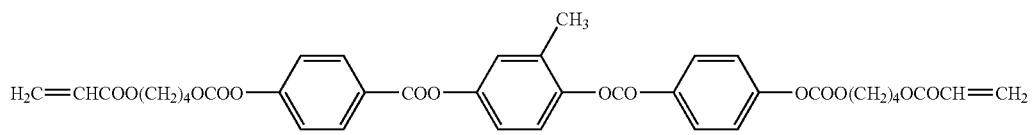

Vertical Aligner for Air Interface Side:

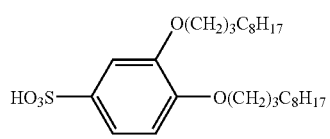

Optical characteristics solely ascribable to the transparent portion of the film were determined, by measuring dependence of Re on the angle of incidence of light of thus-manufactured film, using an automatic birefringence meter (KOBRA-21ADH, from Oji Scientific Instruments), and subtracting therefrom preliminarily-measured contribution of the base. The transparent region was found to show Re=0 nm and Rth=−180 nm, proving that the rod-like liquid crystal was nearly vertically aligned. In this way, Transparent Film 7 was obtained.

11. Preparation of Polarizer Plates A to L

<Preparation of Polarizer Plate A>

A polarizer film was prepared by allowing a stretched polyvinyl alcohol film to adsorb iodine. Commercially-available Transparent Films 1 were saponified, and then bonded to both surfaces of the polarizer film using a polyvinyl alcohol-base adhesive, to thereby form a polarizer plate, Polarizer Plate A.

<Preparation of Polarizer Plate B>

The polarizer film was prepared similarly to as described in the above. Transparent Film 1 was saponified, and bonded to one surface of the polarizer film using a polyvinyl alcohol-base adhesive. Transparent Film 2 prepared in the above was similarly bonded to the other surface of the polarizer film, to thereby form a polarizer plate, Polarizer Plate B.

<Preparation of Polarizer Plate C>

The polarizer film was prepared similarly to as described in the above. Transparent film 1 was saponified, and bonded to one surface of the polarizer film using a polyvinyl alcohol-base adhesive. Transparent film 3 prepared in the above was similarly bonded to the other surface of the polarizer film, to thereby form a polarizer plate, Polarizer Plate C.

<Preparation of Polarizer Plate D>

The polarizer film was prepared similarly to as described in the above. Transparent film 1 was saponified, and bonded to one surface of the polarizer film using a polyvinyl alcohol-base adhesive. Transparent Film 4 prepared in the above was similarly bonded to the other surface of the polarizer film, to thereby form a polarizer plate, Polarizer Plate D.

<Preparation of Polarizer Plate E>

The polarizer film was prepared similarly to as described in the above. Transparent Film 1 was saponified, and bonded to one surface of the polarizer film using a polyvinyl alcohol-base adhesive. Transparent film 4' prepared in the above was similarly bonded to the other surface of the polarizer film, to thereby form a polarizer plate, Polarizer Plate E.

<Preparation of Polarizer Plate F>

The polarizer film was prepared similarly to as described in the above. Transparent Film 1 was saponified, and bonded to one surface of the polarizer film using a polyvinyl alcohol-base adhesive. Transparent Film 5 prepared in the above was similarly bonded to the other surface of the polarizer film, to thereby form a polarizer plate, Polarizer Plate F.

<Preparation of Polarizer Plate G>

The polarizer film was prepared similarly to as described in the above. Transparent Film 1 was saponified, and bonded to one surface of the polarizer film using a polyvinyl alcohol-base adhesive. Transparent Film 6 prepared in the above was similarly bonded to the other surface of the polarizer film, to thereby form a polarizer plate, Polarizer Plate G.

<Preparation of Polarizer Plate H>

The polarizer film was prepared similarly to as described in the above. Transparent Film 1 was saponified, and bonded to one surface of the polarizer film using a polyvinyl alcohol-base adhesive. Transparent Film 7 prepared in the above was similarly bonded to the other surface of the polarizer film, to thereby form a polarizer plate, Polarizer Plate H.

<Preparation of Polarizer Plate I>

Polarizer plate I was prepared similarly to as Polarizer Plate G, except that Transparent Film 1 was bonded between Transparent Film 6 and the polarizer film.

<Preparation of Polarizer Plate J>

The polarizer film was prepared similarly to as described in the above. Transparent Film 1 was saponified, and bonded to one surface of the polarizer film using a polyvinyl alcohol-base adhesive. Transparent Film 8 prepared in the above was similarly bonded to the other surface of the polarizer film, to thereby form a polarizer plate, Polarizer Plate J.

<Preparation of Polarizer Plate K>

The polarizer film was prepared similarly to as described in the above. Transparent Film 1 was saponified, and bonded to one surface of the polarizer film using a polyvinyl alcohol-base adhesive. Transparent Film 9 prepared in the above was similarly bonded to the other surface of the polarizer film, to thereby form a polarizer plate, Polarizer Plate K.

<Preparation of Polarizer Plate L>

The polarizer film was prepared similarly to as described in the above. Transparent Film 1 was saponified, and bonded to one surface of the polarizer film using a polyvinyl alcohol-base adhesive. Transparent Film 5' prepared in the above was similarly bonded to the other surface of the polarizer film, to thereby form a polarizer plate, Polarizer Plate L.

Comparative Example 1

Polarizer plate A was bonded to one surface of the polymer-stabilized blue phase liquid crystal display element, so as to incline the absorption axis of the polarizer film 45° away from the longitudinal direction of the comb-shaped electrodes in the liquid crystal display element. Another polarizer plate A was then bonded to the other surface of the liquid crystal display element, so as to place the transparent film thereof on the liquid crystal display element side, and so as to attain the crossed-Nicol arrangement with respect to Polarizer plate A, to thereby prepare a liquid crystal display device.

Example 1

Polarizer plate A was bonded to one surface of the polymer-stabilized blue phase liquid crystal display element, so as to incline the absorption axis of the polarizer film 45° away from the longitudinal direction of the comb-shaped electrodes in the liquid crystal display element. Polarizer plate B was then bonded to the other surface of the liquid crystal display element, so as to place Transparent Film 2 on the liquid crystal display element side, and so as to attain the crossed-Nicol arrangement with respect to Polarizer Plate A, to thereby prepare a liquid crystal display device.

It is to be noted that Polarizer Plate B was disposed at the rear side, or in other words, the light source side Example 2

Polarizer Plate B was bonded to one surface of the polymer-stabilized blue phase liquid crystal display element, so as to place the transparent film 2 on the liquid crystal display element side, and so as to incline the absorption axis of the polarizer film 45° away from the longitudinal direction of the comb-shaped electrodes in the liquid crystal display element. Another Polarizer Plate B was then bonded to the other surface of the liquid crystal display element, so as to place the transparent film 2 on the liquid crystal display element side, and so as to attain the crossed-Nicol arrangement with respect to the above-described Polarizer Plate B, to thereby prepare a liquid crystal display device.

Example 3

Polarizer Plate A was bonded to one surface of the polymer-stabilized blue phase liquid crystal display element, so as to incline the absorption axis of the polarizer film 45° away from the longitudinal direction of the comb-shaped electrodes in the liquid crystal display element. Polarizer Plate C was then bonded to the other surface of the liquid crystal display element, so as to place Transparent Film 3 on the liquid crystal display element side, and so as to attain the crossed-Nicol arrangement with respect to Polarizer Plate A, to thereby prepare a liquid crystal display device.

It is to be noted that Polarizer Plate C was disposed at the rear side, or in other words, the light source side Example 4

Polarizer Plate C was bonded to one surface of the polymer-stabilized blue phase liquid crystal display element, so as to place Transparent Film 3 on the liquid crystal display element side, and so as to incline the absorption axis of the polarizer film 45° away from the longitudinal direction of the comb-shaped electrodes in the liquid crystal display element. Another Polarizer Plate C was then bonded to the other surface of the liquid crystal display element, so as to place Transparent Film 3 on the liquid crystal display element side, and so as to attain the crossed-Nicol arrangement with respect to the above-described Polarizer Plate C, to thereby prepare a liquid crystal display device.

Comparative Example 2

Polarizer Plate A was bonded to one surface of the polymer-stabilized blue phase liquid crystal display element, so as to incline the absorption axis of the polarizer film 45° away from the longitudinal direction of the comb-shaped electrodes in the liquid crystal display element. Polarizer Plate E was then bonded to the other surface of the liquid crystal display element, so as to place Transparent Film 4' on the liquid crystal display element side, and so as to attain the crossed-Nicol arrangement with respect to Polarizer Plate A, to thereby prepare a liquid crystal display device.

It is to be noted that Polarizer Plate A was disposed at the rear side, or in other words, the light source side Example 5

Polarizer Plate B was bonded to one surface of the polymer-stabilized blue phase liquid crystal display element, so as to place Transparent Film 2 on the liquid crystal display element side, and so as to incline the absorption axis of the polarizer film 45° away from the longitudinal direction of the comb-shaped electrodes in the liquid crystal display element. Polarizer Plate E was then bonded to the other surface of the liquid crystal display element, so as to place Transparent Film 4' on the liquid crystal display element side, and so as to attain the crossed-Nicol arrangement with respect to Polarizer Plate B, to thereby prepare a liquid crystal display device.

It is to be noted that Polarizer Plate B was disposed at the rear side, or in other words, the light source side Example 6

Polarizer Plate C was bonded to one surface of the polymer-stabilized blue phase liquid crystal display element, so as to place the transparent film 3 on the liquid crystal display element side, and so as to incline the absorption axis of the polarizer film 45° away from the longitudinal direction of the comb-shaped electrodes in the liquid crystal display element. Polarizer Plate E was then bonded to the other surface of the liquid crystal display element, so as to place Transparent Film 4' on the liquid crystal display element side, and so as to attain the crossed-Nicol arrangement with respect to Polarizer Plate C, to thereby prepare a liquid crystal display device.

It is to be noted that Polarizer Plate C was disposed at the rear side, or in other words, the light source side Comparative Example 3

Polarizer Plate A was bonded to one surface of the polymer-stabilized blue phase liquid crystal display element, so as to incline the absorption axis of the polarizer film 45° away from the longitudinal direction of the comb-shaped electrodes in the liquid crystal display element. Polarizer Plate G was then bonded to the other surface of the liquid crystal display element, so as to place Transparent Film 6 on the liquid crystal display element side, and so as to attain the crossed-Nicol arrangement with respect to Polarizer Plate A, to thereby prepare a liquid crystal display device.

It is to be noted that Polarizer Plate A was disposed at the rear side, or in other words, the light source side

Example 7

Polarizer Plate B was bonded to one surface of the polymer-stabilized blue phase liquid crystal display element, so as to place Transparent Film 2 on the liquid crystal display element side, and so as to incline the absorption axis of the polarizer film 45° away from the longitudinal direction of the comb-shaped electrodes in the liquid crystal display element. Polarizer Plate G was then bonded to the other surface of the liquid crystal display element, so as to place Transparent Film 6 on the liquid crystal display element side, and so as to attain the crossed-Nicol arrangement with respect to Polarizer Plate B, to thereby prepare a liquid crystal display device.

It is to be noted that Polarizer Plate B was disposed at the rear side, or in other words, the light source side

Example 8

Polarizer Plate C was bonded to one surface of the polymer-stabilized blue phase liquid crystal display element, so as to place Transparent Film 3 on the liquid crystal display element side, and so as to incline the absorption axis of the polarizer film 45° away from the longitudinal direction of the comb-shaped electrodes in the liquid crystal display element. Polarizer Plate G was then bonded to the other surface of the liquid crystal display element, so as to place Transparent Film 6 on the liquid crystal display element side, and so as to attain the crossed-Nicol arrangement with respect to Polarizer Plate C, to thereby prepare a liquid crystal display device.

Comparative Example 4

Polarizer Plate A was bonded to one surface of the polymer-stabilized blue phase liquid crystal display element, so as to incline the absorption axis of the polarizer film 45° away from the longitudinal direction of the comb-shaped electrodes in the liquid crystal display element. Polarizer Plate H was then bonded to the other surface of the liquid crystal display element, so as to place the coated layer of the transparent film on the liquid crystal display element side, and so as to attain the crossed-Nicol arrangement with respect to Polarizer Plate A, to thereby prepare a liquid crystal display device.

It is to be noted that Polarizer Plate A was disposed at the rear side, or in other words, the light source side

Example 9

Polarizer Plate B was bonded to one surface of the polymer-stabilized blue phase liquid crystal display element, so as to place Transparent Film 2 on the liquid crystal display element side, and so as to incline the absorption axis of the polarizer film 45° away from the longitudinal direction of the comb-shaped electrodes in the liquid crystal display element. Polarizer Plate H was then bonded to the other surface of the liquid crystal display element, so as to place the coated layer of the transparent film on the liquid crystal display element side, and so as to attain the crossed-Nicol arrangement with respect to Polarizer Plate B, to thereby prepare a liquid crystal display device.

It is to be noted that Polarizer Plate B was disposed at the rear side, or in other words, the light source side

Example 10

Polarizer Plate C was bonded to one surface of the polymer-stabilized blue phase liquid crystal display element, so as to place Transparent Film 3 on the liquid crystal display element side, and so as to incline the absorption axis of the polarizer film 45° away from the longitudinal direction of the comb-shaped electrodes in the liquid crystal display element. Polarizer Plate H was then bonded to the other surface of the liquid crystal display element, so as to place the coated layer of the transparent film on the liquid crystal display element side, and so as to attain the crossed-Nicol arrangement with respect to Polarizer Plate C, to thereby prepare a liquid crystal display device.

It is to be noted that Polarizer Plate C was disposed at the rear side, or in other words, the light source side

Comparative Example 5

Polarizer Plate A was bonded to one surface of the polymer-stabilized blue phase liquid crystal display element, so as to incline the absorption axis of the polarizer film 45° away from the longitudinal direction of the comb-shaped electrodes in the liquid crystal display element. Polarizer Plate I was then bonded to the other surface of the liquid crystal display element, so as to place Transparent Film 6 on the liquid crystal display element side, and so as to attain the crossed-Nicol arrangement with respect to Polarizer Plate A, to thereby prepare a liquid crystal display device.

It is to be noted that Polarizer Plate A was disposed at the rear side, or in other words, the light source side

Example 11

Polarizer Plate B was bonded to one surface of the polymer-stabilized blue phase liquid crystal display element, so as to place Transparent Film 2 on the liquid crystal display element side, and so as to incline the absorption axis of the polarizer film 45° away from the longitudinal direction of the comb-shaped electrodes in the liquid crystal display element. Polarizer Plate I was then bonded to the other surface of the liquid crystal display element, so as to place Transparent Film 6 on the liquid crystal display element side, and so as to attain the crossed-Nicol arrangement with respect to Polarizer Plate B, to thereby prepare a liquid crystal display device.

It is to be noted that Polarizer Plate B was disposed at the rear side, or in other words, the light source side

Example 12

Polarizer Plate C was bonded to one surface of the polymer-stabilized blue phase liquid crystal display element, so as to place Transparent Film 3 on the liquid crystal display element side, and so as to incline the absorption axis of the polarizer film 45° away from the longitudinal direction of the comb-shaped electrodes in the liquid crystal display element. Polarizer Plate H was then bonded to the other surface of the liquid crystal display element, so as to place Transparent Film 6 on the liquid crystal display element side, and so as to attain the crossed-Nicol arrangement with respect to Polarizer Plate C, to thereby prepare a liquid crystal display device.

It is to be noted that Polarizer Plate C was disposed at the rear side, or in other words, the light source side

Example 13

Polarizer Plate A was bonded to one surface of the polymer-stabilized blue phase liquid crystal display element, so as to incline the absorption axis of the polarizer film 45° away from the longitudinal direction of the comb-shaped electrodes in the liquid crystal display element. Polarizer Plate L was then bonded to the other surface of the liquid crystal display element, so as to place Transparent Film 5' on the liquid crystal display element side, and so as to attain the crossed-Nicol arrangement with respect to Polarizer Plate A, to thereby prepare a liquid crystal display device.

It is to be noted that Polarizer Plate L was disposed at the rear side, or in other words, the light source side (Evaluation)

Each of the liquid crystal display devices in Examples and Comparative Examples was brought into the white state and black state, and normal contrast was calculated by measuring the transmittances in two states in the normal direction (in the direction along the normal line with respect to the displaying plane).

Each of the liquid crystal display devices in Examples and Comparative Examples was brought into the black state, and the degree of change in blackness, at an azimuth of 45° with respect to the optical axes of the orthogonal polarizer plates and at an angle of inclination of 60° away from the normal line, was evaluated by using a luminance calorimeter (BM-5, from Topcon Corporation). The degree of change in blackness herein was defined by a distance calculated from a minimum value and a maximum value of u'v' chromaticity, observed at azimuth varied from 0 to 360°, at an angle of inclination of 60° away from the normal line. Results are shown in table below.

|  | Transmittance in black state (%) | Transmittance in white state (%) | Normal Contrast | Degree of change in blackness |
| --- | --- | --- | --- | --- |
| Comparative Example 1 | 0.0045 | 3.1 | 682.0 | 0.131 |
| Example 1 | 0.0043 | 3.1 | 717.9 | 0.047 |
| Example 2 | 0.0043 | 3.1 | 725.5 | 0.043 |
| Example 3 | 0.0040 | 3.0 | 741.6 | 0.024 |
| Example 4 | 0.0042 | 3.1 | 733.3 | 0.026 |
| Comparative Example 2 | 0.0045 | 3.1 | 695.9 | 0.121 |
| Example 5 | 0.0044 | 3.2 | 733.3 | 0.063 |
| Example 6 | 0.0042 | 3.1 | 741.3 | 0.045 |
| Comparative Example 3 | 0.0044 | 3.0 | 687.5 | 0.187 |
| Example 7 | 0.0042 | 3.1 | 741.3 | 0.109 |
| Example 8 | 0.0041 | 3.1 | 749.5 | 0.077 |
| Comparative Example 4 | 0.0044 | 3.0 | 680.4 | 0.120 |
| Example 9 | 0.0042 | 3.1 | 741.3 | 0.084 |
| Example 10 | 0.0042 | 3.3 | 789.1 | 0.091 |
| Comparative Example 5 | 0.0046 | 3.1 | 675.2 | 0.129 |
| Example 11 | 0.0044 | 3.2 | 733.3 | 0.102 |
| Example 12 | 0.0042 | 3.2 | 757.0 | 0.078 |
| Example 13 | 0.0043 | 3.1 | 725.5 | 0.043 |

It can be understood from the results shown in the above, that the liquid crystal display devices of Examples 1-4 provide lower transmittances in the black state, extremely higher normal contrast, and smaller degree of change in blackness, as compared with those of Comparative Example 1. The results indicate that, by using a transparent film, having low Re and low Rth, in a polymer-stabilized blue phase liquid crystal display element, it is possible to improve the normal contrast of the element. Furthermore, by using a transparent film also showing suitable wavelength dispersion characteristics of retardation, it is possible to reduce the degree of change in blackness in the oblique direction.

It can be understood from the results shown in the above, that the liquid crystal display devices of Examples 5-13 provide lower transmittances in the black state, extremely higher normal contrast, and smaller degree of change in blackness, as compared with those of Comparative Examples 2-5. The results indicate that, by using a transparent film, having low Re and low Rth, in a polymer-stabilized blue phase liquid crystal display element, it is possible to improve the normal contrast of the element. Furthermore, by using a transparent film also showing suitable wavelength dispersion characteristics of retardation, it is possible to reduce the degree of change in blackness in the oblique direction.

In the above mentioned examples and comparative examples, a CCFL was used as a light source. Liquid crystal display devices shown in the following table were prepared in the same manner as the above described the liquid crystal display devices respectively, except that a direct white LED was used in place of the light source, and were evaluated in the same manner.

|  | Transmittance in black state (%) | Transmittance in white state (%) | Normal Contrast | Degree of change in blackness |
| --- | --- | --- | --- | --- |
| Comparative Example 1' | 0.0041 | 3.5 | 844.8 | 0.122 |
| Example 1' | 0.0035 | 3.2 | 920.5 | 0.052 |
| Example 2' | 0.0036 | 3.3 | 924.0 | 0.048 |
| Example 3' | 0.0037 | 3.5 | 954.5 | 0.033 |
| Example 4' | 0.0036 | 3.4 | 952.0 | 0.034 |
| Comparative Example 2' | 0.0038 | 3.2 | 850.6 | 0.108 |
| Example 5' | 0.0035 | 3.1 | 885.7 | 0.067 |
| Example 6' | 0.0036 | 3.3 | 924.0 | 0.054 |
| Comparative Example 3' | 0.0040 | 3.4 | 850.0 | 0.164 |
| Example 7' | 0.0036 | 3.2 | 884.2 | 0.107 |
| Example 8' | 0.0035 | 3.1 | 891.8 | 0.078 |
| Comparative Example 4' | 0.0038 | 3.2 | 840.0 | 0.112 |
| Example 9' | 0.0036 | 3.4 | 952.0 | 0.075 |
| Example 10' | 0.0033 | 3.2 | 960.0 | 0.091 |
| Comparative Example 5' | 0.0039 | 3.3 | 855.6 | 0.123 |
| Example 11' | 0.0035 | 3.2 | 920.5 | 0.084 |
| Example 12' | 0.0036 | 3.5 | 980.0 | 0.066 |
| Example 13' | 0.0036 | 3.3 | 924.0 | 0.048 |

It can be understood from the results that, by using LED as a light source, it is possible to more reduce the transmittance in the black state and to more improve the normal contrast.

Liquid crystal display devices were prepared in the same manner as the above described the liquid crystal display devices respectively, except that an electrode construction shown in FIG. 4, 5 or 8 was used in place of the electrode construction light source, and were evaluated in the same manner.

Similar experiments were conducted also by using the electrode structure illustrated in FIG. 4, 5 or 8. As a consequence, it was confirmed that the transmittance in the black state was low, the normal contrast was high and the degree of change in blackness was small.

What is claimed is:

1. A liquid crystal display device comprising in the following order:
   a light source,
   a first polarizer,
   a first transparent film,
   a liquid crystal cell comprising:
      a pair of transparent substrates and
      a polymer-stabilized blue phase liquid crystal layer disposed therebetween;
   a second transparent film, and
   a second polarizer;
   wherein |Re(550)|, which is an absolute value of retardation in plane at 550 nm, Re(550), of the first transparent film is equal to or smaller than 10 nm; and |Rth (550)|, which is an absolute value of retardation along the thickness direction at 550 nm, Rth(550), of the first transparent film is equal to or smaller than 30 nm; and
   wherein
   the second transparent film comprises a biaxial film whose Re(550) is from 20 to 120 nm and Rth(550) is from 125 to 225 nm, and another biaxial film, or
   the second transparent film comprises a uniaxial film whose Re(550) is from 60 to 210 nm and Rth(550) is from 30 to 105 nm, and another uniaxial film.

2. The liquid crystal display device of claim 1, wherein |Re(400)−Re(700)| of the first transparent film is equal to or smaller than 10 nm; and |Rth(400)−Rth(700)| of the first transparent film is equal to or smaller than 35 nm.

3. The liquid crystal display device of claim 2, wherein the first transparent film is a cellulose acylate-base film.

4. The liquid crystal display device of claim 1, wherein |Re(400)−Re(700)| of the first transparent film is equal to or smaller than 5 nm; and |Rth(400)−Rth(700)| of the first transparent film is equal to or smaller than 10 nm.

5. The liquid crystal display device of claim 4, wherein the first transparent film is an acryl-base polymer film.

6. The liquid crystal display device of claim 5, wherein the acryl-base polymer film comprises, as a major ingredient, an acryl-base polymer having at least one unit selected from the group consisting of lactone ring unit, maleic anhydride unit, and glutaric anhydride unit.

7. The liquid crystal display device of claim 1, wherein the first transparent film is a cycloolefin polymer-base film.

8. The liquid crystal display device of claim 1, wherein |Re(550)|, which is an absolute value of retardation in plane at 550 nm, Re(550), of the second transparent film is equal to or smaller than 10 nm; and
   |Rth (550)|, which is an absolute value of retardation along the thickness direction at 550 nm, Rth(550), of the second transparent film is equal to or smaller than 30 nm.

9. The liquid crystal display device of claim 1, wherein the second transparent film comprises a biaxial film whose Re(550) is from 20 to 120 nm and Rth(550) is from 125 to 225 nm.

10. The liquid crystal display device of claim 1, wherein the second transparent film comprises a uniaxial film whose Re(550) is from 60 to 210 nm and Rth(550) is from 30 to 105 nm.

11. The liquid crystal display device of claim 1, wherein the light source is an LED light source.

* * * * *